United States Patent [19]
Shinohara et al.

[11] Patent Number: 5,755,501
[45] Date of Patent: May 26, 1998

[54] IMAGE DISPLAY DEVICE AND OPTICAL LOW-PASS FILTER

[75] Inventors: Masayuki Shinohara, Takatsuki; Shigeru Aoyama, Kyoto, both of Japan

[73] Assignee: Omron Corporation, Kyoto, Japan

[21] Appl. No.: 519,167

[22] Filed: Aug. 25, 1995

[30] Foreign Application Priority Data

Aug. 31, 1994  [JP]  Japan ................................ 6-229083

[51] Int. Cl.⁶ ...................................................... G03B 21/14
[52] U.S. Cl. .................................. 353/31; 353/38; 353/84; 349/118; 359/558
[58] Field of Search ........................... 353/20, 38, 69, 353/84; 349/105, 109, 117, 118; 359/567, 569, 570, 558, 559

[56] References Cited

U.S. PATENT DOCUMENTS

| | | | |
|---|---|---|---|
| 3,724,938 | 4/1973 | Nepela | 353/20 |
| 5,005,968 | 4/1991 | Tejima et al. | 353/38 |
| 5,046,827 | 9/1991 | Frost et al. | 349/109 |
| 5,250,967 | 10/1993 | Miyashita | 353/38 |
| 5,300,942 | 4/1994 | Dolgoff | 353/38 |
| 5,513,025 | 4/1996 | Watanabe et al. | 359/569 |

FOREIGN PATENT DOCUMENTS 63-114475  5/1988  Japan.

*Primary Examiner*—William Dowling
*Attorney, Agent, or Firm*—Foley & Lardner

[57] ABSTRACT

An image display device is so adapted as to eliminate image roughness while the resolution of the image is kept as high as possible. The image display device includes an image display body having a plurality of pixels arranged periodically in two dimensions and an optical low-pass filter placed on the front surface of the image display body. The spatial frequency of the initial minimum value of an modulation transfer function in one direction of the optical low-pass filter is decided by two basic frequency vectors M, N for sampling frequencies determined by the arrangement of pixels in the image display body, and the spatial frequency of the initial minimum value of the modulation transfer function in the other direction of the optical low-pass filter is decided by differences ±(N–M) between the basic frequency vectors.

77 Claims, 57 Drawing Sheets

DELTA ARRANGEMENT

SQUARE ARRANGEMENT

MOSAIC ARRANGEMENT

MOSAIC ARRANGEMENT

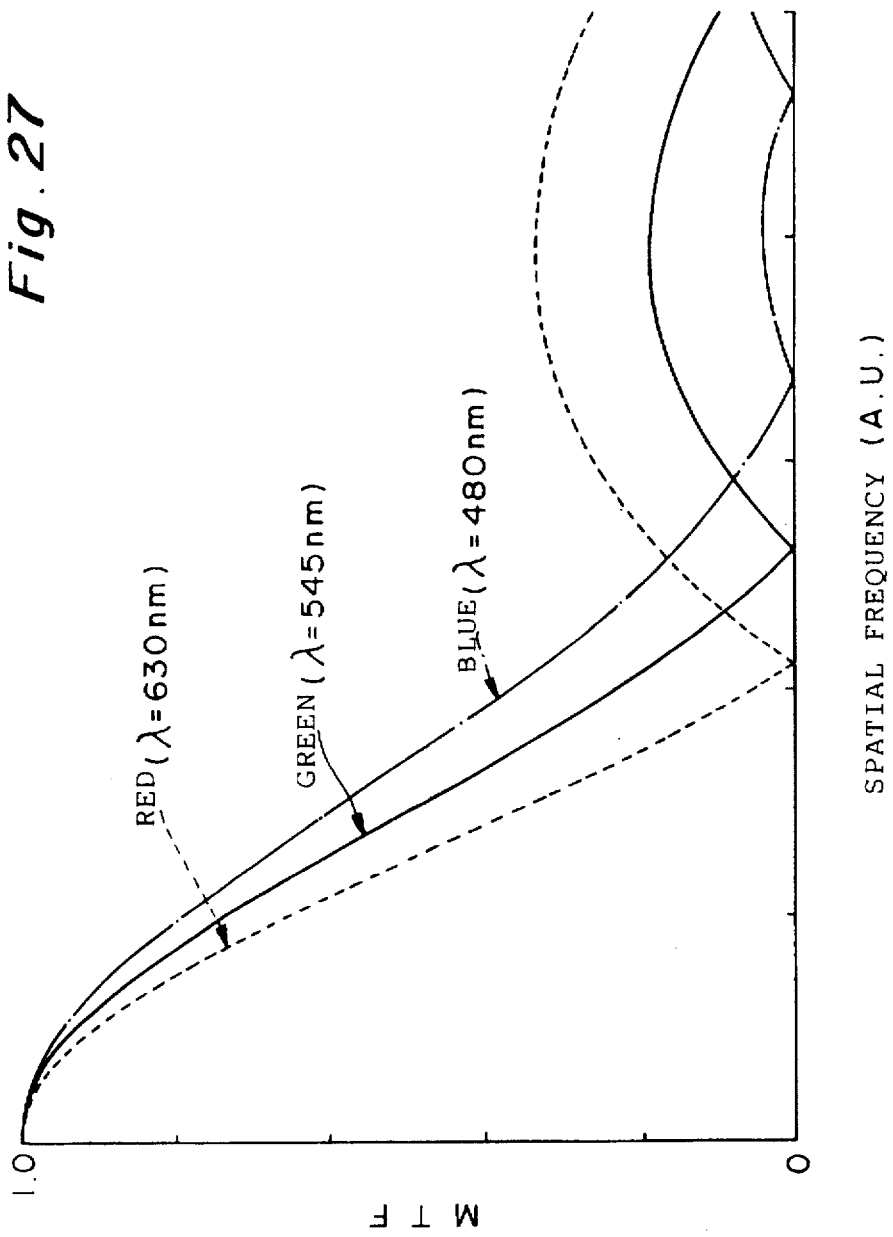

IMAGE DISPLAY DEVICE AND OPTICAL LOW-PASS FILTER

BACKGROUND OF THE INVENTION

1. Field of the Invention

This invention relates to an image display device having an optical low-pass filter and to the optical low-pass filter. The image display device referred to here signifies a device which displays visible information having a two-dimensional spread. It goes without saying that images capable of being displayed include not only pictures, photographs and illustrations but also characters, symbols and numerals, etc.

2. Description of the Related Art

Many image display devices such as liquid-crystal panels (liquid-crystal display devices), CRT display devices and plasma display devices express images by a number of pixels arrayed periodically in two dimensions (these are so-called dot-matrix image display apparatus). In such an image display device, a phenomenon ascribable to the periodic arrangement of the pixels is observed in which so-called sampling noise is produced and results in a decline in image quality, namely images which have a rough appearance.

In an effort to reduce or eliminate this sampling noise, placing an optical low-pass filter (a phase grating or quartz plate, etc.) on the display surface of the image display device has been proposed. (For example, see the specification of Japanese Patent Application Laid-Open No. 63-114475). The optical low-pass filter passes spatial frequency components of a frequency lower than that determined by the pitch of the pixels in the image display device.

Since the function performed by the optical low-pass filter causes blurring of the image (thereby eliminating roughness), resolution also declines. Though roughness can be eliminated sufficiently when the cut-off frequency of the optical low-pass filter is set to a low value, this causes resolution to deteriorate. If the cut-off frequency is set high, on the other hand, roughness cannot be removed adequately.

Image display devices having a large number of pixels have been developed in recent years. The object of such image display devices having a high picture quality is to obtain a high resolution. Roughness is already intrinsically small owing to the large number of pixels.

Accordingly, when an image display device having a high picture quality is taken into account, consideration must be given to maintaining a high resolution and eliminating roughness.

SUMMARY OF THE INVENTION

The present invention is so adapted that resolution can be kept as high as possible while roughness is eliminated.

Basic Principle 1

An image display device according to the present invention comprises an image display body having a plurality of pixels arranged periodically in two dimensions, and an optical low-pass filter placed on a front surface of the image display body, wherein an initial minimum value of an MTF (modulation transfer function) in one direction of the optical low-pass filter is decided by two basic frequency vectors for sampling frequencies determined by the pixel arrangement of the image display body, and an initial minimum value of the MTF in the other direction of the optical low-pass filter is decided by the difference between the basic frequency vectors.

Examples of the image display body are a liquid crystal display device, a liquid-crystal display panel, a plasma display panel, an electroluminescent display panel and a CRT display.

The optical low-pass filter may be implemented by a phase grating, a combination of quartz plates, a prism plate, etc.

With an increase in the spatial frequency from zero, the MTF of the optical low-pass filter decreases, eventually attains a minimum value and then begins increasing again. The initial minimum value referred to here is the position at which the MTF first attains a minimum value when the spatial frequency is increasing from zero. The spatial frequency at which the MTF exhibits the initial minimum value is decided by the two basic frequency vectors.

Since a two-dimensional optical low-pass filter can be thought of as two superimposed one-dimensional optical low-pass filters, therefore MTFs in two directions can be considered.

The frequency at which one MTF exhibits a minimum value is decided by two basic frequency vectors. Noise components are largest at the spatial frequency (the sampling frequency based upon the pixel arrangement) decided by the two basic frequency vectors. Since these largest noise components are reduced (since the MTF is set to zero), roughness of images can be prevented.

The spatial frequency at which the other MTF exhibits a minimum value is a sampling frequency decided by the difference between the two basic vectors. This is a position at which the next largest noise components of the sampling frequency are distributed. The other MTF is set so as to become zero at the next largest sampling frequency and not at the position decided by the two basic frequency vectors. This means that image resolution becomes higher in comparison with the case where the point at which the other MTF becomes zero is decided by the two basic frequency vectors.

The spatial frequency at which the MTF of the optical low-pass filter exhibits a minimum value can be set as a range rather than a point. The range can be determined in dependence upon the pixel arrangement of the image display body or the member constituting the optical low-pass filter.

Further, the range can be determined using parameters relating to the efficiency of the split light from the optical low-pass filter (and the position of the split light), the placement of the optical low-pass filter (the position of the split light, the splitting angle, the optical distance between the optical low-pass filter and the image display body and the angle of rotation of the optical low-pass filter).

Actual measurement is facilitated by using these parameters to stipulate the features or constructions of the image display device having the optical low-pass filter according to the present invention. To this end, the claims include claims which stipulate the features of the optical low-pass filter by using the above-mentioned parameters (by using formulae which contain the parameters) in addition to claims stipulating the characteristics of the optical low-pass filter by the basic frequency vectors.

The set ranges based upon the parameters of the optical low-pass filter in accordance with basic principle 1 mentioned above will now be listed. (This is referred to as being of rectangular type.)

I. Range stipulated from the standpoint of spliting efficiency

1. When a phase grating or prism plate is used as the optical low-pass filter (1) In a case where the pixel arrangement is a delta arrangement (see FIGS. 30, 31)
    Equations (1)–(4) or
    Equations (5)–(8)

(2) In a case where the pixel arrangement is a mosaic arrangement (see FIG. 32)
Equations (9)~(12)

2. When a quartz plate is used as the optical low-pass filter
  (1) In a case where the pixel arrangement is a delta arrangement (see FIGS. 30, 31)
  Equations (41)~(44) or
  Equations (45)~(48)
  (2) In a case where the pixel arrangement is a mosaic arrangement (see FIG. 32)
  Equations (49)~(52)

II. Range stipulated from the standpoint of placement

1. When a phase grating or prism plate is used as the optical low-pass filter
  (1) In a case where the pixel arrangement is a delta arrangement (see FIGS. 31, 32)
  Equations (21)~(24) or
  Equations (25)~(28)
  (2) In a case where the pixel arrangement is a mosaic arrangement (see FIG. 32)
  Equations (29)~(32)

Basic Principle 2

In accordance with the present invention, there is one other method of determining the MTF of the optical low-pass filter. In accordance therewith, an image display device according to the present invention comprises an image display body having a plurality of pixels arranged periodically in two dimensions, and an optical low-pass filter placed on a front surface of the image display body, wherein an initial minimum value of an MTF in one direction of the optical low-pass filter is decided by the sum and difference of two basic frequency vectors for sampling frequencies determined by the pixel arrangement of the image display body, and an initial minimum value of the MTF in the other direction of the optical low-pass filter is decided by one of the two basic frequency vectors. In accordance with this construction, roughness is reduced while high resolution is maintained.

The set ranges based upon the parameters of the optical low-pass filter in accordance with basic principle 2 mentioned above will now be listed for reasons similar to those in the case of the optical low-pass filter in accordance with basic principle 1. (This is referred to as being of parallelogram type.)

III. Range stipulated from the standpoint of spliting efficiency

1. When a phase grating or prism plate is used as the optical low-pass filter
  (1) In a case where the pixel arrangement is a delta arrangement (see FIGS. 44)
  Equations (13)~(16)
  (2) In a case where the pixel arrangement is a mosaic arrangement (see FIG. 45)
  Equations (17)~(20)

2. When a quartz plate is used as the optical low-pass filter
  (1) In a case where the pixel arrangement is a delta arrangement (see FIG. 44)
  Equations (53)~(56)
  (2) In a case where the pixel arrangement is a mosaic arrangement (see FIG. 45)
  Equations (57)~(60)

IV. Range stipulated from the standpoint of placement

1. When a phase grating or prism plate is used as the optical low-pass filter
  (1) In a case where the pixel arrangement is a delta arrangement (see FIG. 44)
  Equations (33)~(36)
  (2) In a case where the pixel arrangement is a mosaic arrangement (see FIG. 45)
  Equations (37)~(40)

$$\frac{3}{2\Delta x} < \frac{1}{X_1} \left\{ \frac{\cos^{-1}(-P_0/2P_1)}{2\pi} - \frac{Y_1}{2\Delta y} \right\} < \frac{5}{2\Delta x} \quad \text{Eq. (1)}$$

$$\frac{3}{2\Delta x} < \frac{1}{X_1} \left\{ \frac{\cos^{-1}(-P_0/2P_1)}{2\pi} + \frac{Y_1}{2\Delta y} \right\} < \frac{5}{2\Delta x} \quad \text{Eq. (2)}$$

$$\frac{1}{4\Delta y} < \frac{1}{Y_2} \left\{ \frac{\cos^{-1}(-P_0/2P_2)}{2\pi} - \frac{X_2}{\Delta x} \right\} < \frac{3}{4\Delta y} \quad \text{Eq. (3)}$$

$$\frac{1}{4\Delta y} < \frac{1}{Y_2} \left\{ \frac{\cos^{-1}(-P_0/2P_2)}{2\pi} + \frac{X_2}{\Delta x} \right\} < \frac{3}{4\Delta y} \quad \text{Eq. (4)}$$

$$\frac{3}{4\Delta y} < \frac{1}{Y_2} \left\{ \frac{\cos^{-1}(-P_0/2P_2)}{2\pi} - \frac{X_2}{\Delta x} \right\} < \frac{5}{4\Delta y} \quad \text{Eq. (5)}$$

$$\frac{3}{4\Delta y} < \frac{1}{Y_2} \left\{ \frac{\cos^{-1}(-P_0/2P_2)}{2\pi} + \frac{X_2}{\Delta x} \right\} < \frac{5}{4\Delta y} \quad \text{Eq. (6)}$$

$$\frac{1}{2\Delta x} < \frac{1}{X_1} \left\{ \frac{\cos^{-1}(-P_0/2P_1)}{2\pi} - \frac{Y_1}{2\Delta y} \right\} < \frac{3}{2\Delta x} \quad \text{Eq. (7)}$$

$$\frac{1}{2\Delta x} < \frac{1}{X_1} \left\{ \frac{\cos^{-1}(-P_0/2P_1)}{2\pi} + \frac{Y_1}{2\Delta y} \right\} < \frac{3}{2\Delta x} \quad \text{Eq. (8)}$$

$$\frac{1}{2\Delta x} < \frac{1}{X_1} \left\{ \frac{\cos^{-1}(-P_0/2P_1)}{2\pi} - \frac{Y_1}{3\Delta y} \right\} < \frac{3}{2\Delta x} \quad \text{Eq. (9)}$$

$$\frac{1}{2\Delta x} < \frac{1}{X_1} \left\{ \frac{\cos^{-1}(-P_0/2P_1)}{2\pi} + \frac{Y_1}{3\Delta y} \right\} < \frac{3}{2\Delta x} \quad \text{Eq. (10)}$$

$$\frac{5}{6\Delta x} < \frac{1}{Y_2} \left\{ \frac{\cos^{-1}(-P_0/2P_2)}{2\pi} - \frac{X_2}{\Delta x} \right\} < \frac{7}{6\Delta y} \quad \text{Eq. (11)}$$

$$\frac{5}{6\Delta x} < \frac{1}{Y_2} \left\{ \frac{\cos^{-1}(-P_0/2P_2)}{2\pi} + \frac{X_2}{\Delta x} \right\} < \frac{7}{6\Delta y} \quad \text{Eq. (12)}$$

$$-\frac{1}{2\Delta x} < \frac{2}{2X_1 + Y_1\Delta x/\Delta y} \left\{ \frac{\cos^{-1}(-P_0/2P_1)}{2\pi} - \frac{Y_1}{\Delta y} \right\} < \frac{1}{2\Delta x} \quad \text{Eq. (13)}$$

$$\frac{3}{2\Delta x} < \frac{2}{2X_1 + Y_1\Delta x/\Delta y} \left\{ \frac{\cos^{-1}(-P_0/2P_1)}{2\pi} + \frac{Y_1}{\Delta y} \right\} < \frac{5}{2\Delta x} \quad \text{Eq. (14)}$$

$$-\frac{1}{2\Delta x} < \frac{2}{2X_2 - Y_2\Delta x/\Delta y} \left\{ \frac{\cos^{-1}(-P_0/2P_2)}{2\pi} - \frac{Y_2}{\Delta y} \right\} < \frac{1}{2\Delta x} \quad \text{Eq. (15)}$$

$$-\frac{5}{2\Delta x} < \frac{2}{2X_2 - Y_2\Delta x/\Delta y} \left\{ \frac{\cos^{-1}(-P_0/2P_2)}{2\pi} + \frac{Y_2}{\Delta y} \right\} < -\frac{3}{2\Delta x} \quad \text{Eq. (16)}$$

$$-\frac{1}{2\Delta x} < \frac{3}{3X_1 + Y_1\Delta x/\Delta y} \left\{ \frac{\cos^{-1}(-P_0/2P_1)}{2\pi} - \frac{Y_1}{\Delta y} \right\} < \frac{1}{2\Delta x} \quad \text{Eq. (17)}$$

$$\frac{3}{2\Delta x} < \quad \text{Eq. (18)}$$

$$\frac{3}{3X_1 + Y_1 \Delta x/\Delta y} \left\{ \frac{\cos^{-1}(-P_0/2P_1)}{2\pi} + \frac{Y_1}{\Delta y} \right\} < \frac{5}{2\Delta x}$$

$$-\frac{1}{2\Delta x} < \quad \text{Eq. (19)}$$

$$\frac{3}{3X_2 - 2Y_2 \Delta x/\Delta y} \left\{ \frac{\cos^{-1}(-P_0/2P_2)}{2\pi} - \frac{Y_2}{\Delta y} \right\} < \frac{1}{2\Delta x}$$

$$-\frac{5}{2\Delta x} < \quad \text{Eq. (20)}$$

$$\frac{3}{3X_2 - 2Y_2 \Delta x/\Delta y} \left\{ \frac{\cos^{-1}(-P_0/2P_2)}{2\pi} + \frac{Y_2}{\Delta y} \right\} < -\frac{3}{2\Delta x}$$

$$\frac{3}{2\Delta x} < \frac{\cos^{-1}(-P_0/2P_1)}{2\pi L\alpha_1 \cos\theta_1} - \frac{\tan\theta_1}{2\Delta y} < \frac{5}{2\Delta x} \quad \text{Eq. (21)}$$

$$\frac{3}{2\Delta x} < \frac{\cos^{-1}(-P_0/2P_1)}{2\pi L\alpha_1 \cos\theta_1} + \frac{\tan\theta_1}{2\Delta y} < \frac{5}{2\Delta x} \quad \text{Eq. (22)}$$

$$\frac{1}{4\Delta y} < \frac{\cos^{-1}(-P_0/2P_2)}{2\pi L\alpha_2 \cos\theta_2} - \frac{1}{\Delta x \tan\theta_2} < \frac{3}{4\Delta y} \quad \text{Eq. (23)}$$

$$\frac{1}{4\Delta y} < \frac{\cos^{-1}(-P_0/2P_2)}{2\pi L\alpha_2 \cos\theta_2} + \frac{1}{\Delta x \tan\theta_2} < \frac{3}{4\Delta y} \quad \text{Eq. (24)}$$

$$\frac{3}{4\Delta y} < \frac{\cos^{-1}(-P_0/2P_2)}{2\pi L\alpha_2 \cos\theta_2} - \frac{1}{\Delta x \tan\theta_2} < \frac{5}{4\Delta y} \quad \text{Eq. (25)}$$

$$\frac{3}{4\Delta y} < \frac{\cos^{-1}(-P_0/2P_2)}{2\pi L\alpha_2 \cos\theta_2} + \frac{1}{\Delta x \tan\theta_2} < \frac{5}{4\Delta y} \quad \text{Eq. (26)}$$

$$\frac{1}{2\Delta x} < \frac{\cos^{-1}(-P_0/2P_1)}{2\pi L\alpha_1 \cos\theta_1} - \frac{\tan\theta_1}{2\Delta y} < \frac{3}{2\Delta x} \quad \text{Eq. (27)}$$

$$\frac{1}{2\Delta x} < \frac{\cos^{-1}(-P_0/2P_1)}{2\pi L\alpha_1 \cos\theta_1} + \frac{\tan\theta_1}{2\Delta y} < \frac{3}{2\Delta x} \quad \text{Eq. (28)}$$

$$\frac{1}{2\Delta x} < \frac{\cos^{-1}(-P_0/2P_1)}{2\pi L\alpha_1 \cos\theta_1} - \frac{\tan\theta_1}{3\Delta y} < \frac{3}{2\Delta x} \quad \text{Eq. (29)}$$

$$\frac{1}{2\Delta x} < \frac{\cos^{-1}(-P_0/2P_1)}{2\pi L\alpha_1 \cos\theta_1} + \frac{\tan\theta_1}{3\Delta y} < \frac{3}{2\Delta x} \quad \text{Eq. (30)}$$

$$\frac{5}{6\Delta y} < \frac{\cos^{-1}(-P_0/2P_2)}{2\pi L\alpha_2 \cos\theta_2} - \frac{1}{\Delta x \tan\theta_2} < \frac{7}{6\Delta y} \quad \text{Eq. (31)}$$

$$\frac{5}{6\Delta y} < \frac{\cos^{-1}(-P_0/2P_2)}{2\pi L\alpha_2 \cos\theta_2} + \frac{1}{\Delta x \tan\theta_2} < \frac{7}{6\Delta y} \quad \text{Eq. (32)}$$

$$-\frac{1}{2\Delta x} < \quad \text{Eq. (33)}$$

$$\frac{\cos^{-1}(-P_0/2P_1)}{\pi L\alpha_1 \{2\cos\theta_1 + (\Delta x/\Delta y)\sin\theta_1\}} - \frac{2}{2\Delta y/\tan\theta_1 + \Delta x} < \frac{1}{2\Delta x}$$

$$\frac{3}{2\Delta x} < \quad \text{Eq. (34)}$$

$$\frac{\cos^{-1}(-P_0/2P_1)}{\pi L\alpha_1 \{2\cos\theta_1 + (\Delta x/\Delta y)\sin\theta_1\}} + \frac{2}{2\Delta y/\tan\theta_1 + \Delta x} < \frac{5}{2\Delta x}$$

$$-\frac{1}{2\Delta x} < \quad \text{Eq. (35)}$$

$$\frac{\cos^{-1}(-P_0/2P_2)}{\pi L\alpha_2 \{2\cos\theta_2 - (\Delta x/\Delta y)\sin\theta_2\}} - \frac{2}{2\Delta y/\tan\theta_2 - \Delta x} < \frac{1}{2\Delta x}$$

$$-\frac{5}{2\Delta x} < \quad \text{Eq. (36)}$$

$$\frac{\cos^{-1}(-P_0/2P_2)}{\pi L\alpha_2 \{2\cos\theta_2 - (\Delta x/\Delta y)\sin\theta_2\}} + \frac{2}{2\Delta y/\tan\theta_2 + \Delta x} < -\frac{3}{2\Delta x}$$

$$-\frac{1}{2\Delta x} < \quad \text{Eq. (37)}$$

$$\frac{3\cos^{-1}(-P_0/2P_1)}{2\pi L\alpha_1 \{3\cos\theta_1 + (\Delta x/\Delta y)\sin\theta_1\}} - \frac{3}{3\Delta y/\tan\theta_1 + \Delta x} < \frac{1}{2\Delta x}$$

$$\frac{3}{2\Delta x} < \quad \text{Eq. (38)}$$

$$\frac{3\cos^{-1}(-P_0/2P_1)}{2\pi L\alpha_1 \{3\cos\theta_1 + (\Delta x/\Delta y)\sin\theta_1\}} + \frac{3}{3\Delta y/\tan\theta_1 + \Delta x} < \frac{5}{2\Delta x}$$

$$-\frac{1}{2\Delta x} < \quad \text{Eq. (39)}$$

$$\frac{3\cos^{-1}(-P_0/2P_2)}{2\pi L\alpha_2 \{3\cos\theta_2 + 2(\Delta x/\Delta y)\sin\theta_2\}} - \frac{3}{3\Delta y/\tan\theta_2 - 2\Delta x} < \frac{1}{2\Delta x}$$

$$-\frac{5}{2\Delta x} < \quad \text{Eq. (40)}$$

$$\frac{3\cos^{-1}(-P_0/2P_2)}{2\pi L\alpha_2 \{3\cos\theta_2 + 2(\Delta x/\Delta y)\sin\theta_2\}} + \frac{3}{3\Delta y/\tan\theta_2 - 2\Delta x} < -\frac{3}{2\Delta x}$$

$$\frac{3}{2\Delta x} < \frac{1}{X_1 + X_2} \left\{ \frac{1}{2} - \frac{Y_1 + Y_2}{2\Delta y} \right\} < \frac{5}{2\Delta x} \quad \text{Eq. (41)}$$

$$\frac{3}{2\Delta x} < \frac{1}{X_1 + X_2} \left\{ \frac{1}{2} + \frac{Y_1 + Y_2}{2\Delta y} \right\} < \frac{5}{2\Delta x} \quad \text{Eq. (42)}$$

$$\frac{1}{4\Delta y} < \frac{1}{Y_1 - Y_2} \left\{ \frac{1}{2} - \frac{X_1 - X_2}{\Delta x} \right\} < \frac{3}{4\Delta y} \quad \text{Eq. (43)}$$

$$\frac{1}{4\Delta y} < \frac{1}{Y_1 - Y_2} \left\{ \frac{1}{2} + \frac{X_1 - X_2}{\Delta x} \right\} < \frac{3}{4\Delta y} \quad \text{Eq. (44)}$$

$$\frac{3}{4\Delta y} < \frac{1}{Y_1 - Y_2} \left\{ \frac{1}{2} - \frac{X_1 - X_2}{\Delta x} \right\} < \frac{5}{4\Delta y} \quad \text{Eq. (45)}$$

$$\frac{3}{4\Delta y} < \frac{1}{Y_1 - Y_2} \left\{ \frac{1}{2} + \frac{X_1 - X_2}{\Delta x} \right\} < \frac{5}{4\Delta y} \quad \text{Eq. (46)}$$

$$\frac{1}{2\Delta x} < \frac{1}{X_1 + X_2} \left\{ \frac{1}{2} - \frac{Y_1 + Y_2}{2\Delta y} \right\} < \frac{3}{2\Delta x} \quad \text{Eq. (47)}$$

$$\frac{1}{2\Delta x} < \frac{1}{X_1 + X_2} \left\{ \frac{1}{2} + \frac{Y_1 + Y_2}{2\Delta y} \right\} < \frac{3}{2\Delta x} \quad \text{Eq. (48)}$$

$$\frac{1}{2\Delta x} < \frac{1}{X_1 + X_2} \left\{ \frac{1}{2} - \frac{Y_1 + Y_2}{3\Delta y} \right\} < \frac{3}{2\Delta x} \quad \text{Eq. (49)}$$

$$\frac{1}{2\Delta x} < \frac{1}{X_1 + X_2} \left\{ \frac{1}{2} + \frac{Y_1 + Y_2}{3\Delta y} \right\} < \frac{3}{2\Delta x} \quad \text{Eq. (50)}$$

$$\frac{5}{6\Delta y} < \frac{1}{Y_1 - Y_2} \left\{ \frac{1}{2} - \frac{X_1 - X_2}{\Delta x} \right\} < \frac{7}{6\Delta y} \quad \text{Eq. (51)}$$

$$\frac{5}{6\Delta y} < \frac{1}{Y_1 - Y_2} \left\{ \frac{1}{2} + \frac{X_1 - X_2}{\Delta x} \right\} < \frac{7}{6\Delta y} \quad \text{Eq. (52)}$$

$$-\frac{1}{2\Delta x} < \frac{\Delta y/2 - (Y_1 + Y_2)}{\Delta y(X_1 + X_2) + 1/2\Delta x(Y_1 + Y_2)} < \frac{1}{2\Delta x} \quad \text{Eq. (53)}$$

$$\frac{3}{2\Delta x} < \frac{\Delta y/2 + (Y_1 + Y_2)}{\Delta y(X_1 + X_2) + 1/2\Delta x(Y_1 + Y_2)} < \frac{5}{2\Delta x} \quad \text{Eq. (54)}$$

$$-\frac{1}{2\Delta x} < \frac{\Delta y/2 - (Y_1 - Y_2)}{\Delta y(X_1 - X_2) - 1/2\Delta x(Y_1 - Y_2)} < \frac{1}{2\Delta x} \quad \text{Eq. (55)}$$

$$-\frac{5}{2\Delta x} < \frac{\Delta y/2 + (Y_1 - Y_2)}{\Delta y(X_1 - X_2) - 1/2\Delta x(Y_1 - Y_2)} < -\frac{3}{2\Delta x} \quad \text{Eq. (56)}$$

$$-\frac{1}{2\Delta x} < \frac{\Delta y/2 - (Y_1 + Y_2)}{\Delta y(X_1 + X_2) + 1/3\Delta x(Y_1 + Y_2)} < \frac{1}{2\Delta x} \quad \text{Eq. (57)}$$

-continued $$\frac{3}{2\Delta x} < \frac{\Delta y/2 + (Y_1 + Y_2)}{\Delta y(X_1 + X_2) + 1/3\Delta x(Y_1 + Y_2)} < \frac{5}{2\Delta x} \quad \text{Eq. (58)}$$

$$-\frac{1}{2\Delta x} < \frac{\Delta y/2 - (Y_1 - Y_2)}{\Delta y(X_1 - X_2) - 2/3\Delta x(Y_1 - Y_2)} < \frac{1}{2\Delta x} \quad \text{Eq. (59)}$$

$$-\frac{5}{2\Delta x} < \frac{\Delta y/2 + (Y_1 - Y_2)}{\Delta y(X_1 - X_2) - 2/3\Delta x(Y_1 - Y_2)} < -\frac{3}{2\Delta x} \quad \text{Eq. (60)}$$

The present invention provides not only an image display device but also the optical low-pass filter used in the image display device having the features described above.

Other features of the present invention will become clear from the description of the embodiment.

BRIEF DESCRIPTION OF THE DRAWINGS

FIG. 27 is a graph showing the wavelength dependence characteristic of MTF plotted against cut-off spatial frequency;

DESCRIPTION OF THE PREFERRED EMBODIMENT (1) Premises

An optical low-pass filter is implemented by a phase grating or quartz plate which functions to split (branch) light. The optical low-pass filter is placed on the display (front) surface of an image display device. By virtue of the light splitting function thereof, the optical low-pass filter forms a virtual (an imaginary) image of each pixel between pixels and eliminates or reduces the roughness of an image.

Figure 1:
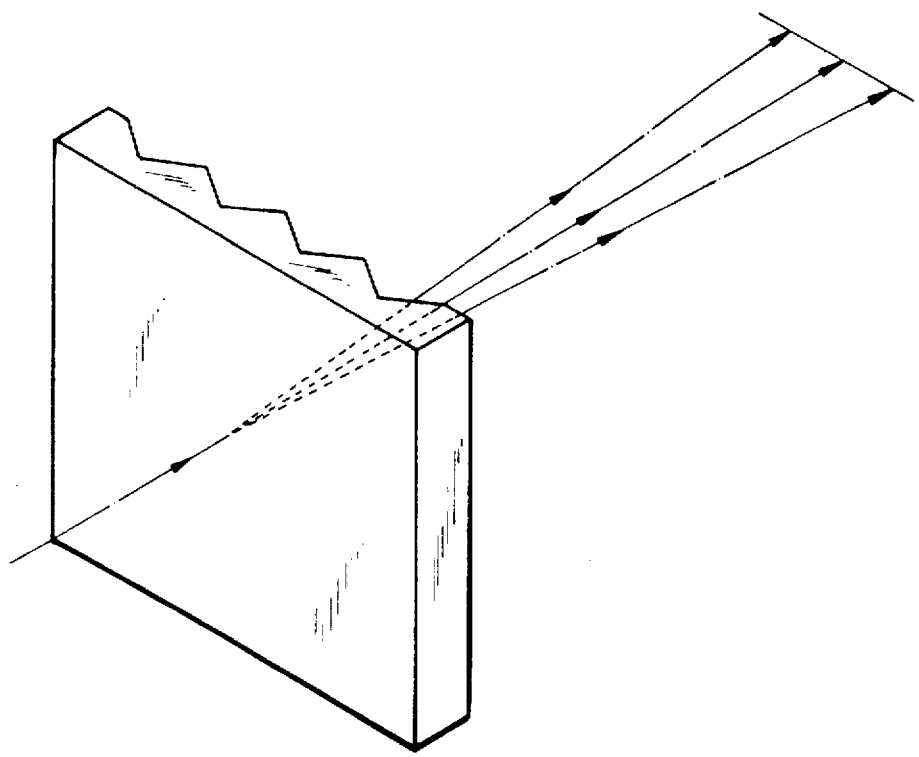
FIG. 1 is a perspective view showing diffraction of light by a one-dimensional phase grating.

FIG. 1 illustrates a one-dimensional phase grating. Light incident upon the diffraction grating is separated into light of order 0(0th-order) and diffracted light of orders ±1 (±1st-orders) on both sides of the 0th-order light. (Higher-order diffracted light of order 2 (2nd-order) or greater is not shown.)

Figure 2:
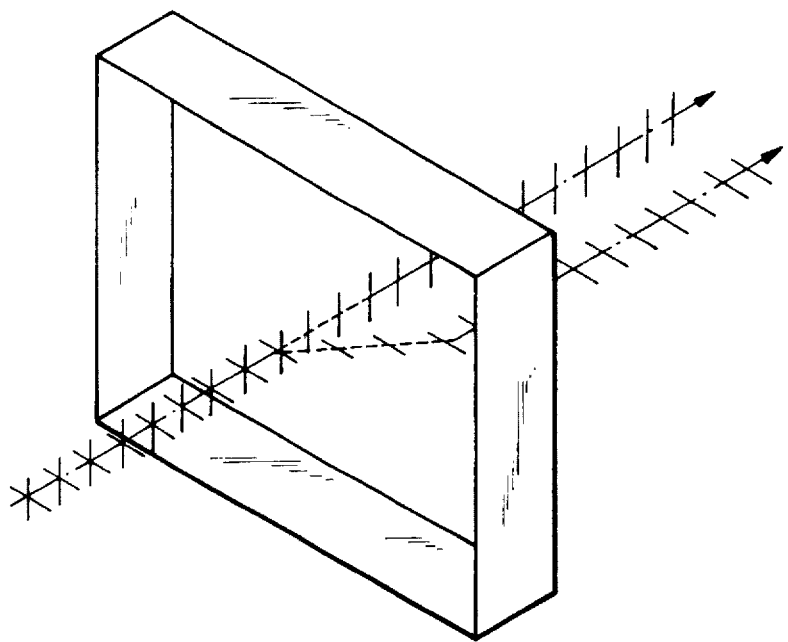
FIG. 2 is a perspective view showing a quartz plate.

FIG. 2 illustrates a quartz plate. Light incident upon the quartz plate is separated into two parallel light rays of equal intensity which vibrate in directions perpendicular to each other.

Figure 3:
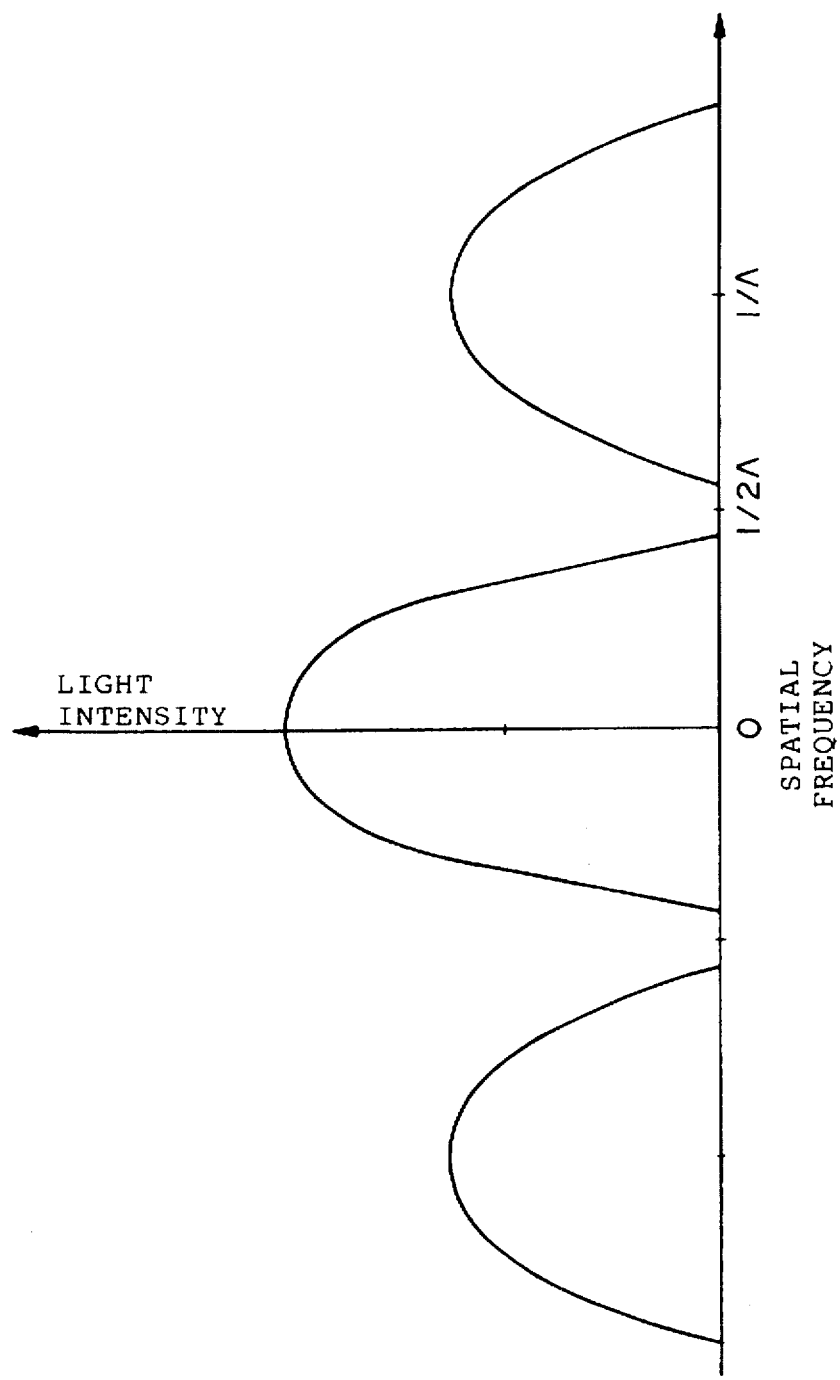
FIG. 3 is a graph showing spatial frequency versus the light-intensity distribution of a displayed image.
Figure 4:
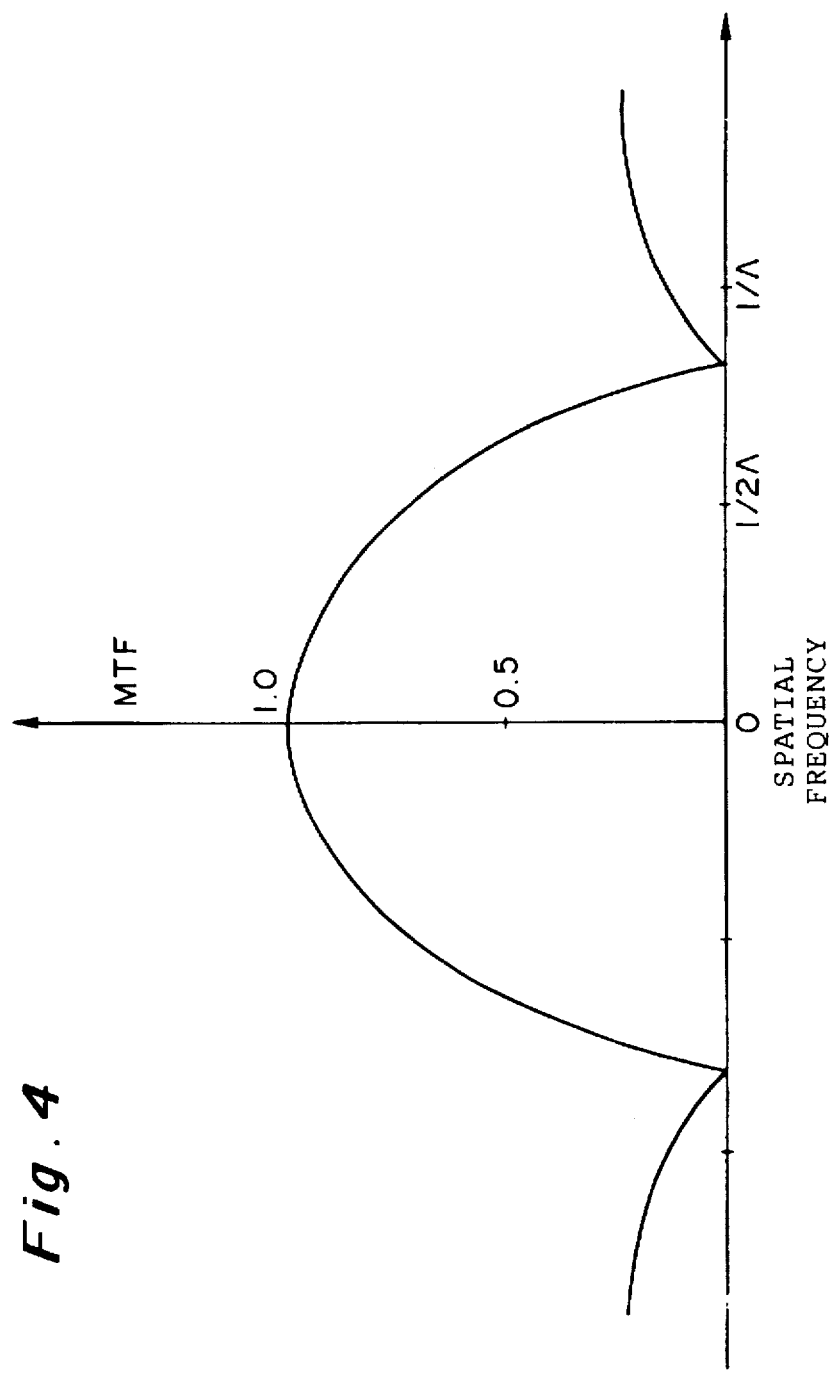
FIG. 4 is a graph showing the MTF characteristic of an optical low-pass filter.
Figure 5:
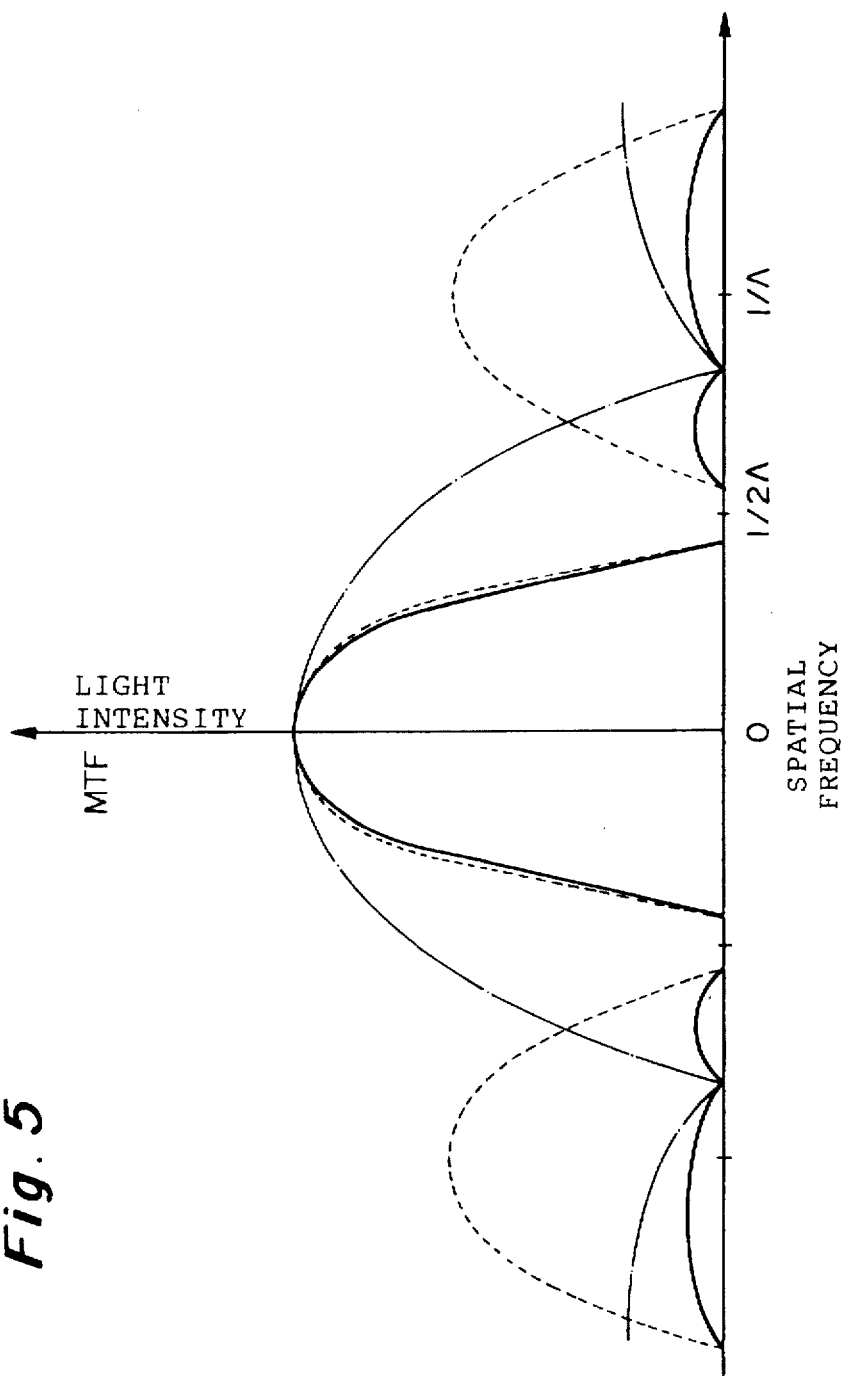
FIG. 5 is a graph showing spatial frequency versus the light-intensity distribution of a displayed image when the optical low-pass filter has been attached.

FIGS. 3 through 5 illustrate the action of the optical low-pass filter in one dimension.

FIG. 3 shows the light-intensity distribution of a display image plotted against spatial frequency, which is shown along the horizontal axis. In FIG. 3, Λ represents the period (pitch or pixel spacing) of pixels in one dimension (in one direction), and 1/Λ is referred to as the sampling frequency (pixel frequency). The light-intensity distribution centered on a spatial frequency of 0 depends upon the image represented by a video signal applied to the display device. Light-intensity distributions of an image which appear centered on frequencies that are whole-number multiples (1/Λ, 2/Λ, 3/Λ) of the sampling frequency represent noise which causes image roughness.

FIG. 4 illustrates an example of the MTF (modulation transfer function, namely the optical transmission characteristic with respect to spatial frequency) of an optical low-pass filter. [In this example, the cut-off spatial frequency (the position at which MTF=0 holds) has been determined appropriately.] The MTF is found by a Fourier transform of a point spread function.

FIG. 5 illustrates an output light-intensity distribution (an image seen by the eye) obtained when an optical low-pass filter having the MTF shown in FIG. 4 is placed in front of a display image having the light-intensity distribution shown in FIG. 3. The dot lines in FIG. 5 indicate the light-intensity distribution shown in FIG. 3 and the dot-and-dash lines represent the MTF of the optical low-pass filter shown in FIG. 4. It will be understood that most of the light-intensity distribution representing the image to be displayed originally (namely the image represented by the input video signal) remains and that the noise which causes the roughening of the image has been reduced to a significant degree.

Figure 6:
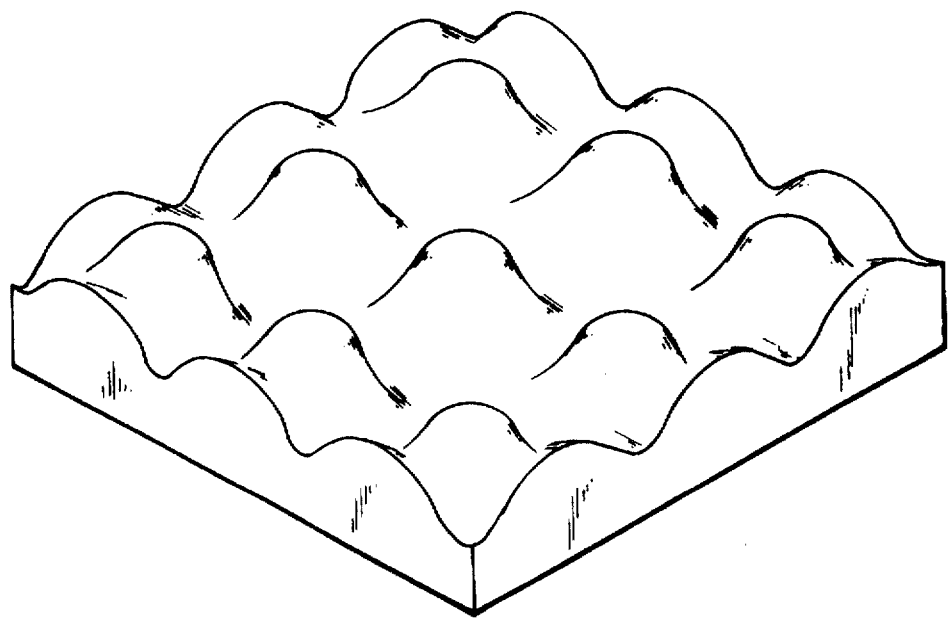
FIG. 6 is a perspective view of a sinusoidal phase grating.
Figure 7:
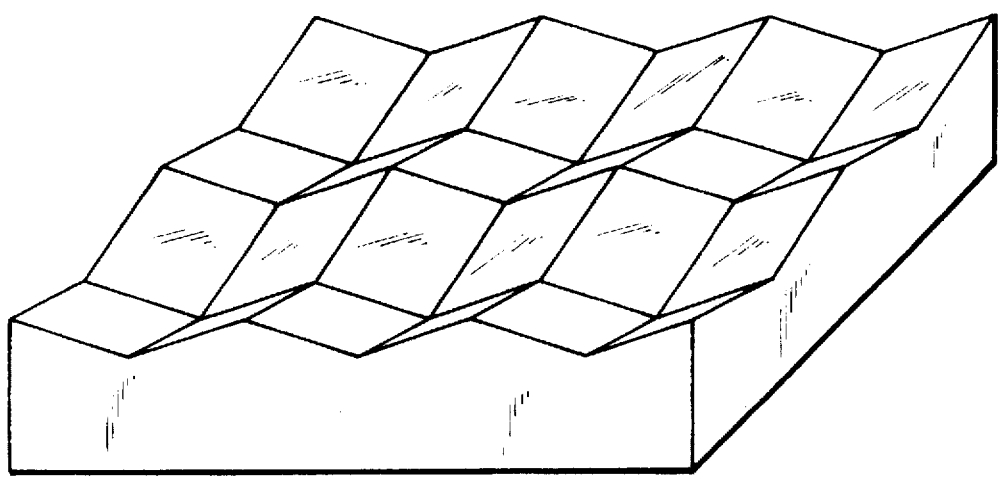
FIG. 7 is a perspective view of a triangular phase grating.

FIGS. 6 and 7 illustrate examples of two-dimensional phase gratings. FIG. 6 shows a sinusoidal phase grating. The projections and depressions on the irregular surface of this phase grating has a two-dimensional spread and changes sinusoidally. The phase grating of FIG. 7 is referred to as a triangular phase grating the surface of which varies in triangular fashion in two dimensions. The change in one direction may have the form of a triangular wave while the change in the perpendicular direction may have the form of a sawtooth. Furthermore, the phase grating may have a surface which varies in step-like form (rectangular form) in one or two directions.

Such a two-dimensional phase grating acts as an optical low-pass filter. Other examples of arrangements of optical low-pass filters will be described later.

These optical low-pass filters can be fabricated by milling (cutting), injection molding, sheet molding or molding using a stamper, etc. Examples of the material of the optical low-pass filter are glass or transparent resins such as polymethyl methacrylate (PMMA) (generally an acrylic resin), a resin cured by ultraviolet radiation (UV setting resin), polycarbonate (PC), etc.

Figure 8:
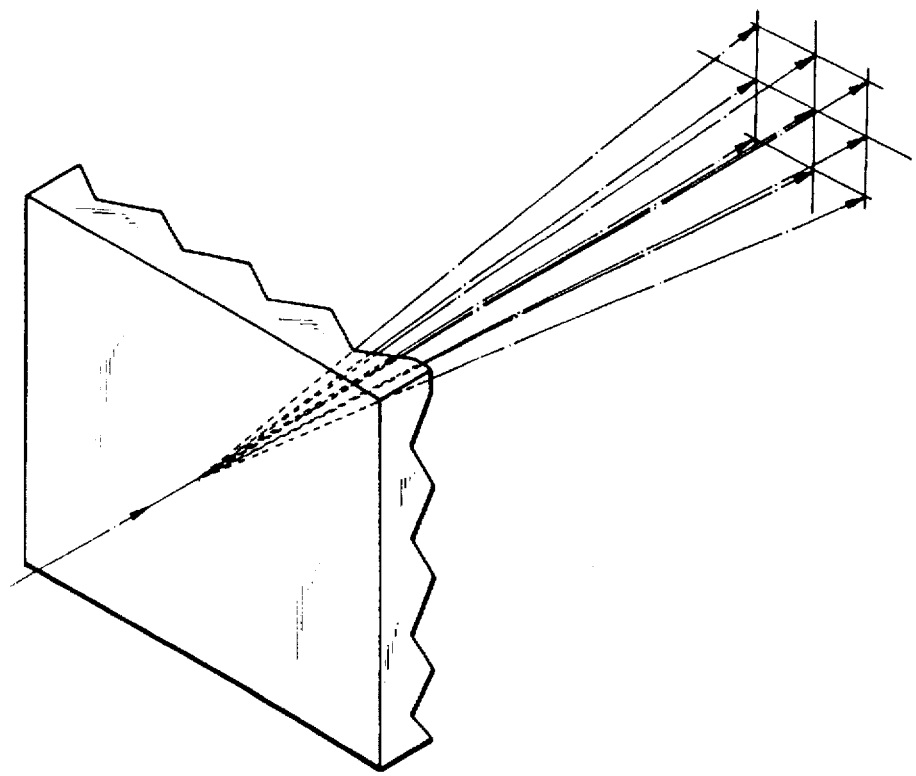
FIG. 8 is a perspective view showing diffraction of light by a two-dimensional phase grating.
Figure 9:
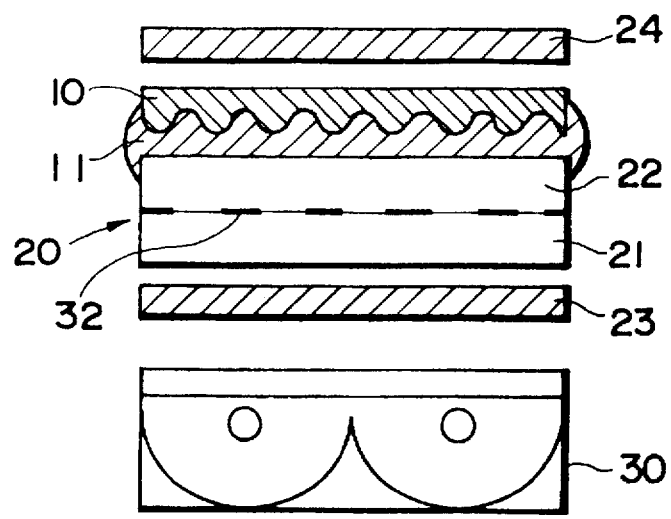
FIG. 9 is a sectional view schematically illustrating an example of the construction of a liquid-crystal display device.

FIG. 8 illustrates the manner in which light is split (caused to branch) in a two-dimensional phase grating (the grating of FIG. 7 by way of example) the projections and depressions on the surface of which varies in two mutually perpendicular directions. Eight diffracted light rays of order 1 are produced about a central light ray of order 0. (Higher-order diffracted light of order 2 or greater is not shown.) FIG. 9 schematically illustrates the structure of a liquid-crystal display device having an optical low-pass filter. In FIG. 9, the liquid-crystal panel and other structural elements are drawn in fairly enlarged size in the direction of thickness but in considerably reduced size in the direction of length (or width) (i.e., the number of pixels or dots is shown to be much reduced in this direction). This holds for FIG. 10 as well.

A liquid-crystal panel 20 has two glass substrates 21, 22 defining a small gap filled with liquid crystal. The dashed line drawn between the two glass substrates 21 and 22 represents a black matrix (the details of which will be described later).

An optical low-pass filter (having the structure shown in FIG. 6) 10 is bonded by a bonding layer 11 to the outer side of one glass substrate 22 of the liquid-crystal panel 20. It is preferred that the sinusoidal waveform surface (the surface having the optical function) of the optical low-pass filter 10 be faced toward the glass substrate 22. The glass substrate 22 and the optical low-pass filter 10 are disposed accurately so as to lie parallel to each other.

The bonding layer 11 consists of a bonding resin such as a UV setting resin , an epoxy resin, etc.

Polarizing plates 23, 24 are placed on either side of the liquid-crystal panel 20 to one surface of which the optical low-pass filter 10 has been adhered. A light source (for back-lighting) 30 is disposed on one side of the panel 20. This completes the construction of the liquid-crystal display device.

Figure 10:
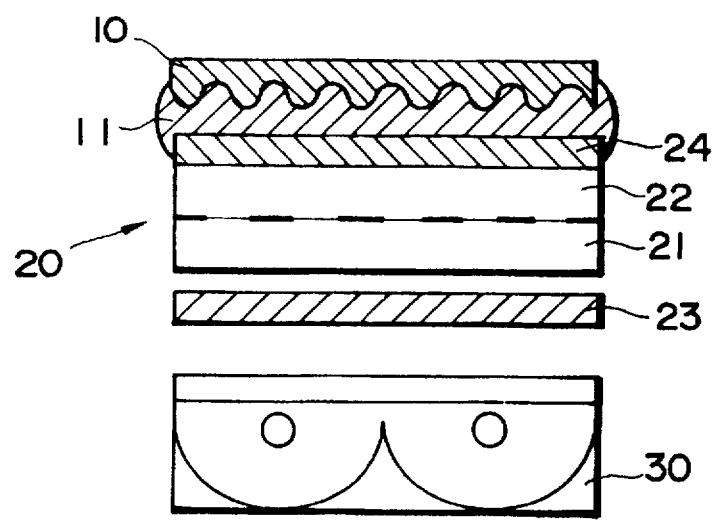
FIG. 10 is a sectional view schematically illustrating another example of the construction of a liquid-crystal display device.

FIG. 10 illustrates another example of the construction of a liquid-crystal display device.

Here the polarizing plate 24 is joined (in a bonded or adhered state) to the glass substrate 22 of the liquid-crystal panel 20. The polarizing plate 24 and optical low-pass filter 10 are bonded together by an bonding layer 11. Other structural elements are the same as those shown in FIG. 9.

Thus, the optical low-pass filter can be placed in front of the display surface of the display device in a variety of modes. The bonding layer 11 is not always necessary.

Figure 11:
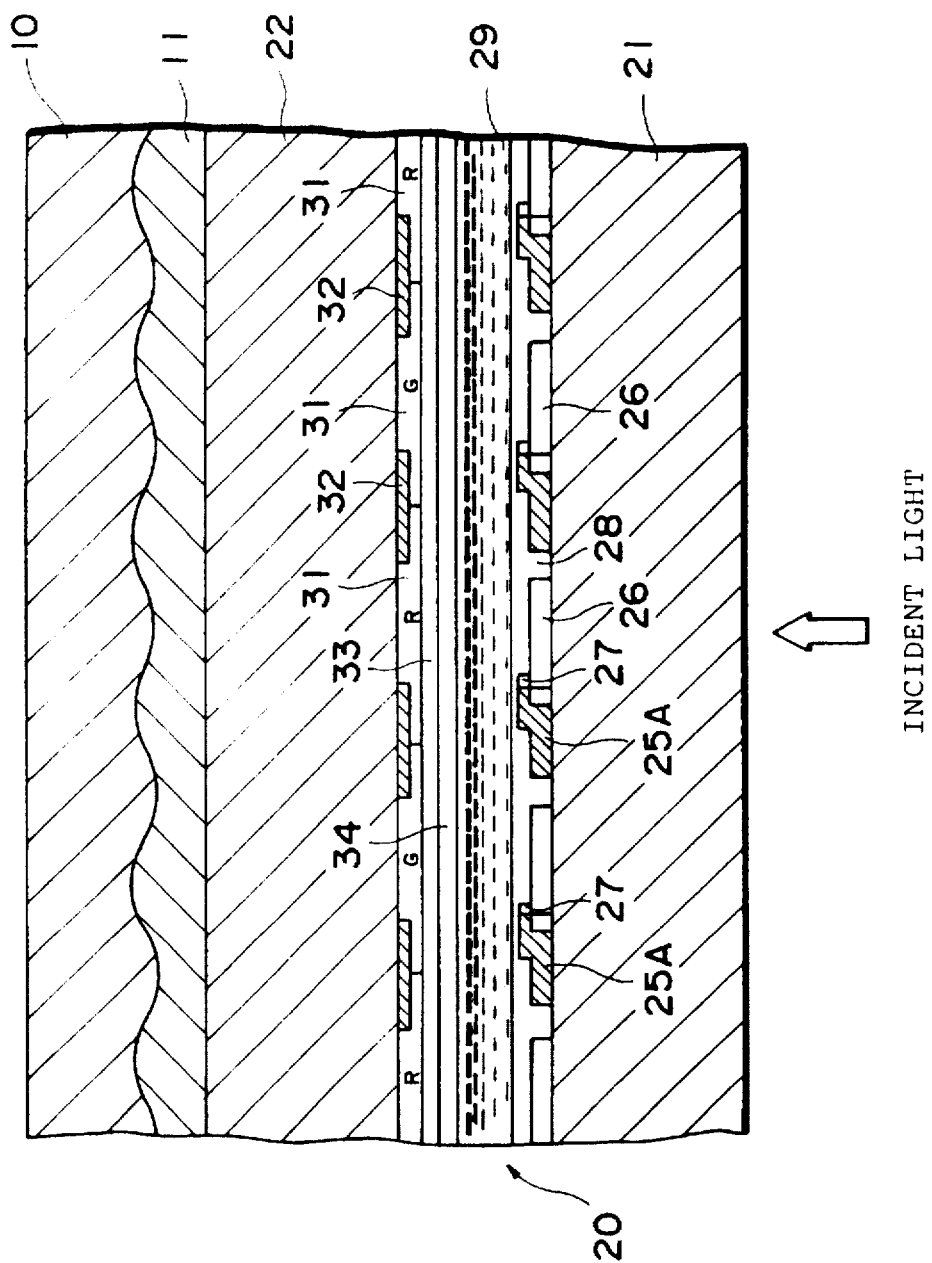
FIG. 11 is an enlarged sectional view of the liquid-crystal display device.
Figure 12:
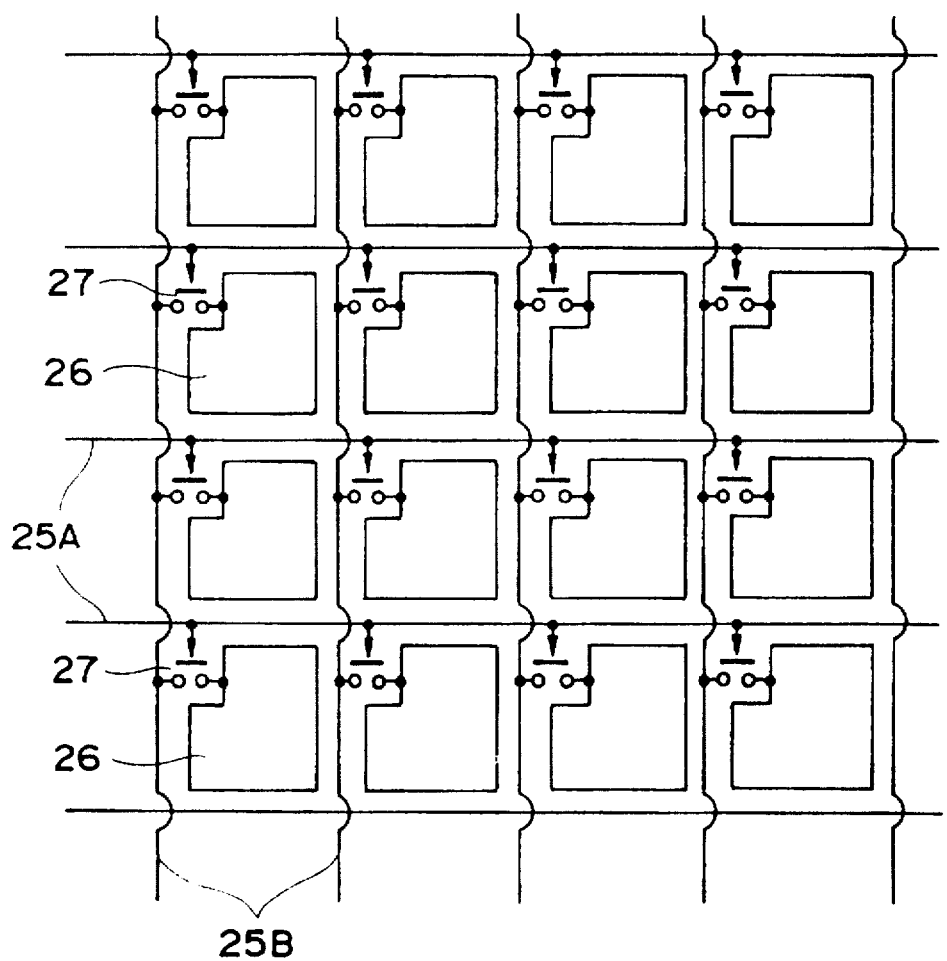
FIG. 12 is an equivalent circuit diagram of a wiring pattern on a glass substrate in the liquid-crystal display device.

FIG. 11 illustrates part of the enlarged cross section of the liquid-crystal panel 20 and optical low-pass filter 10 bonded thereto. Here insulating films and the internal structure of switching elements are not shown. FIG. 12 shows an equivalent circuit of pixel electrodes, switching elements and conductive wiring patterns formed on the surface of one of the two glass substrates 21, 22 constructing the liquid-crystal panel 20. For the sake of simplicity, the pixel electrodes (apertures) are illustrated in the form of a square arrangement (to be described later).

As shown in these drawings, the liquid-crystal panel 20 basically comprises the two glass substrates 21 and 22 arranged with the small (e.g., 5 μm) gap between them, and a liquid crystal 29 filling the gap between the glass substrates 21 and 22.

A number of equally spaced scanning electrodes 25A and a number of equally spaced signal electrodes 25B are formed horizontally and vertically, respectively, on the inner surface of one glass substrate 21. The scanning electrodes 25A and the signal electrodes 25B are insulated from each other. (In FIG. 11, the signal electrodes 25B are deleted from the drawing.)

Pixel electrodes 26 are formed in a matrix array and in a mutually insulated state on the inner surface of the glass substrate 21 in areas bounded by the scanning electrodes 25A and signal electrodes 25B. Each pixel electrode 26 is connected to its adjacent signal electrode 25B via a three-terminal switching element (e.g., a thin-film transistor comprising a FET) 27. Each switching element 27 has a control terminal (a gate terminal, for example) connected to its adjacent scanning electrode 25A. An alignment film 28 is formed on the entire inner surface of the glass substrate 21 so as to cover the electrodes 25A, 25B.

Color filters for the colors R, G and B are formed on the inner surface of the other glass substrate 22 at positions corresponding to the pixel electrodes 26, and light shielding films (black matrices) 32 are formed on the inner surface of the other glass substrate 22 at positions corresponding to the scanning electrodes 25A and signal electrodes 25B. It is well known that the arrangements of the color filters 31 include a delta arrangement (inclusive of a square arrangement), a mosaic arrangement and a stripe arrangement, as will be discussed later.

A common electrode 33 is formed on the entire inner surface of the glass substrate 22 so as to cover the color filters 31, and an alignment film 34 is formed on the common electrode 33.

The pixel electrodes 26 and the common electrode 33 consist of a transparent conductive film (an ITO film, for example). The scanning electrodes 25A, signal electrodes 25B and shielding films 32, on the other hand, are non-transparent films of metal or the like. Accordingly, incident light can pass through only the areas of the pixel electrodes 26 bounded by the scanning electrodes 25A and signal electrodes 25B. (These areas coincide with the areas not covered by the shielding films 32.) The areas through which light is capable of passing are apertures or pixels.

Figure 13:
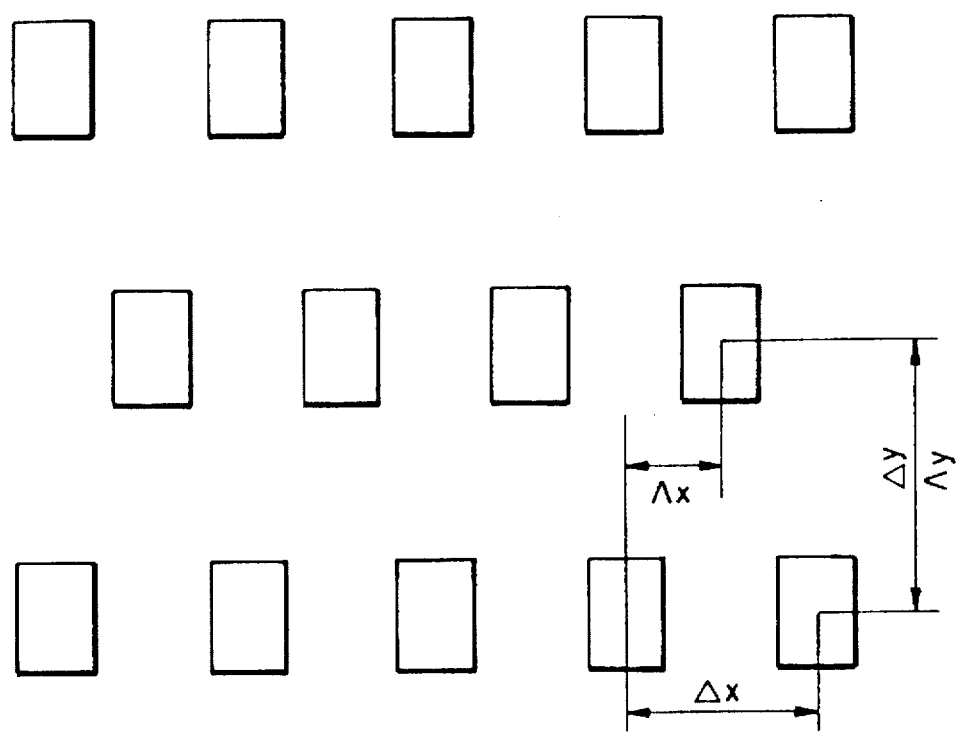
FIG. 13 illustrates the arrangement of pixels (apertures) in a liquid-crystal panel.
Figure 23:
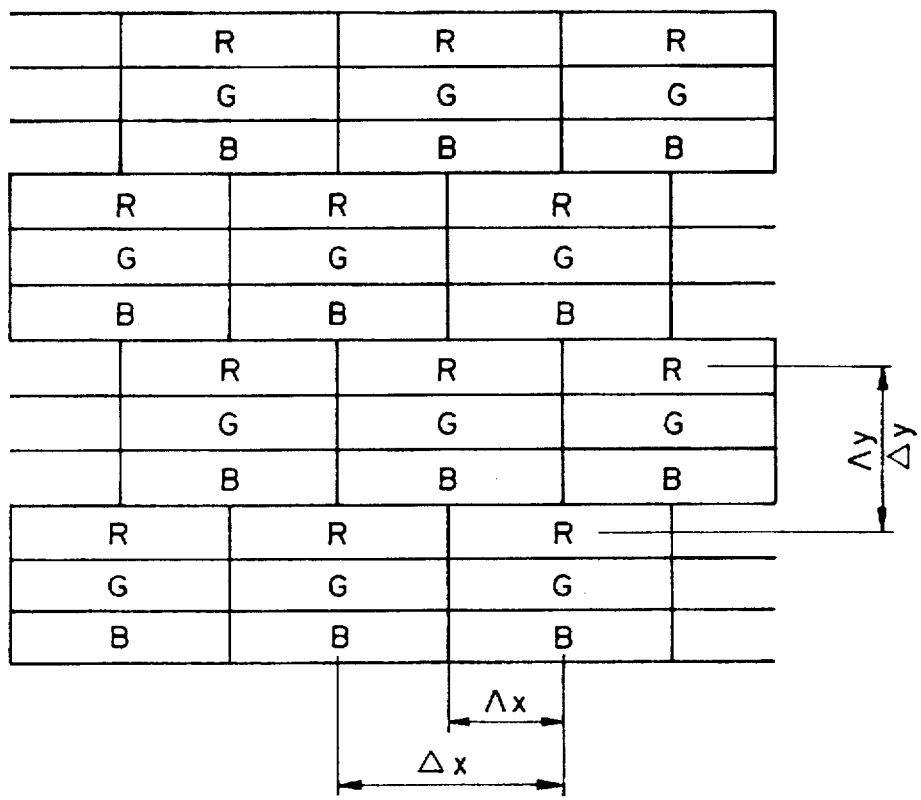
FIG. 23 illustrates an example of a delta arrangement of pixels in a color display device.
Figure 24:
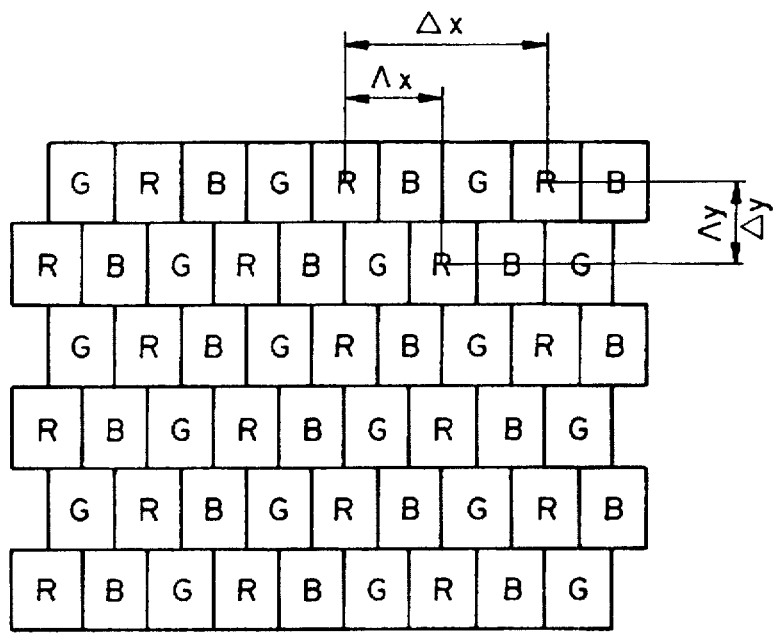
FIG. 24 illustrates another example of a delta arrangement of pixels in a color display device.

FIG. 13 illustrates the arrangement of apertures (pixels) of the liquid-crystal panel in the liquid-crystal display device described above. This is a delta arrangement. (FIG. 13 shows the delta arrangement in a monochromatic image display device. A delta arrangement in a color image display device is illustrated in FIGS. 23 and 24.) In the delta arrangement for both the monochromatic image display and color image display, let $\Delta x$, $\Delta y$ represent the pixel periods along the X direction (transverse or horizontal direction) and Y direction (longitudinal or vertical direction), respectively, and let $\Lambda_x$, $\Lambda_y$ represent pixel periods which takes the neighboring pixel rows into account. In a delta arrangement, $\Lambda_x = \Delta x/2$, $\Lambda_y = \Delta y$ hold.

Figure 14:
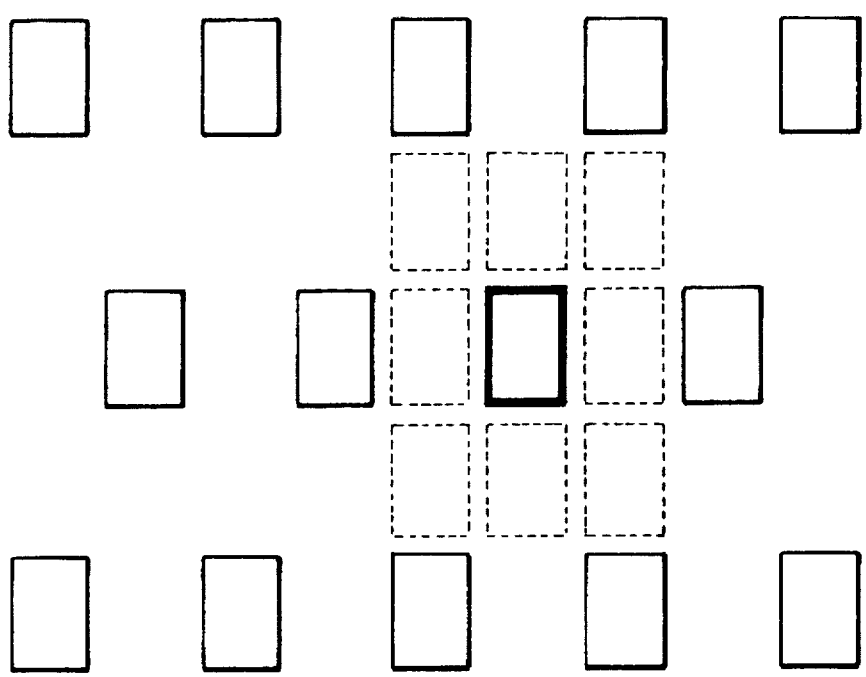
FIG. 14 illustrates the manner in which virtual images of pixels are formed by an optical low-pass filter.

FIG. 14 illustrates virtual images produced when a two-dimensional optical low-pass filter is placed on the front surface of a liquid-crystal panel having the pixel arrangement shown in FIG. 13. The eight images indicated by the dot lines are virtual images of the pixel indicated by the bold solid lines. This is a phenomenon produced as a result of light representing an image being split by the optical low-pass filter, as shown in FIG. 8. The virtual images of the pixel are formed between pixels by the light-splitting function of the optical low-pass filter, and thus it will be understood that roughness is reduced or eliminated as a result.

Figure 15:
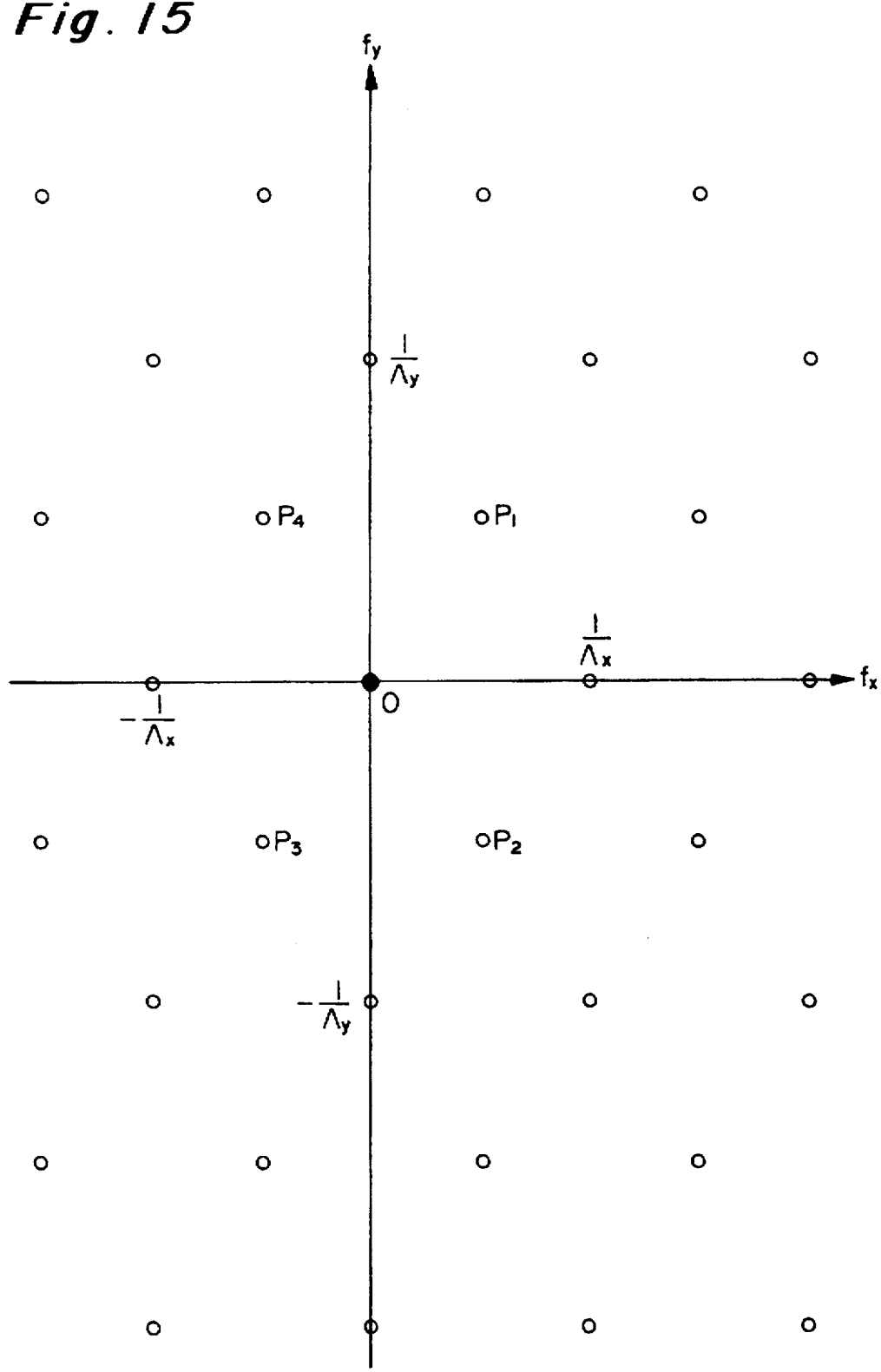
FIG. 15 illustrates a distribution of sampling frequencies produced by a delta arrangement of pixels.

The sampling frequencies which arise from a pixel arrangement causing roughness of a displayed image are obtained by subjecting the positions at which the pixels are arranged to a Fourier transform. The sampling frequencies produced by the delta pixel arrangement are distributed in two-dimensional spatial frequency space in the manner shown in FIG. 15. (FIG. 15 illustrates sampling frequencies produced by an arrangement of pixels of one color in the delta array depicted in FIG. 24.) In FIG. 15, the white circles indicate the positions of sampling frequencies produced by the pixel arrangement. The black circle merely indicates the origin of the frequency space. Further, $f_x$ represents spatial frequency in the X direction and $f_y$ spatial frequency in the Y direction.

In the same manner as described in connection with one-dimensional space using FIG. 3, the frequency of noise which produces roughness is distributed about each point of these sampling frequencies in two-dimensional frequency space (FIG. 15) as well.

In a displayed image of the delta-arrangement type, noise having frequencies in the vicinity of positions $P_1$, $P_2$, $P_3$, $P_4$ where frequency is low and light intensity is high is the most conspicuous to the eye.

Figure 16:
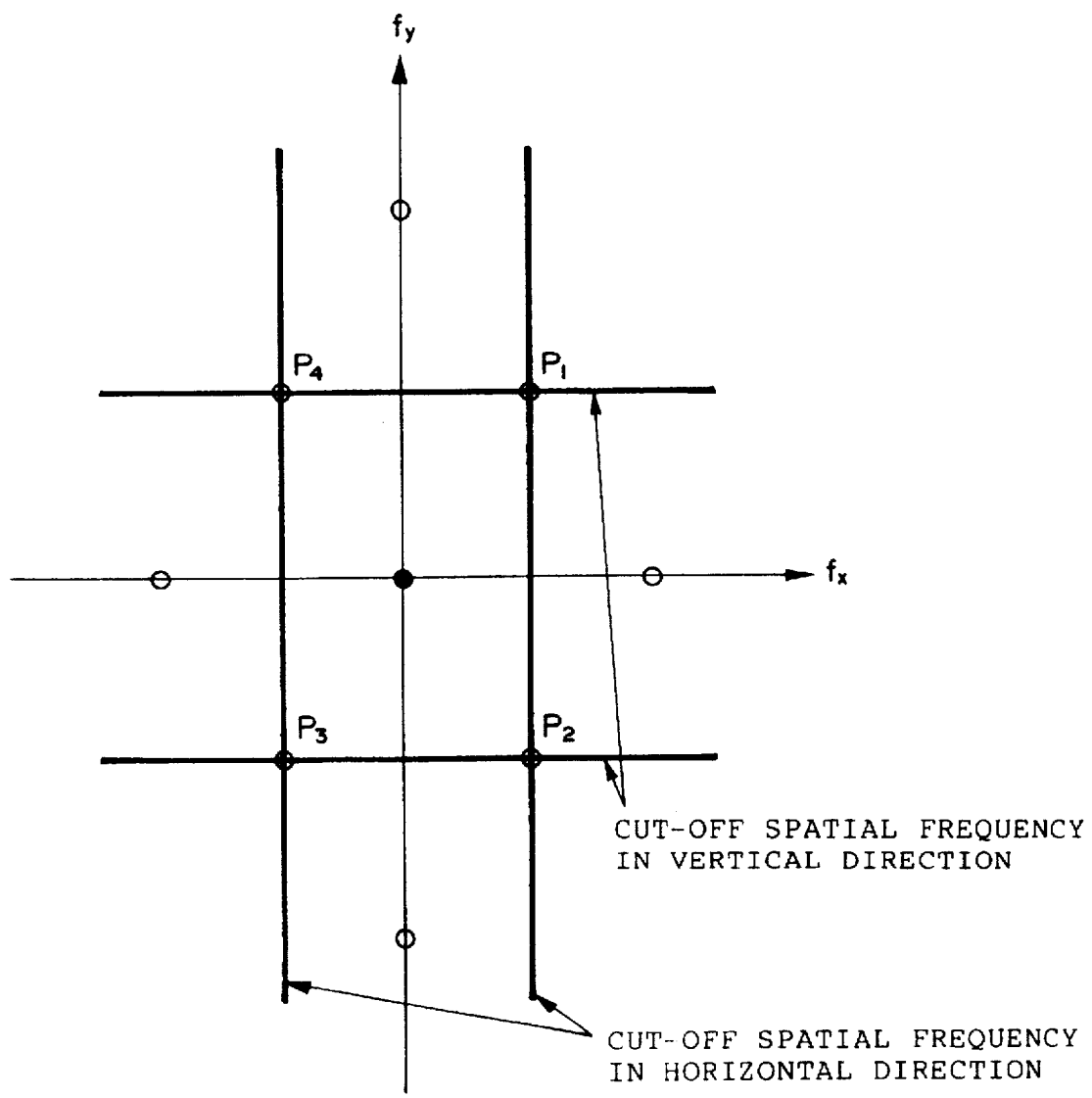
FIG. 16 illustrates cut-off spatial frequencies for maximum reduction of noise components.

In order to eliminate or reduce this noise that is most noticeable, the cut-off spatial frequencies (frequencies at which MTF=0 holds) in the horizontal and vertical directions of an optical low-pass filter tend to be set at the positions $P_1 \sim P_4$, as illustrated in FIG. 16. The reason for this is that image roughness can be suppressed most effectively by such a setting. The bold solid lines in FIG. 16 indicate the lines of cut-off spatial frequencies at which MTF=0 holds.

However, as described in the background of the invention, display devices having numerous pixels for a high picture quality intrinsically exhibit little roughness and provide a high resolution. Though an optical low-pass filter reduces roughness, it also causes blurring of the image (a reduction in the intensity of light representing images having a low spatial frequency) and therefore acts to lower resolution (governed by the spatial frequency at MTF=0). (In other words, what is lowered is the maximum spatial frequency of the light which passes through the optical low-pass filter).

A method of optimizing MTF in order to provide an optical low-pass filter that is capable of maintaining a high resolution without unduly sacrificing the effect of roughness reduction will now be described.

(2) Basic Principles (Part 1: Rectangular Type)

The delta arrangement will be described first.

In general, innumerable sampling frequencies produced by a two-dimensional pixel arrangement are all represented by a synthesis of two basic frequencies.

Figure 17:
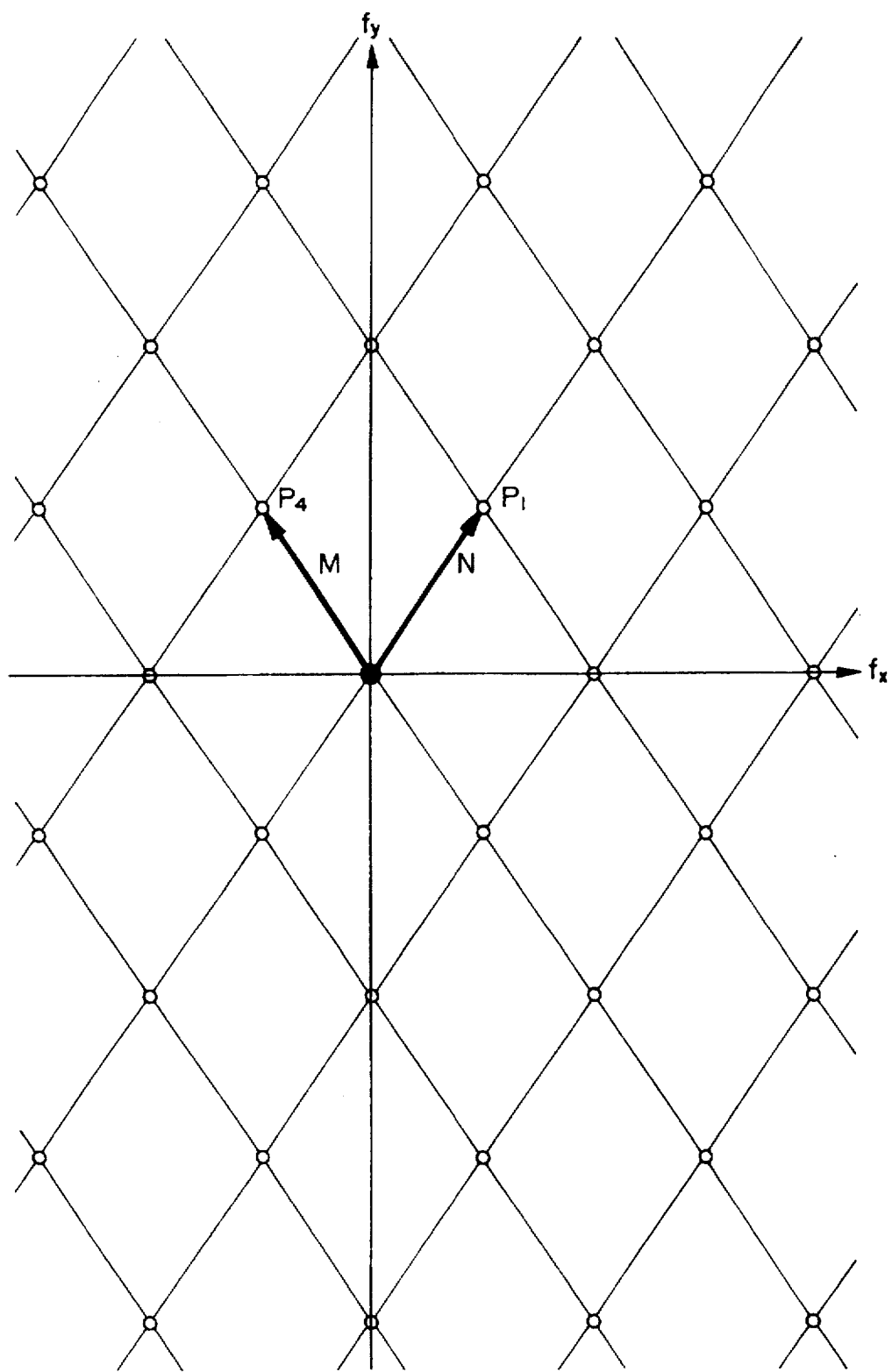
FIG. 17 illustrates basic frequency vectors.

FIG. 17 illustrates the distribution of sampling frequencies in the delta arrangement illustrated previously. Consider two vectors M, N pointing from the origin of the two-dimensional frequency coordinate system toward two different sampling frequencies at the positions closest to the origin (positions $P_1$ and $P_4$). These vectors are adopted as two basic frequency vectors.

All of the sampling frequencies distributed in the two-dimensional frequency coordinate system $f_x$, $f_y$ can be expressed by the resultant of these two basic frequency vectors M and N. Conversely speaking, the two vectors that are capable of synthesizing all sampling frequencies are referred to as basic frequency vectors.

As mentioned above, an optical low-pass filter splits light into two directions, namely the vertical and horizontal directions, and possesses an MTF in each direction.

Further, noise in the vicinity of the sampling frequencies $P_1$, $P_2$, $P_3$, $P_4$ exhibits the strongest light intensity and a low frequency.

Accordingly, at the sampling frequencies $P_1$, $P_2$, $P_3$, $P_4$ which have the strongest light intensities and at which the low-frequency noise components are distributed, the MTF in one of the two directions is made zero to reduce the noise components that are most noticeable.

Figure 18:
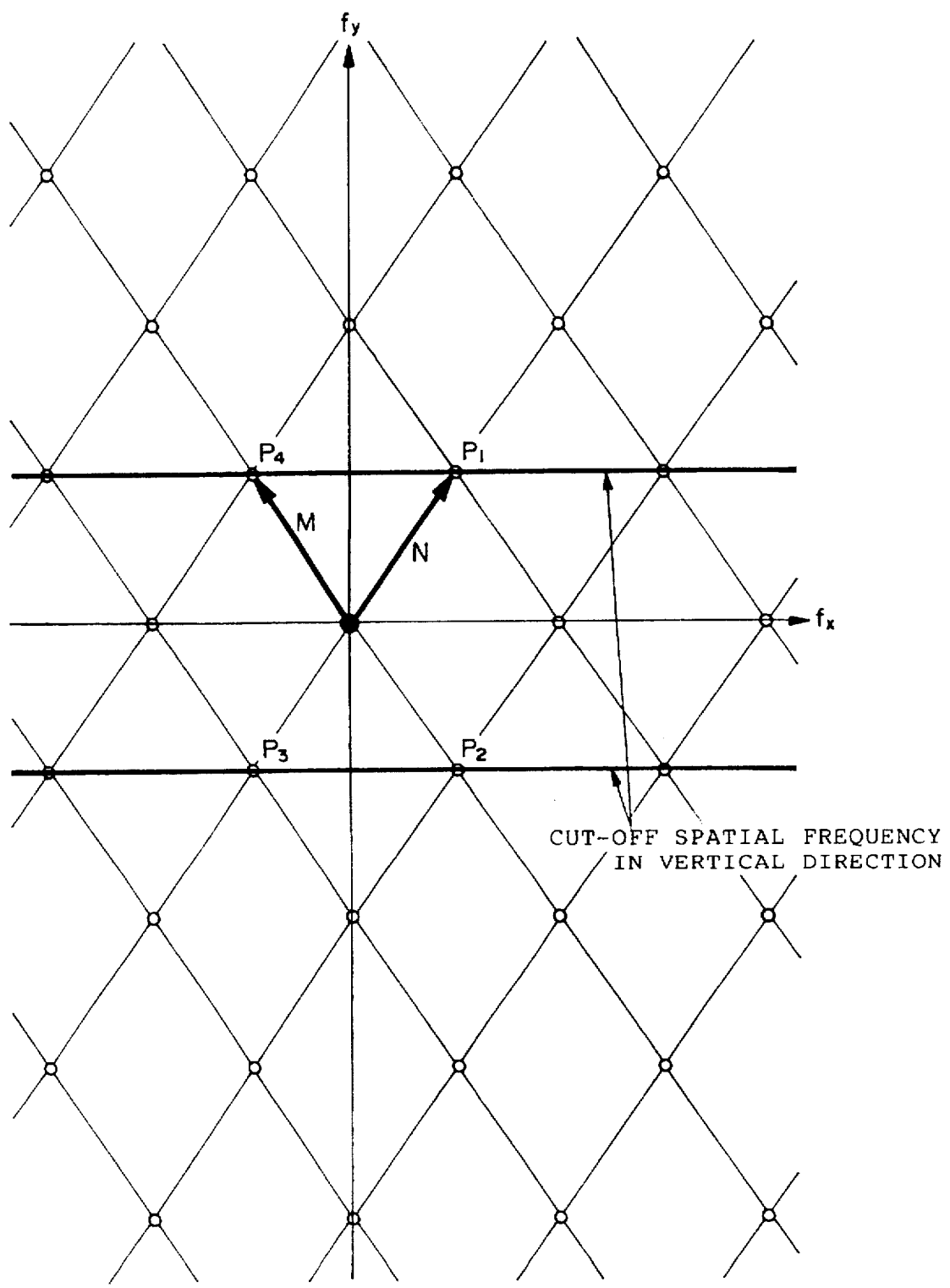
FIG. 18 illustrates cut-off spatial frequencies, in the vertical direction, decided by basic frequency vectors.

FIG. 18 illustrates the manner in which cut-off spatial frequencies in the vertical direction are set so as to pass through the four sampling frequencies $P_1$, $P_2$, $P_3$, $P_4$ represented by ±M and ±N.

Figure 19:
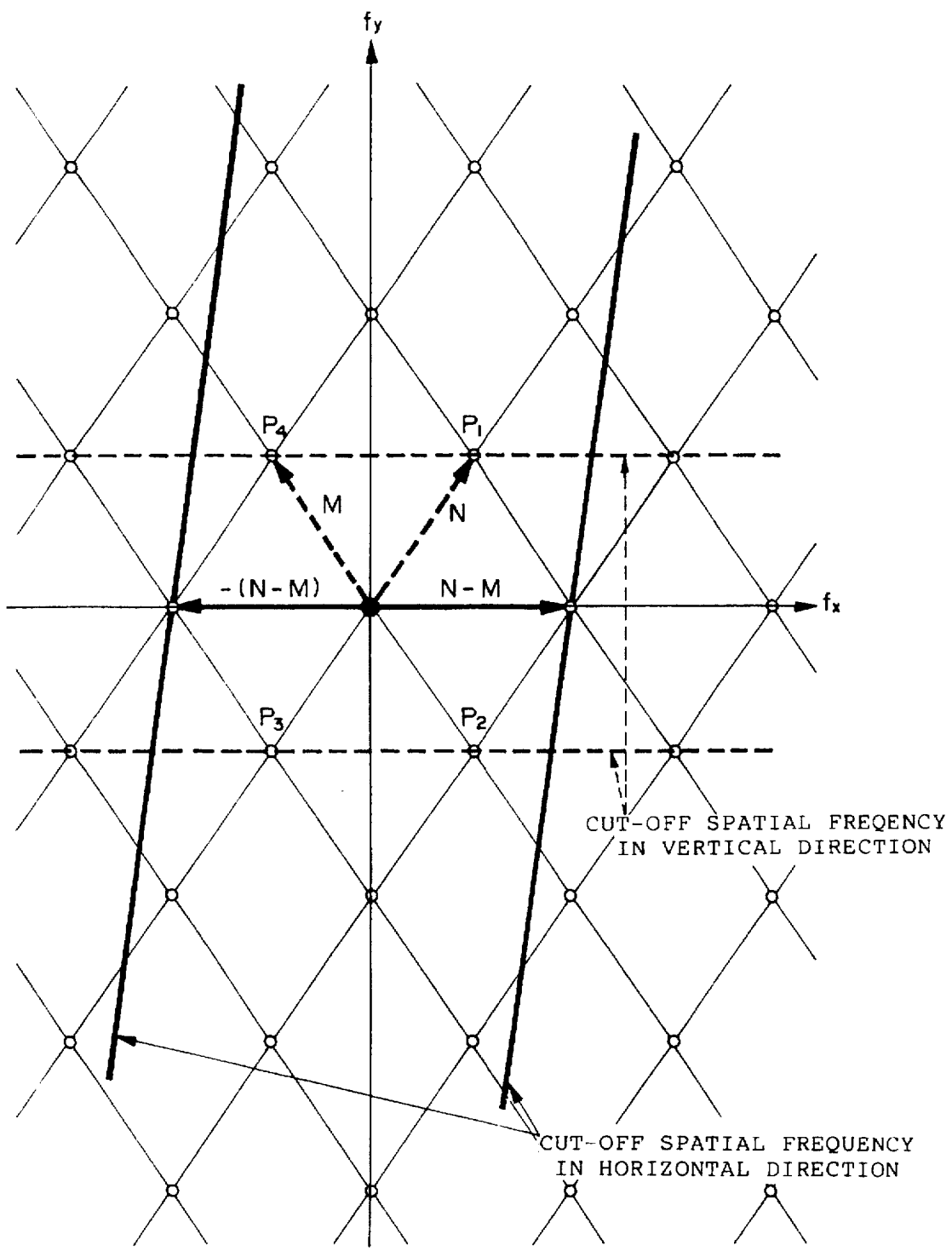
FIG. 19 illustrates a general example of cut-off spatial frequencies, in the horizontal direction, decided by the difference between basic frequency vectors.

The sampling frequencies for which the light intensity is second largest and the frequency the second lowest are ±(N–M). Accordingly, as shown in FIG. 19, cut-off spatial frequencies in the horizontal direction are set so as to pass through sampling frequencies ±(N–M). The lines (shown by the solid lines) indicating the cut-off spatial frequencies in the horizontal direction are drawn diagonally in order to express generality.

Figure 20:
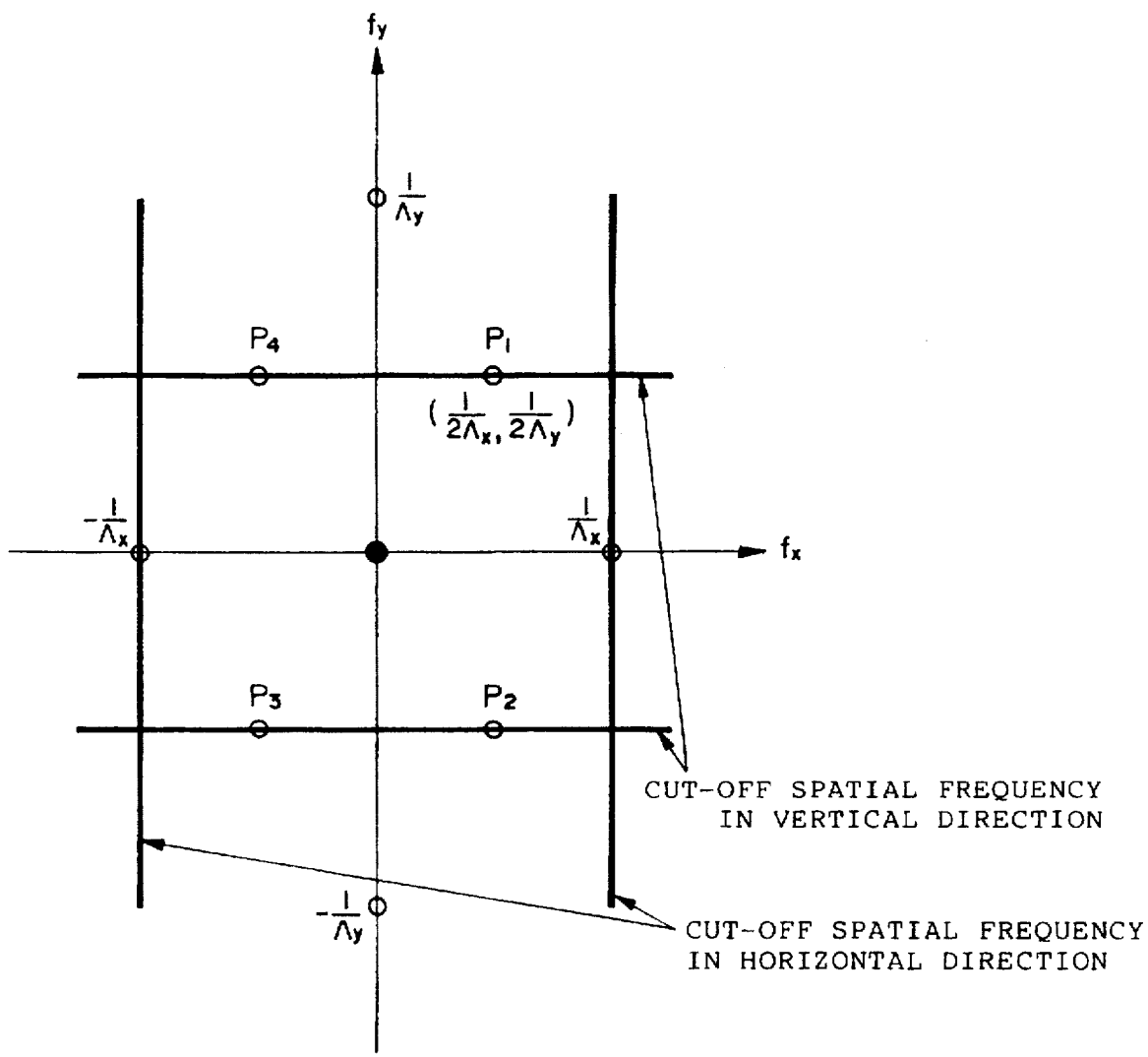
FIG. 20 illustrates cut-off spatial frequencies in the horizontal and vertical directions, with resolution being made symmetrical.

If cut-off spatial frequency in the horizontal direction is set to be parallel to the $f_y$ axis, then the result is as shown in FIG. 20. Resolving power along the X axis (the horizontal direction) is symmetrical with respect to the Y axis (the vertical direction). The range delimited by the cut-off spatial frequencies with the vertical and horizontal directions is rectangular.

The area bounded by the cut-off spatial frequencies shown in FIG. 19 or 20 is twice the area bounded by the cut-off spatial frequencies illustrated in FIG. 16 and the resolution (resolving power in the horizontal direction in this example) is doubled. More specifically, a high resolution can be maintained while sufficiently reducing noise having a strong light intensity and low spatial frequency.

Figure 21:
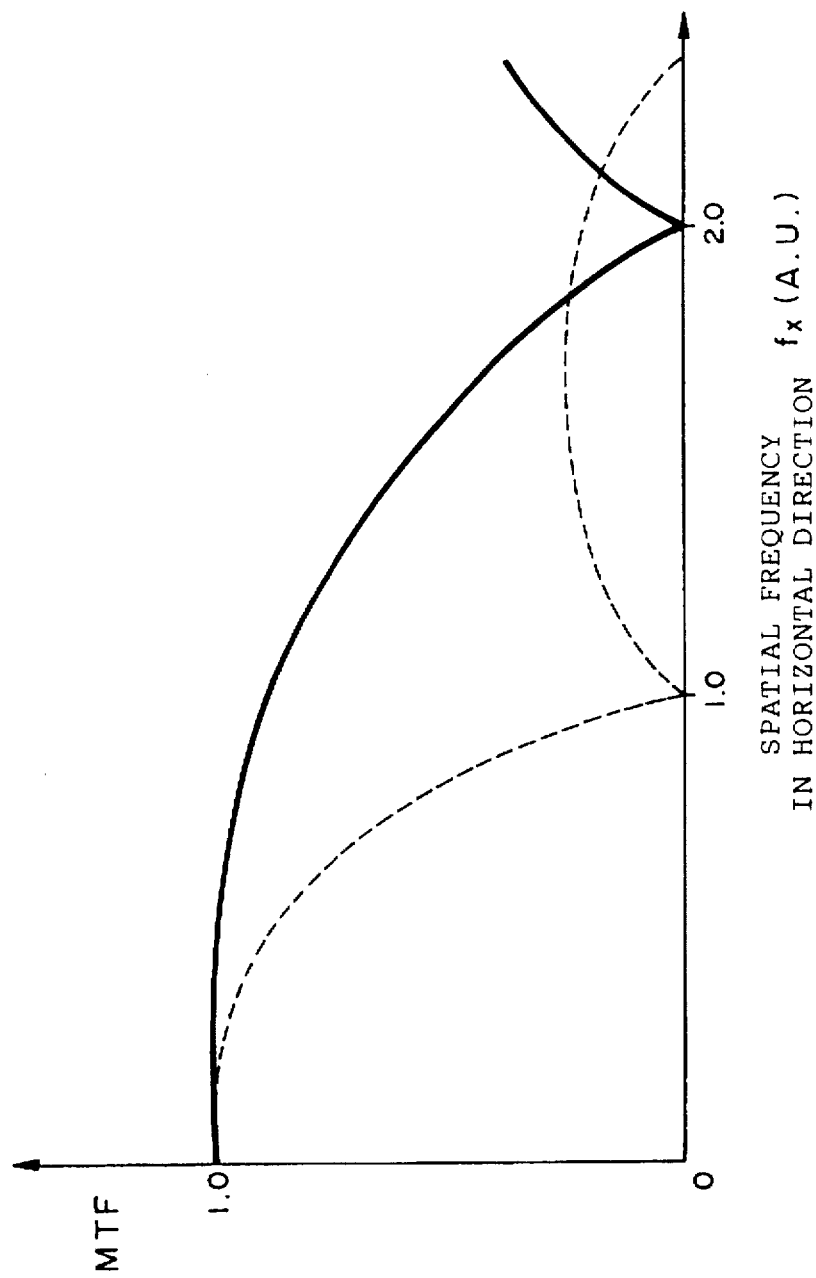
FIG. 21 shows the manner in which resolution is doubled, in comparison with FIG. 16, in accordance with the cut-off spatial frequencies of FIG. 19 or 20.

FIG. 21 expresses the above in the form of a graph and shows MTF taken along the horizontal direction. The solid line indicates the MTF having the cut-off spatial frequencies (MTF=0) shown in FIG. 19 or 20, and the dot lines indicate the MTF having the cut-off spatial frequencies shown in FIG. 16. In FIG. 19 or 20, cut-off spatial frequency in the horizontal direction is twice that in FIG. 16 and resolving power is doubled as well. Further, in the region of low spatial frequency, the MTF indicated by the solid line has a value larger than that of the MTF indicated by the dot lines. Thus, it will be understood that blurring of the image is reduced.

Figure 22:
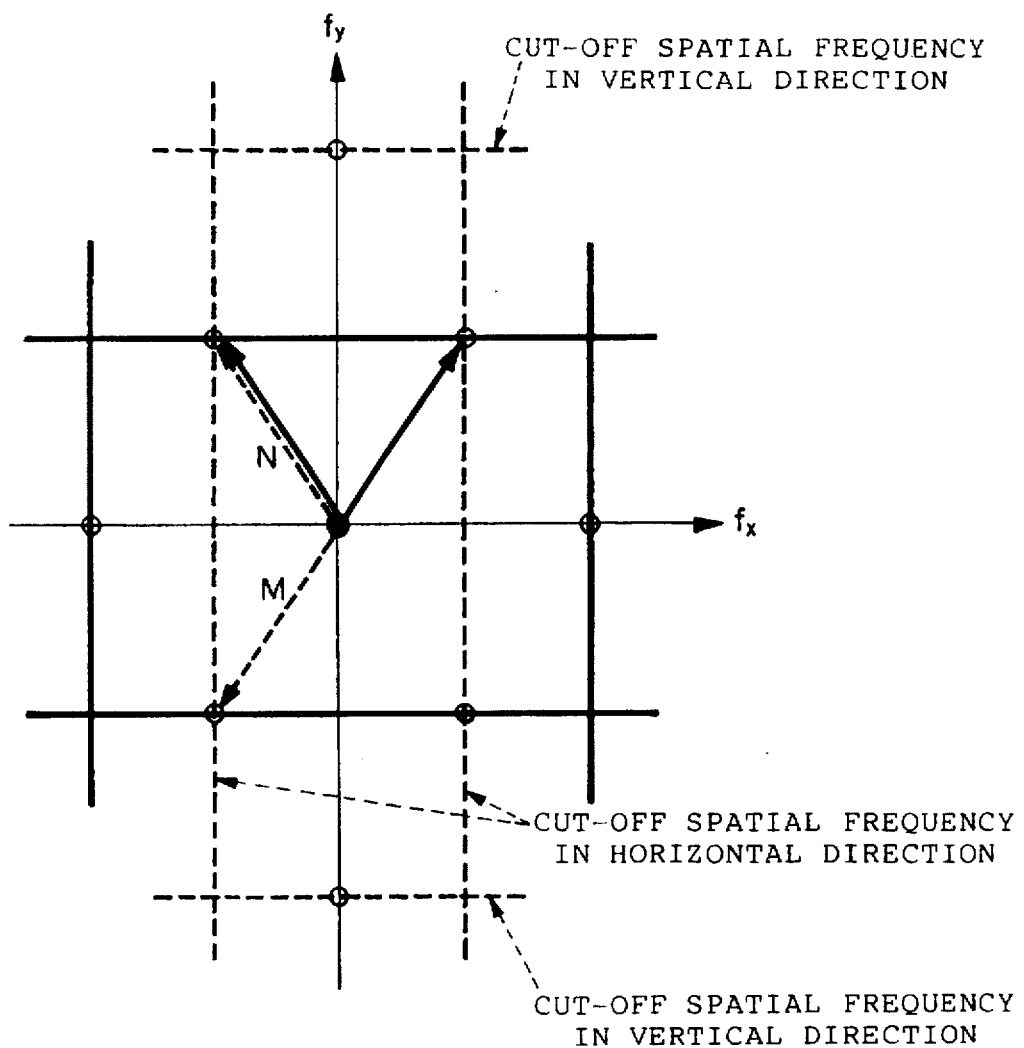
FIG. 22 illustrates another way to obtain basic frequency vectors.

FIG. 22 illustrates another way to obtain basic frequency vectors. The vectors and cut-off spatial frequencies indicated by the solid lines are those illustrated in FIGS. 17 to 20. The basic frequency vectors N and M indicated by the dot lines are set so as to be different from the foregoing. The cut-off spatial frequencies set using these basic frequency vectors are indicated by the dot lines. The advantage here is that the resolving power in the horizontal direction and the resolving power in the vertical direction takes on values closer to each other in the case of the cut-off spatial frequencies indicated by the solid lines than in the case of the cut-off spatial frequencies indicated by the dot lines.

FIGS. 23 through 26a, 26b illustrate examples of color pixel arrangements in a color display device such as a color liquid-crystal panel. FIGS. 23 and 24 show two examples of delta arrangements, FIG. 25 an example of a square arrangement and FIGS. 26a and 26b two examples of mosaic arrangements.

In the case of a color display device, image roughness is caused by separating the pixels of each of the colors R. G. B without mixing them. Accordingly, the sampling frequencies which are the center frequencies of the noise causing roughness are dependent upon the periods at which the pixels of each color are arranged. In other words, the sampling frequencies are dependent upon the arrangement period of the pixels for the color R, the arrangement period of the pixels for the color G and the arrangement period of the pixels for the color B.

Figure 26A:
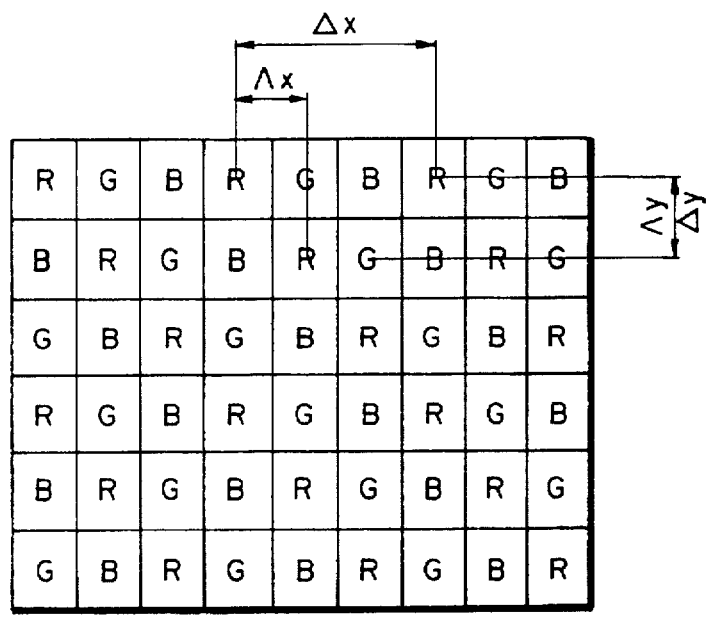
FIGS. 26a and 26b illustrate mosaic arrangements of pixels in a color display device.
Figure 26B:
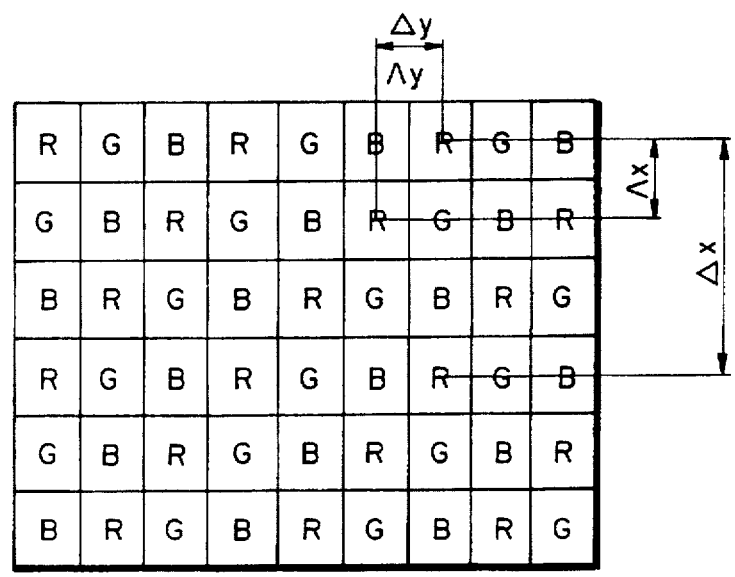

In the delta arrangement shown in FIGS. 23 and 24 and the mosaic arrangements shown in FIGS. 26a, 26b, the arrangement period of the pixels for the color R, the arrangement period of the pixels for the color G and the arrangement period of the pixels for the color B are the same. In these Figures, the pixel periods $\Delta x(\Lambda_x)$, $\Delta y(\Lambda_y)$ in the X and Y directions are illustrated with regard to pixels for the color R.

In the delta arrangement, the setting $\Lambda_x=\Delta x/2$ and $\Lambda_y=\Delta y$ is made, as mentioned above. In the mosaic arrangement, $\Lambda_x=\Delta x/3$, $\Lambda_y=\Delta y$ holds.

Figure 25:
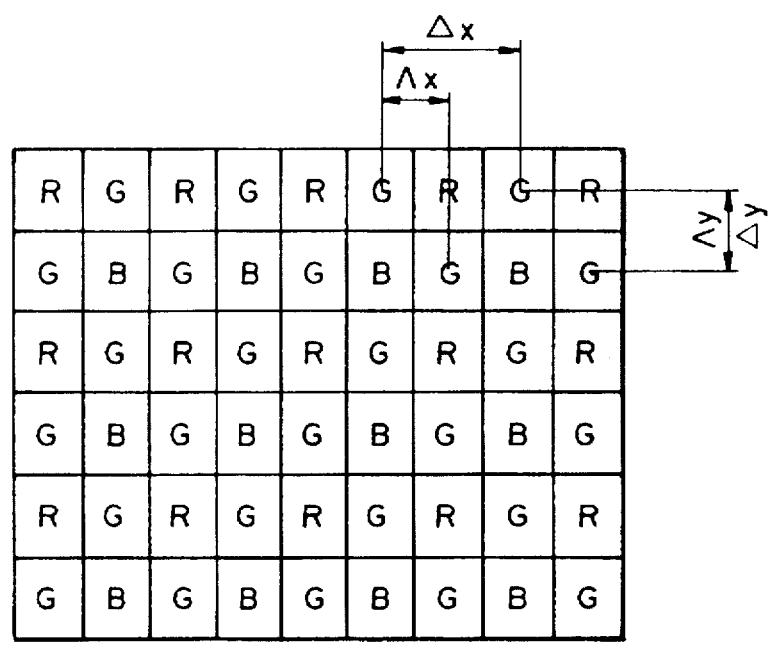
FIG. 25 illustrates an example of a square arrangement of pixels in a color display device.

In the square arrangement shown in FIG. 25, the pixel arrangement period for the color G differs from those of the other colors B, R. In general, the human eye is most sensitive to the color G and, hence, the cut-off spatial frequencies of the optical low-pass filter are decided based upon the pixel arrangement period for the color G. If note is taken of the pixel arrangement period for the color G in the square arrangement, it will be seen that the arrangement periods of the squre arrangements and the delta arrangements (FIGS. 23, 24) are the same.

The MTF varies with wavelength. FIG. 27 illustrates the MTFs relating to red (R) (a wavelength of 630 nm), green (G) (a wavelength of 545 nm) and blue (B) (a wavelength of 480 nm) of a certain sinusoidal diffraction grating (optical low-pass filter). The larger the wavelength of light, the smaller the cut-off spatial frequency. Among the colors red, green and blue, that for which the cut-off spatial frequency is situated at the center is appropriately made the reference. Accordingly, it will suffice to design the optical low-pass filter using the cut-off spatial frequency of the wavelength of the color green.

The sampling frequencies, basic frequencies and cut-off spatial frequencies in a mosaic arrangement will be described next.

Figure 28:
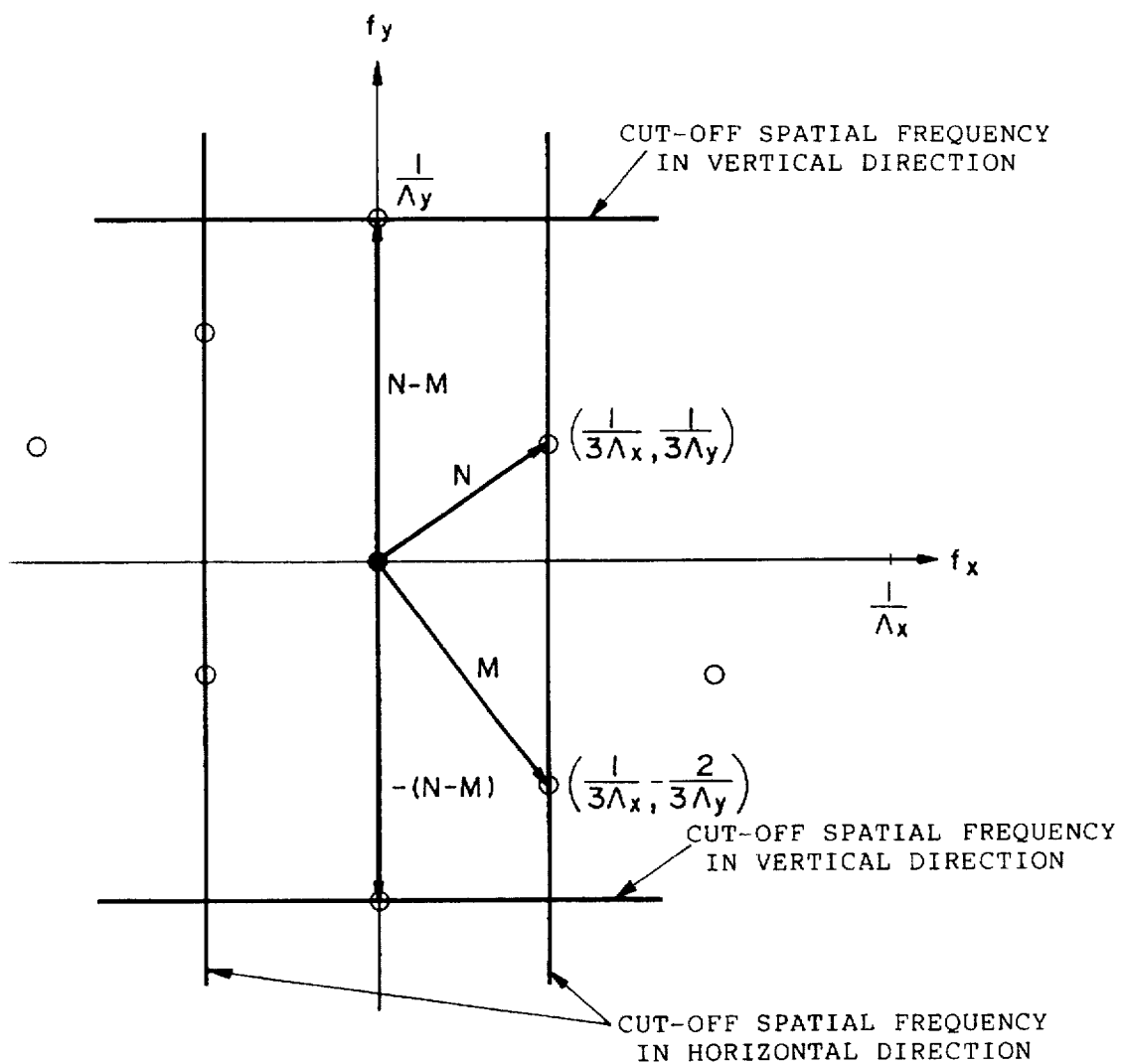
FIG. 28 illustrates cut-off spatial frequencies for a mosaic arrangement.

In a mosaic arrangement, as depicted in FIG. 28, consider two vectors M, N pointing toward two different sampling frequencies at positions closest to the origin of the two-dimensional frequency coordinate system. These vectors are adopted as two basic frequencies. Cut-off spatial frequencies in the horizontal direction are set so as to pass through the sampling frequencies represented by ±M, ±N.

Further, cut-off spatial frequencies in the vertical direction are set so as to pass through the sampling frequencies represented by ±(N–M). These vertical cut-off spatial frequencies may be diagonal and not parallel to the $f_x$ axis.

The manner in which roughness is eliminated while resolution is maintained by using the above-mentioned optical low-pass filter will be described with reference to FIG. 29. The optical low-pass filter having the cut-off spatial frequencies indicated by the dot lines in FIG. 22 is placed on the front side of the above-described display device having the delta arrangement. The horizontal cut-off spatial frequencies of this optical low-pass filter are the lowest sampling frequencies which are stipulated by the basic frequency vectors M and N. The vertical cut-off spatial frequencies are set so as to pass through sampling frequencies ±(N−M) for which the frequencies are secondary lower.

Figure 29:
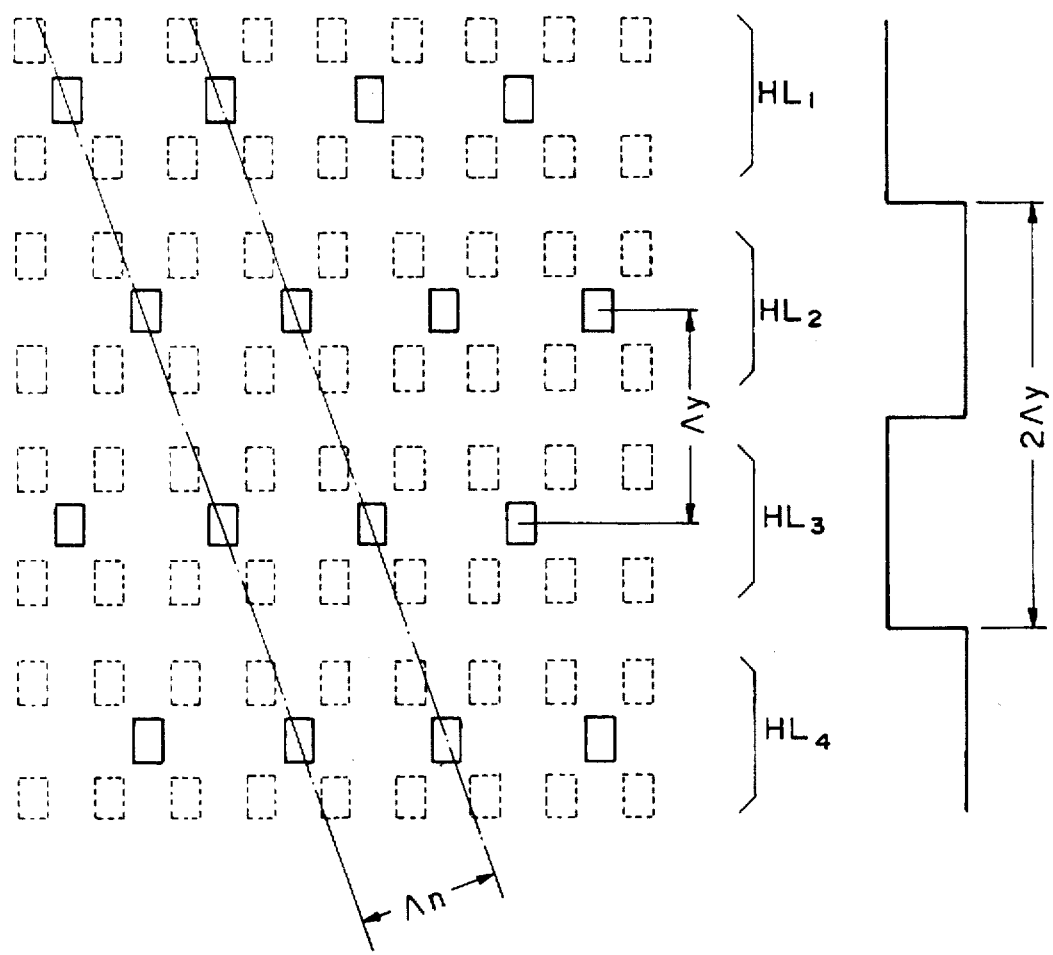
FIG. 29 schematically illustrates the manner in which roughness is eliminated by an optical low-pass filter while resolution is maintained.

FIG. 29, virtual images of pixels produced by the optical low-pass filter are indicated by the dot lines (the solid lines indicate the pixels, which cannot be seen). In order to simplify the drawing, it is assumed that four virtual images are produced for one pixel. (This optical low-pass filter splits incident light into two light beams in one direction.)

Roughness having a period $\Lambda_n$ in the diagonal direction caused by the delta arrangement of the pixels is eliminated by the existence of a plurality of virtual images in one period. However, resolving power in the longitudinal (vertical) direction (namely the resolving power of the pixel arrangement period $\Lambda_y$) is maintained. In other words, the lines $HL_1$, $HL_2$, $HL_3$, $HL_4$ extending in the horizontal direction can be displayed so as to be distinguishable from one another. For example, lines $HL_2$, $HL_4$ can be displayed brightly and lines $HL_1$, $HL_3$ can be displayed darkly. It is possible to present a periodic display which varies at a period of $2\Lambda_y$ in the longitudinal direction.

This effect of eliminating roughness while maintaining resolution in at least one direction is possessed by all of the other optical low-pass filters according to the present invention.

(3) Range of Cut-Off Spatial Frequencies (Part 1: Rectangular Type)

Figure 30:
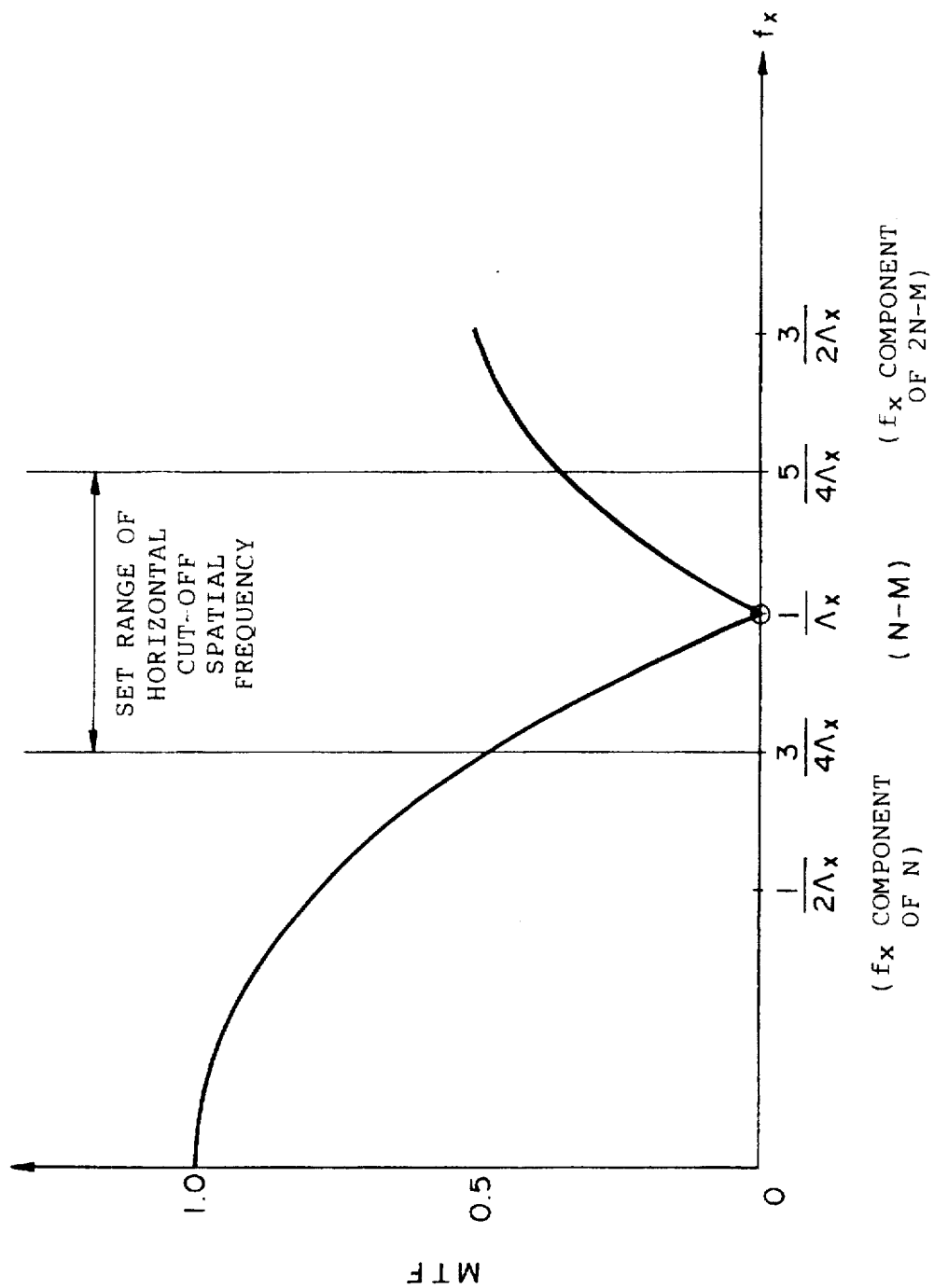
FIG. 30 illustrates a range over which cut-off spatial frequencies are taken.

FIG. 30 illustrates the MTF of an optical low-pass filter for which horizontal cut-off spatial frequencies stipulated by vector N−M have been set. (Here only one one-dimensional optical low-pass filter is taken into account when consideration is given to an arrangement in which a two-dimensional optical low-pass filter is constructed by superimposing one-dimensional optical low-pass filters in two different directions.) MTF=0 holds at a sampling frequency ($1/\Lambda_x$) represented by vector N−M.

The horizontal cut-off spatial frequencies possess a constant range centered on the sampling frequency N−M within the scope of the object of the present invention. A sampling frequency smaller than the sampling frequency N−M is N, and it is unnecessary to eliminate a frequency distribution centered on the sampling frequency N (the f* component thereof). (The spatial frequency N is removed by the other one-dimensional optical low-pass filter.) Since the next largest frequency following N−M is 2N−M, the noise frequencies distributed about the sampling frequency 2N−M (the fx component thereof) also need not be removed by this optical low-pass filter. (This is likewise removed by the other one-dimensional optical low-pass filter.) Accordingly, the lower limit of the cut-off spatial frequencies in the horizontal direction is properly taken to be at a point intermediate the $f_x$ component of the sampling frequency N and the sampling frequency N−M, and the upper limit is properly taken to be at a point intermediate the sampling frequency N−M and the sampling frequency 2N−M. The set range of cut-off spatial frequencies in the horizontal direction is from $3/4\Lambda_x$ to $5/4\Lambda_x$, as shown in FIG. 30. The set range of the vertical cut-off spatial frequencies in the vertical direction may be considered to be similar.

Figure 31:
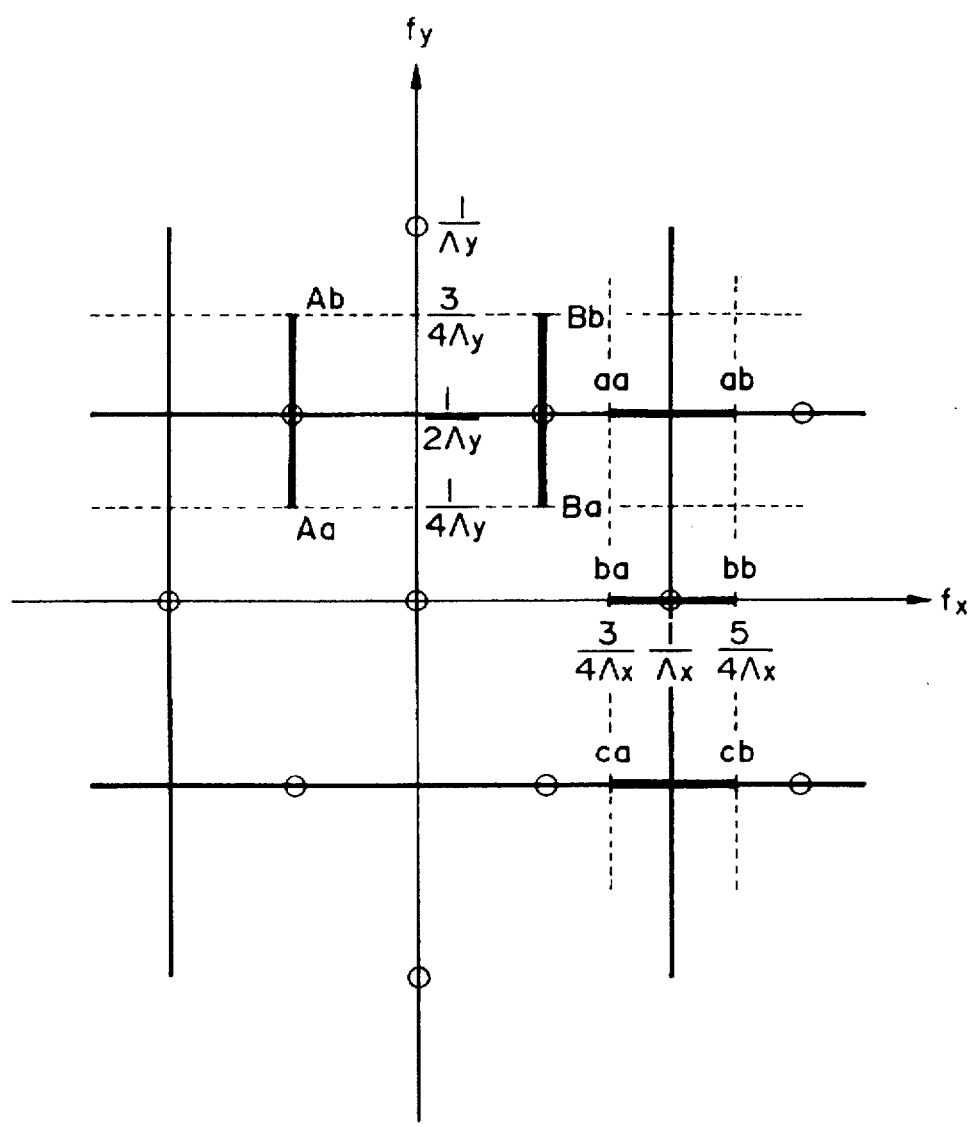
FIG. 31 illustrates set ranges of cut-off spatial frequencies in a delta arrangement.

FIG. 31 corresponds to FIG. 20 and illustrates set ranges of cut-off spatial frequencies in the vertical and horizontal directions in a delta arrangement. The set range of the cut-off spatial frequencies in the horizontal direction is the range ($3/4\Lambda_x$ to $5/4\Lambda_x$) indicated by aa–ab, ba–bb, ca–cb, as mentioned above. The set range of the cut-off spatial frequencies in the vertical direction is the range ($1/4\Lambda_y$ to $3/4\Lambda_y$) indicated by Aa–Ab, Ba–Bb.

Figure 32:
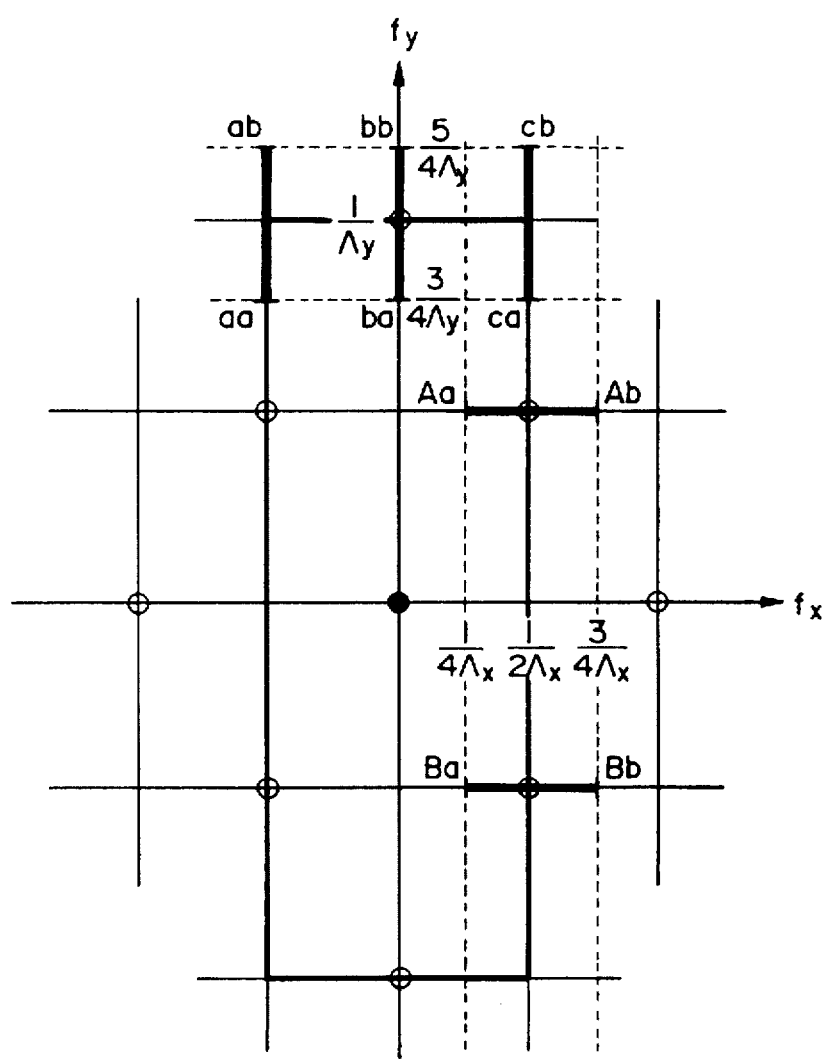
FIG. 32 illustrates another example of set ranges of cut-off spatial frequencies in a delta arrangement.

FIG. 32 corresponds to FIG. 22 and illustrates set ranges of cut-off spatial frequencies in the vertical and horizontal directions set by one other way of taking basic frequency in a delta arrangement. The set range of the cut-off spatial frequencies in the horizontal direction is the range ($1/4\Lambda_x$ to $3/4\Lambda_x$) indicated by Aa–Ab, Ba–Bb. The set range of the cut-off spatial frequencies in the vertical direction is the range ($3/4\Lambda_y$ to $5/4\Lambda_y$) indicated by aa–ab, ba–bb, ca–cb.

Figure 33:
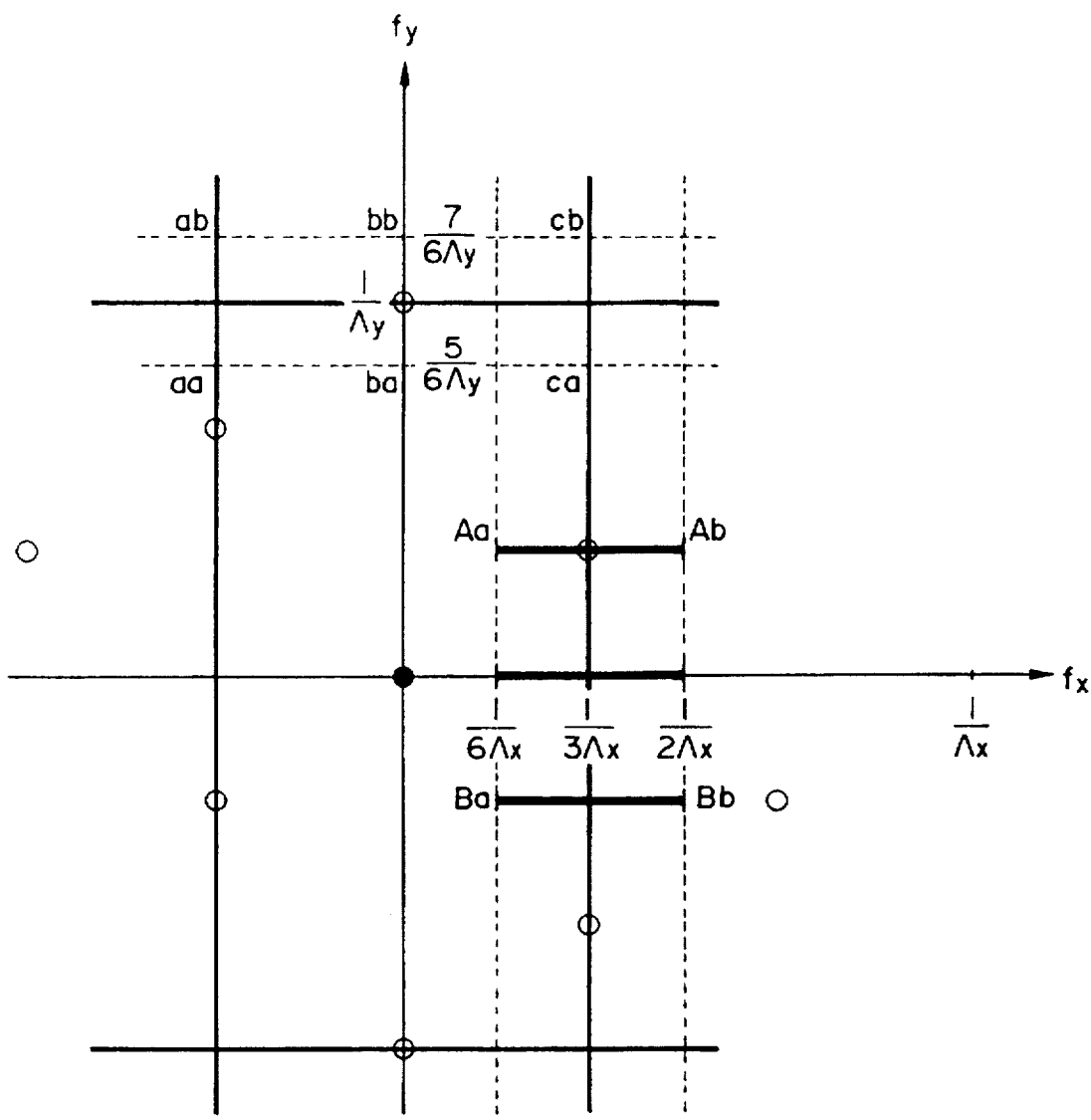
FIG. 33 illustrates set ranges of cut-off spatial frequencies in a mosaic arrangement.

FIG. 33 corresponds to FIG. 28 and illustrates set ranges of cut-off spatial frequencies in the vertical and horizontal directions in a mosaic arrangement. The set range of the cut-off spatial frequencies in the horizontal direction is the range ($1/6\Lambda_x$ to $1/2\Lambda_x$) indicated by Aa–Ab, Ba–Bb. The set range of the cut-off spatial frequencies in the vertical direction is the range ($5/6\Lambda_y$ to $7/6\Lambda_y$) indicated by aa–ab, ba–bb, ca–cb.

Figure 34:
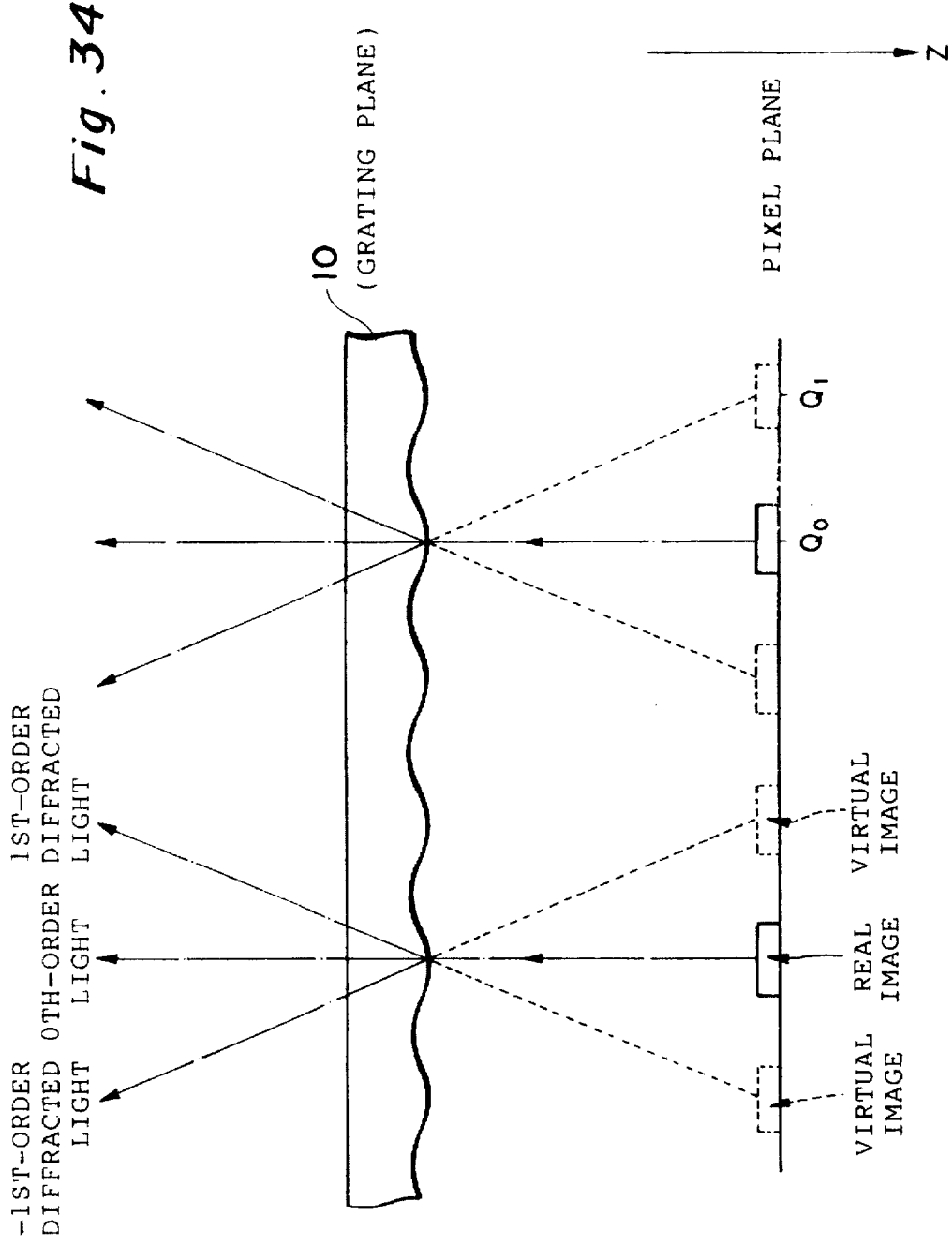
FIG. 34 illustrates the manner in which a virtual image of pixels can be formed by a diffraction grating.

FIG. 34 illustrates the manner in which real and virtual images of a pixel are produced by light of order 0 and light of orders ±1, respectively, in a case where a two-dimensional (sinusoidal) diffraction grating is used as the optical low-pass filter.

The pixel plane is, say, the above-described liquid-crystal panel. In order to facilitate understanding, the pixel is illustrated in a form protruding from the pixel plane. The light of order 0 of the diffraction grating 10 produces a real image of the pixel as indicated by the solid lines. The diffracted light (split light or branching light) of orders ±1 produces a virtual image of the pixel as indicated by the dot lines. This corresponds to FIG. 14.

Figure 35:
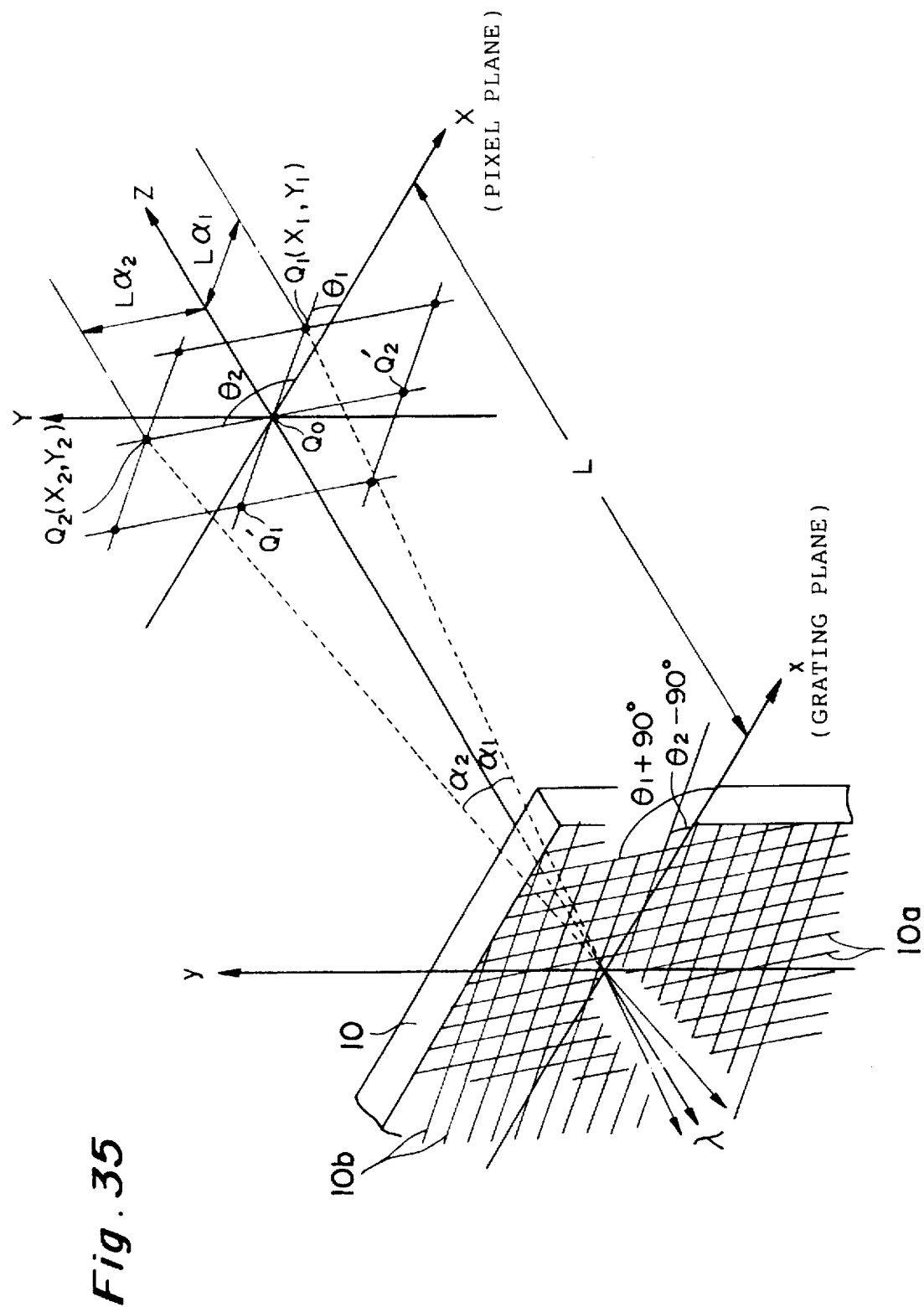
FIG. 35 illustrates the positional relationship between a diffraction grating and a pixel image.

FIG. 35 illustrates the above-mentioned pixel plane and the plane of the grating in three-dimensional form. An XY orthogonal coordinate system is established in the pixel plane, and an xy orthogonal coordinate system is established in the plane of the grating. The two-dimensional diffraction grating 10 comprises a grating 10a in the x direction and a grating 10b in the y direction. The gratings 10a, 10b are inclined with respect to the x axis at inclination angles $\theta_1$, $\theta_2$, respectively. The gratings may thus be inclined. This makes it possible to prevent the occurrence of Moiré fringes. The distance between the grating plane and the pixel plane is L.

Let $Q_0$ represent the center position of the real image in the pixel plane. (This is the position through which the optic axis of the transmitted light, i.e. 0th-order light passes.) The position $Q_0$ is the origin of the XY coordinate system. Let $Q_1$, $Q_1'$ represent the centers of one set of virtual images having point symmetry with respect to the point $Q_0$. Let $(X_1, Y_1)$ represent the coordinates of the point $Q_1$. Let $Q_2$, $Q_2'$ represent the centers of one more set of virtual images formed at positions spaced from the above points by 90°. (Since it is unnecessary for $\theta_2 = \theta_1 + 90°$ to hold, the angle of 90° does not impose any particular limitation.) Let $(X_2, Y_2)$ represent the coordinates of the point $Q_2$.

Let $\alpha_1$ represent the angle defined by the imaginary optic axis (indicated by the dot lines) that produces point $Q_1$ of the virtual image and the optic axis (the direction along the Z axis) passing through the point $Q_0$. Let the distance from point $Q_0$ to point $Q_1$ in the pixel plane be represented by $L\alpha_1$ (where the angle $\alpha_1$ is assumed to be small). Similarly, let $\alpha_2$ represent the angle defined by the optic axis passing through point $Q_2$ of the virtual image and the optic axis passing through the point $Q_0$. Let the distance between point $Q_0$ and point $Q_2$ in the pixel plane be represented by $L\alpha_2$ (where the angle $\alpha_2$ is assumed to be small).

Let $P_0$ represent the transmission (by splitting or branching) efficiency (the ratio of 0th-order light to incident light) of the 0th-order light (transmitted light) (light which passes through the point $Q_0$) with respect to the incident light (light incident upon the two-dimensional diffraction grating 10).

Let $P_1$ and $P_2$ respectively represent the splitting (branching or transmission) efficiencies (the ratios of ±1st-order light to incident light) of the light (±1st-order light) passing through the respective points $Q_1$ and $Q_2$ with respect to the incident light.

When the requirement that the cut-off spatial frequencies in the horizontal direction fall within the ranges of aa–ab and ca–cb in FIG. 31 (the delta arrangement) is expressed using the above-mentioned splitting efficiencies $P_0$, $P_1$, the position $(X_1, Y_1)$ of point $Q_1$ and the pixel arrangement periods $\Delta x$, $\Delta y$ ($\Delta x = 2\Lambda_x$, $\Delta y = \Lambda_y$), the result is Equation (1) and Equation (2), respectively.

Similarly, when the requirement that the cut-off spatial frequencies in the vertical direction fall within the ranges of Aa–Ab and Ba–Bb in FIG. 31 is expressed using the above-mentioned splitting efficiencies $P_0$, $P_2$, the position $(X_2, Y_2)$ of point $Q_2$ and the pixel arrangement periods $\Delta x$, $\Delta y$, the result is Equation (3) and Equation (4), respectively.

In the other example of the delta arrangement, namely the arrangement shown in FIG. 32, the cut-off spatial frequencies in the vertical direction reside in the ranges of aa–ab and ca–cb when Equation (5) and Equation (6) are satisfied, respectively. Further, the cut-off spatial frequencies in the horizontal direction reside in the ranges of Aa–Ab and Ba–Bb when Equation (7) and Equation (8) are satisfied, respectively.

Furthermore, in the mosaic arrangement shown in FIG. 33 ($\Delta x = 3\Lambda_x$, $\Delta y = \Lambda_y$), the cut-off spatial frequencies in the horizontal direction reside in the ranges of Aa–Ab and Ba–Bb when Equation (9) and Equation (10) are satisfied, respectively. Further, the cut-off spatial frequencies in the vertical direction reside in the ranges of aa–ab and ca–cb when Equation (11) and Equation (12) are satisfied, respectively.

Equations (1) through (12) indicate in which ranges the light-splitting efficiency of the optical low-pass filter resides in relation to the pixel arrangement period when the ranges which satisfy MTF=0 of the optical low-pass filter using the two-dimensional diffraction grating are those shown in FIGS. 31 through 33. Conversely speaking, by actually measuring the light-splitting efficiency of the optical low-pass filter at the points $Q_1$, $Q_2$ (which are not dependent upon the distance L), how large the cut-off spatial frequency is can be determined. Actual measurement of the diffraction efficiency of an optical low-pass filter is comparatively easy.

The Equations (1) through (12) are derived as follows:

The two-dimensional phase grating 10 may be considered as a combination of the two one-dimensional phase gratings 10a and 10b.

Let $P_{mn}$ represent the diffraction efficiency of diffracted light of orders m and n produced by the combination of the mth-order diffracted light component of the one-dimensional phase grating 10a and the nth-order diffracted light component of the one-dimensional phase grating 10b, let $(X_{mn}, Y_{mn})$ represent the relative position of a virtual image produced by the mth-, nth-order diffracted light, wherein the real image serves as the reference (origin), and let $\alpha_{mn}$ represent the diffraction angle.

The variables $P_0$, $P_1$, $P_2$, $X_1$, $X_2$, $Y_1$, $Y_2$, $\alpha_1$, $\alpha_2$ in FIG. 35 are expressed as follows:

$P_0 = P_{00}$, $P_1 = P_{10}$, $P_2 = P_{01}$
$(X_1, Y_1) = (X_{10}, Y_{10})$
$(X_2, Y_2) = (X_{01}, Y_{01})$
$\alpha_1 = \alpha_{10}$, $\alpha_2 = \alpha_{01}$ Hereinafter, the general parameters $P_{mn}$, $(X_{mn}, Y_{mn})$ and $\alpha_{mn}$ are used.

In place of the pixel arrangement periods $\Delta x$, $\Delta y$, $\Lambda_x$, $\Lambda_y$ are used.

Delta array: $\Lambda_x = 2\Delta x$, $\Lambda_y = \Delta y$

Mosaic array: $\Lambda_x = 3\Delta x$, $\Lambda_y = \Delta y$

Consideration will be given to the following premise (approximation) condition:

In order to derive cut-off spatial frequency, it is necessary to obtain the diffraction efficiency of each diffracted light ray. In an ordinary optical low-pass filter, however, the diffraction efficiency of order 2 or greater is taken to be small and does not have that much influence upon cut-off spatial frequency.

Figure 36:
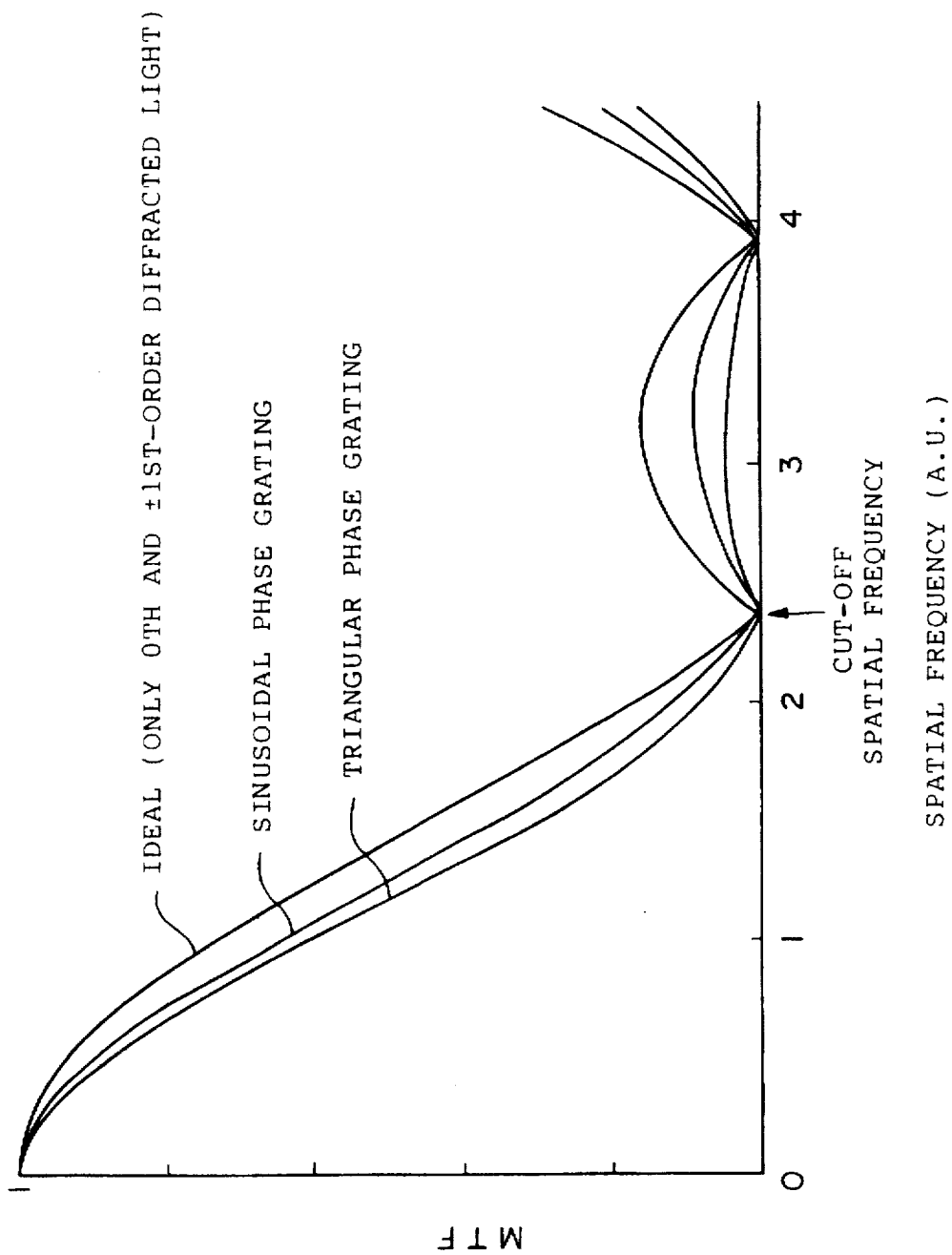
FIG. 36 is a graph illustrating the MTF characteristics of various optical low-pass filters.

FIG. 36 illustrates the MTFs of a triangular phase grating, a sinusoidal phase grating and an ideal optical low-pass filter (in which there is no diffracted light of order 2 or greater) in a case where (±1st-order diffracted-light efficiency)/(0th-order light efficiency)=0.7. The sum totals of the diffraction efficiencies of diffracted light of order 2 or greater in these three types of optical low-pass filters are 0.11, 0.07 and 0.00, respectively.

The cut-off spatial frequencies for which MTF=0 holds are not that different in the three types of optical low-pass filters.

Accordingly, in the description that follows, only 0th-order light and ±1st-order light will be considered.

The relationship between cut-off spatial frequency and the diffraction efficiency $P_{mn}$ and position $(X_{mn}, Y_{mn})$ will be derived.

The phase grating 10 is divided into the two grating components 10a, 10b and the cut-off spatial frequency of each will be considered.

The cut-off spatial frequency is the spatial frequency $g(f_x, f_y)$ which satisfies MTF=0.

The grating component 10a has an MTFa represented by the following equation, where F stands for a Fourier transform:

$$MTF_a(f_x, f_y) = F[f_a(x, y)] \qquad \text{Eq. (61)}$$

Here $f_a(x, y)$ is a point spread function of the grating component 10a and is expressed as follows:

$$f_a(x,y) = P_{a0}\delta(x)\delta(y) + P_{a-1}\delta(x - X_{-10})\delta(y - Y_{-10}) + P_{a1}\delta(x - X_{10})\delta(y - Y_{10}) \qquad \text{Eq. (62)}$$

where $P_{a0}$, $P_{a\pm1}$ are the 0th- and ±1st-order light diffraction efficiencies of the grating component 10a and the following equations hold:

$$P_{ai} = \sum_{k=0,\pm1} P_{ki}, \quad P_{a0}:P_{a\pm1} = P_{00}:P_{\pm10} \qquad \text{Eq. (63)}$$

From these the following equation is obtained:

$$MTF_a(f_x, f_y) = P_{a0} + P_{a-1}e^{jX_{-10}2\pi f_x}e^{jY_{-10}2\pi f_y} + P_{a1}e^{jX_{10}2\pi f_x}e^{jY_{10}2\pi f_y} = P_{a0} + 2P_{a1}\cos\{2\pi(X_{10}f_x + Y_{10}f_y)\} \qquad \text{Eq. (64)}$$

where the following holds:

$X_{10} = X_{-10}$ $Y_{10} = Y_{-10}$, and and $$P_{a1} = P_{a-1} \qquad \text{Eq. (65)}$$

The following equation is obtained from the condition $MTF_a(f_x, f_y) = 0$:

$$X_{10}f_x + Y_{10}f_y = \frac{\cos^{-1}\left(-\frac{1}{2P}\right)}{2\pi} \quad \text{Eq. (66)}$$

where the following holds:

$$P = \frac{P_{a1}}{P_{a0}} = \frac{P_{10}}{P_{00}} \quad \text{Eq. (67)}$$

In the case of the diffraction grating 10$b$, it will suffice to adopt P=P$_{01}$/P$_{00}$ and use X$_{00}$, Y$_{01}$ instead of X$_{10}$, Y$_{10}$.

In FIG. 31, assume that the spatial frequency at point aa is ($f_{xaa}$, $f_{yaa}$). The frequencies at the other points ab, ba, bb, ca, cb, Aa, Ab, Ba, Bb are also expressed using these symbols as subscripts.

The conditions under which the cut-off spatial frequencies in the horizontal direction fall within the range aa–ab are given by the following equations in Equations (66), (67):

$$f_y = f_{yaa} \quad \text{Eq. (68)}$$

$$f_{xaa} < f_x < f_{xab} \quad \text{Eq. (69)}$$

The following expression is obtained from the foregoing:

$$f_{xaa} < \frac{1}{X_{10}}\left(\frac{\cos^{-1}\left(-\frac{1}{2P}\right)}{2\pi} - Y_{10}f_{yaa}\right) < f_{xab} \quad \text{Eq. (70)}$$

The conditions under which the cut-off spatial frequencies in the horizontal direction fall within the range ca–cb are as follows:

$$f_y = f_{yca} \quad \text{Eq. (71)}$$

$$f_{xca} < f_x < f_{xcb} \quad \text{Eq. (72)}$$

The following expression is obtained from the foregoing:

$$f_{xca} < \frac{1}{X_{10}}\left(\frac{\cos^{-1}\left(-\frac{1}{2P}\right)}{2\pi} - Y_{10}f_{yca}\right) < f_{xcb} \quad \text{Eq. (73)}$$

Similarly, with regard to the cut-off spatial frequencies in the vertical direction, we have the following:

$$f_{yAa} < \frac{1}{Y_{01}}\left(\frac{\cos^{-1}\left(-\frac{1}{2P}\right)}{2\pi} - X_{01}f_{xAa}\right) < f_{yAb} \quad \text{Eq. (74)}$$

$$f_{yBa} < \frac{1}{Y_{01}}\left(\frac{\cos^{-1}\left(-\frac{1}{2P}\right)}{2\pi} - X_{01}f_{xBa}\right) < f_{yBb} \quad \text{Eq. (75)}$$

In the delta arrangement shown in FIG. 31, the basic pixel frequencies are expressed as follows:

$$\left(\frac{1}{2\Lambda_x}, \frac{1}{2\Lambda_y}\right)\left(-\frac{1}{2\Lambda_x}, \frac{1}{2\Lambda_y}\right) \quad \text{Eq. (76)}$$

Accordingly, the following relation holds, as shown in FIG. 31:

$$\begin{aligned}
f_{yaa} &= f_{yab} = \frac{1}{2\Lambda_y} & f_{xaa} &= f_{xca} = \frac{3}{4\Lambda_x} \\
f_{yca} &= f_{ycb} = -\frac{1}{2\Lambda_y} & f_{xab} &= f_{xcb} = \frac{5}{4\Lambda_x} \\
f_{xAa} &= f_{xAb} = -\frac{1}{2\Lambda_x} & f_{yAa} &= f_{yBa} = \frac{1}{4\Lambda_y} \\
f_{xBa} &= f_{xBb} = \frac{1}{2\Lambda_x} & f_{yAb} &= f_{yBb} = \frac{3}{4\Lambda_y}
\end{aligned} \quad \text{Eq. (77)}$$

If the Equations (77) are substituted into Equations (70), (73), (74) and (75), Equations (1), (2), (3) and (4) are obtained.

In a case where the basic frequencies are takes as shown in FIG. 22, in the delta arrangement shown in FIG. 32 the basic pixel frequencies are expressed as follows:

$$\left(\frac{1}{2\Lambda_x}, \frac{1}{2\Lambda_y}\right)\left(\frac{1}{2\Lambda_x}, -\frac{1}{2\Lambda_y}\right) \quad \text{Eq. (78)}$$

The relationship shown in FIG. 32 is substituted into Equations (70), (73), (74) and (75) to obtain Equations (7), (8), (5) and (6).

on the other hand, the basic pixel frequencies in the mosaic arrangement shown in FIG. 33 are expressed as follows:

$$\left(\frac{1}{3\Lambda_x}, \frac{1}{3\Lambda_y}\right)\left(\frac{1}{3\Lambda_x}, -\frac{2}{3\Lambda_y}\right) \quad \text{Eq. (79)}$$

The following expressions hold from the foregoing (see FIG. 33):

$$\begin{aligned}
f_{yAa} &= f_{yAb} = \frac{1}{3\Lambda_y} & f_{xAa} &= f_{xBa} = \frac{1}{6\Lambda_x} \\
f_{yBa} &= f_{yBb} = -\frac{1}{3\Lambda_y} & f_{xAb} &= f_{xBb} = \frac{1}{2\Lambda_x} \\
f_{xaa} &= f_{xab} = \frac{1}{3\Lambda_x} & f_{yaa} &= f_{yca} = \frac{5}{6\Lambda_y} \\
f_{xca} &= f_{xcb} = \frac{1}{3\Lambda_x} & f_{yab} &= f_{ycb} = \frac{7}{6\Lambda_y}
\end{aligned} \quad \text{Eq. (80)}$$

If the Equations (80) are substituted into Equations (70), (73), (74) and (75), Equations (9), (10), (11) and (12) are obtained.

Figure 37:
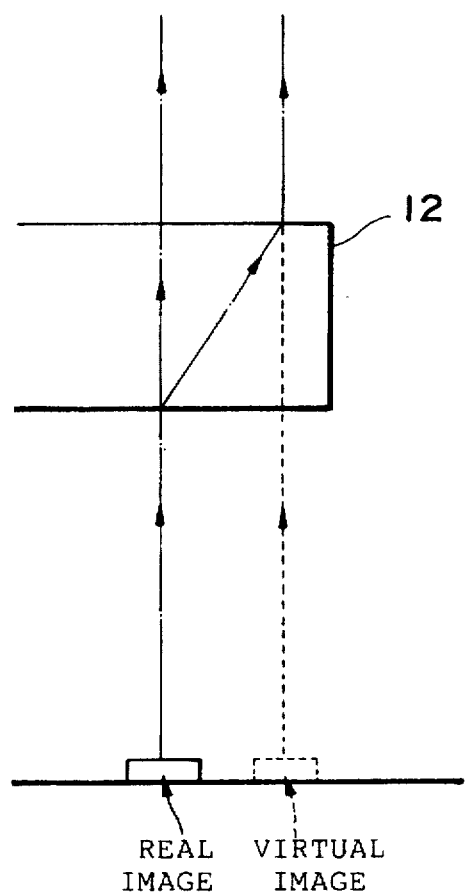
FIG. 37 illustrates the splitting of light in a quartz plate.

FIG. 37 illustrates the manner in which a real image and a virtual image are produced when the quartz plate 12 is used as the optical low-pass filter.

Figure 38:
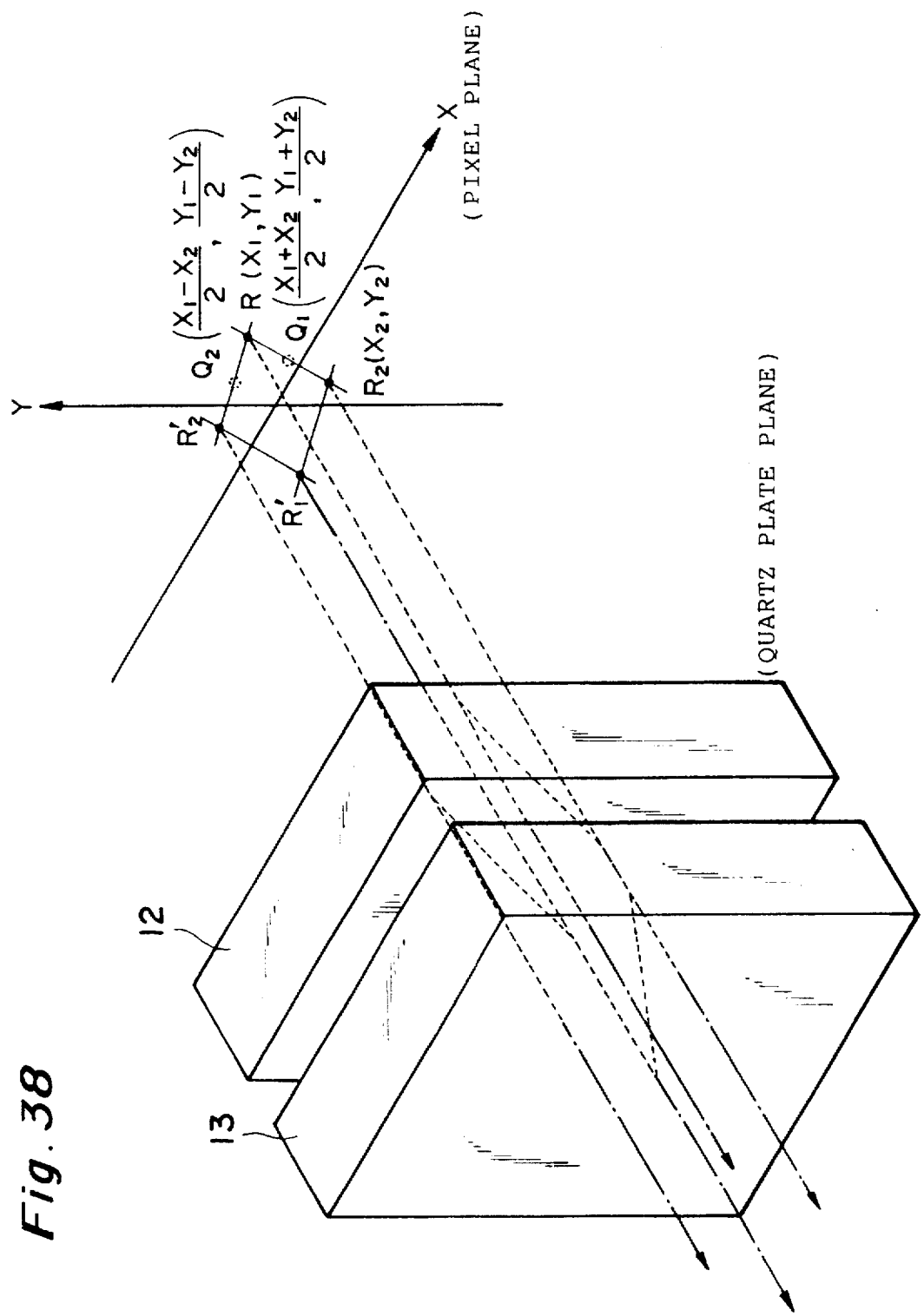
FIG. 38 illustrates the positional relationship between a quartz plate and a pixel image.

FIG. 38 illustrates, in three-dimensional form, a case in which a four-branch two-dimensional optical low-pass filter is constructed using two quartz plates 12 and 13. An XY orthogonal coordinate system is set up in the pixel plane. Let the positions of one real image and three virtual images be represented by R$_1$, R$_1'$, R$_2$, R$_2'$ (R$_1'$ is the real image), respectively.

In contrast with FIG. 35, it suffices to treat the quartz plate as not having transmitted light (light of order 0) in the diffraction grating. Further, this is considered to be a case in which the light intensities at the points Q$_1$, Q$_1'$, Q$_2$, Q$_2'$ in the diffraction grating have become zero. Instead, it will suffice to consider the light intensities at the points R$_1$, R$_1'$, R$_2$, R$_2'$ of the real and virtual images.

Accordingly, if 0, [(X$_1$+X$_2$)/2, (Y$_1$+Y$_2$)/2], [(X$_1$-X$_2$)/2, (Y$_1$-Y$_2$)/2] are substituted in the aforementioned Equations (1)–(12) in place of P$_0$, (X$_1$,Y$_2$), (X$_2$,Y$_2$), respectively, then Equations (41)–(52) for a case in which the quartz plate is used, which correspond to Equations (1)–(12) are obtained.

In other words, Equations (41)–(52) indicate ranges of cut-off spatial frequencies for a case where two quartz plates are used as the optical low-pass filter.

Equations (41)–(44) correspond to Equations (1)–(4) and are for the case of the delta arrangement shown in FIG. 31.

Equations (45)–(48) correspond to Equations (5)–(8) and are for the case of the delta arrangement shown in FIG. 32.

Equations (49)–(52) correspond to Equations (9)–(12) and are for the case of the mosaic arrangement shown in FIG. 33.

Figure 39:
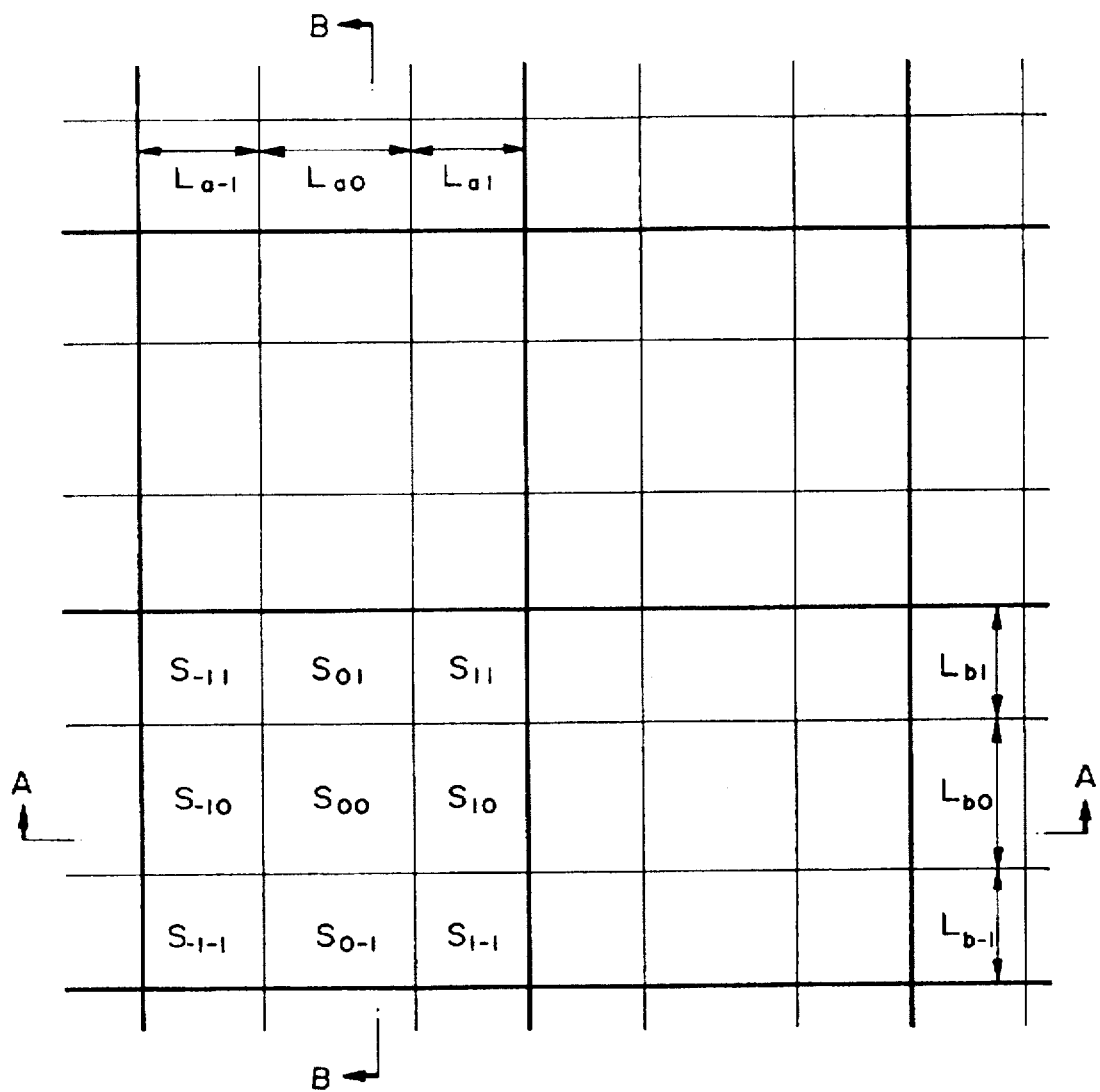
FIG. 39 is a plan view of a prism plate.
Figure 40:
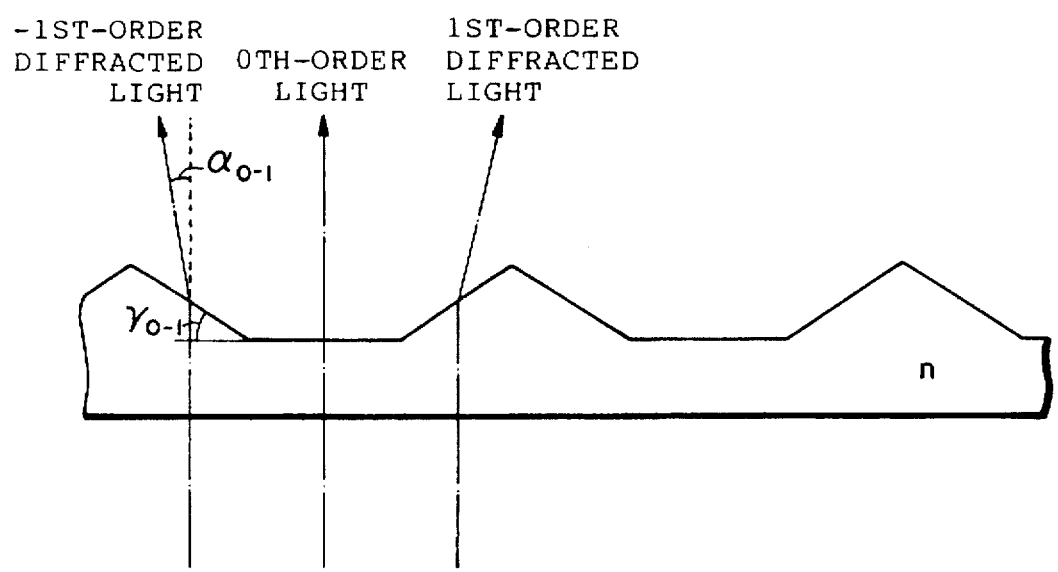
FIG. 40 is a sectional view taken along line A—A or B—B of FIG. 39.

FIG. 39 is a plan view of a two-dimensional prism plate, and FIG. 40 is a sectional view taken along line A—A or B—B (these sectional views have the same shape) of FIG. 39.

The sections bounded by the bold lines in FIG. 39 have a flat zone $S_{00}$ and inclined zones (all of the other areas). The area of these zones is represented by $S_{mn}$ (m. n=0, ±1). The diffraction efficiency $P_{mn}$ of each zone is proportional to the area $S_{mn}$ and therefore is given by the following equation:

$$P_{mn} = S_{mn} / \sum_{i,j=0,\pm 1} S_{ij} \qquad \text{Eq. (81)}$$

This two-dimensional prism plate can be handled in exactly the same manner as the above-described two-dimensional phase grating and the Equations (1)–(12) hold.

Next, the conditions under which the cut-off spatial frequencies in the horizontal and vertical directions will reside in the above-mentioned ranges (FIGS. 31–33) in conformity with the arrangement are expressed using the diffraction efficiency $P_{mn}$, diffraction angles $\alpha_1$, $\alpha_2$, the optical distance L between the grating plane and the pixel plane (the distance between the phase grating and the liquid-crystal panel) and the inclination angles $\theta_1$, $\theta_2$ of the diffraction grating for a case in which a two-dimensional phase grating is used as the optical low-pass filter.

When the phase grating has been placed so as to satisfy Equations (21) and (22) in the delta arrangement of FIG. 31, the cut-off spatial frequencies in the horizontal direction fall within the ranges of aa–ab and ca–cb, respectively. When Equations (23) and (24) are similarly satisfied, the cut-off spatial frequencies in the vertical direction fall within the ranges Aa–Ab and Ba–Bb, respectively.

When the phase grating has been placed so as to satisfy Equations (25) and (26) in the other example of the delta arrangement shown in FIG. 32, the cut-off spatial frequencies in the vertical direction fall within the ranges of aa–ab and ca–cb, respectively. When Equations (27) and (28) are satisfied, the cut-off spatial frequencies in the horizontal direction fall within the ranges Aa–Ab and Ba–Bb, respectively.

When the phase grating has been placed so as to satisfy Equations (29) and (30) in the mosaic arrangement shown in FIG. 33, the cut-off spatial frequencies in the horizontal direction fall within the ranges of Aa–Ab and Ba–Bb, respectively. When Equations (31) and (32) are satisfied, the cut-off spatial frequencies in the vertical direction fall within the ranges aa–ab and ca–cb, respectively.

This is applied to the two-dimensional prism plate as well.

The Equations (21) through (32) are derived in the following manner:

In FIG. 35, the distance between pixel $Q_0$ and its virtual image $Q_1$ is represented by $L\alpha$ on the assumption that the angle $\alpha_1$ is very small.

Accordingly, we have $$X_{10} = X_1 = L \cdot \alpha_1 \cdot \cos \theta_1$$

$$Y_{10} = Y_1 = L \cdot \alpha_1 \cdot \sin \theta_1 \qquad \text{Eq. (82)}$$

Similarly, the following equations hold:

$$X_{01} = X_2 = L \cdot \alpha_2 \cdot \cos \theta_2$$

$$Y_{01} = Y_2 = L \cdot \alpha_2 \cdot \sin \theta_2 \qquad \text{Eq. (83)}$$

If Equations (82) and (83) are substituted into Equations (1) through (12), Equations (21) through (32), respectively, are obtained.

(4) Basic Principles and Range of Cut-Off Spatial Frequencies (Part 2: Parallelogram Type)

One more method and configuration will be described through which resolving power is made twice that of the optical low-pass filter for which cut-off spatial frequencies have been set as shown in FIG. 16.

Figure 41:
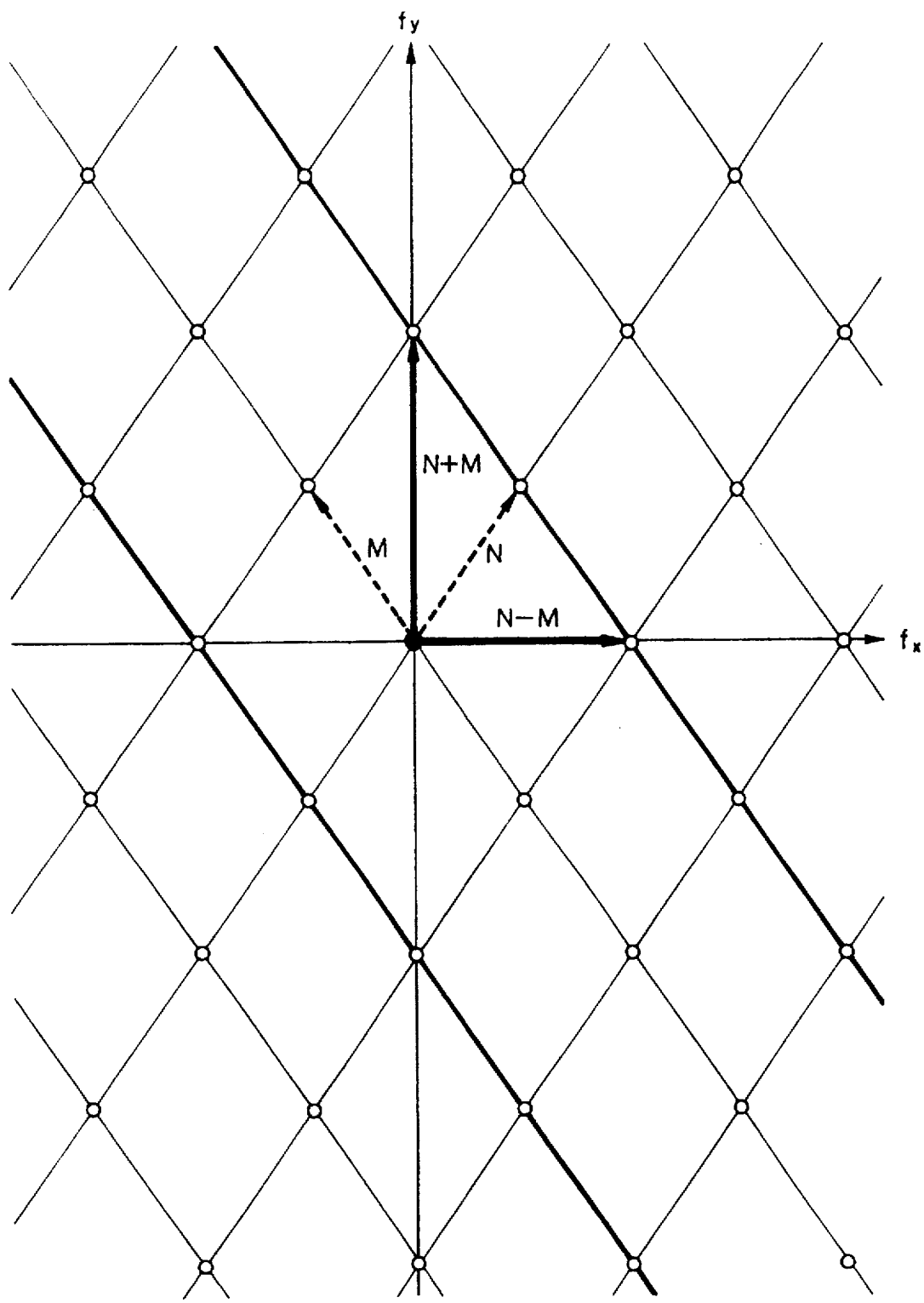
FIGS. 41 through 43 illustrate cut-off spatial frequencies in a delta arrangement.

First, in the case of the delta arrangement, first cut-off spatial frequencies are set so as to pass through four sampling frequencies ±(M+N) and ±(N–M), as illustrated in FIG. 41.

Figure 42:
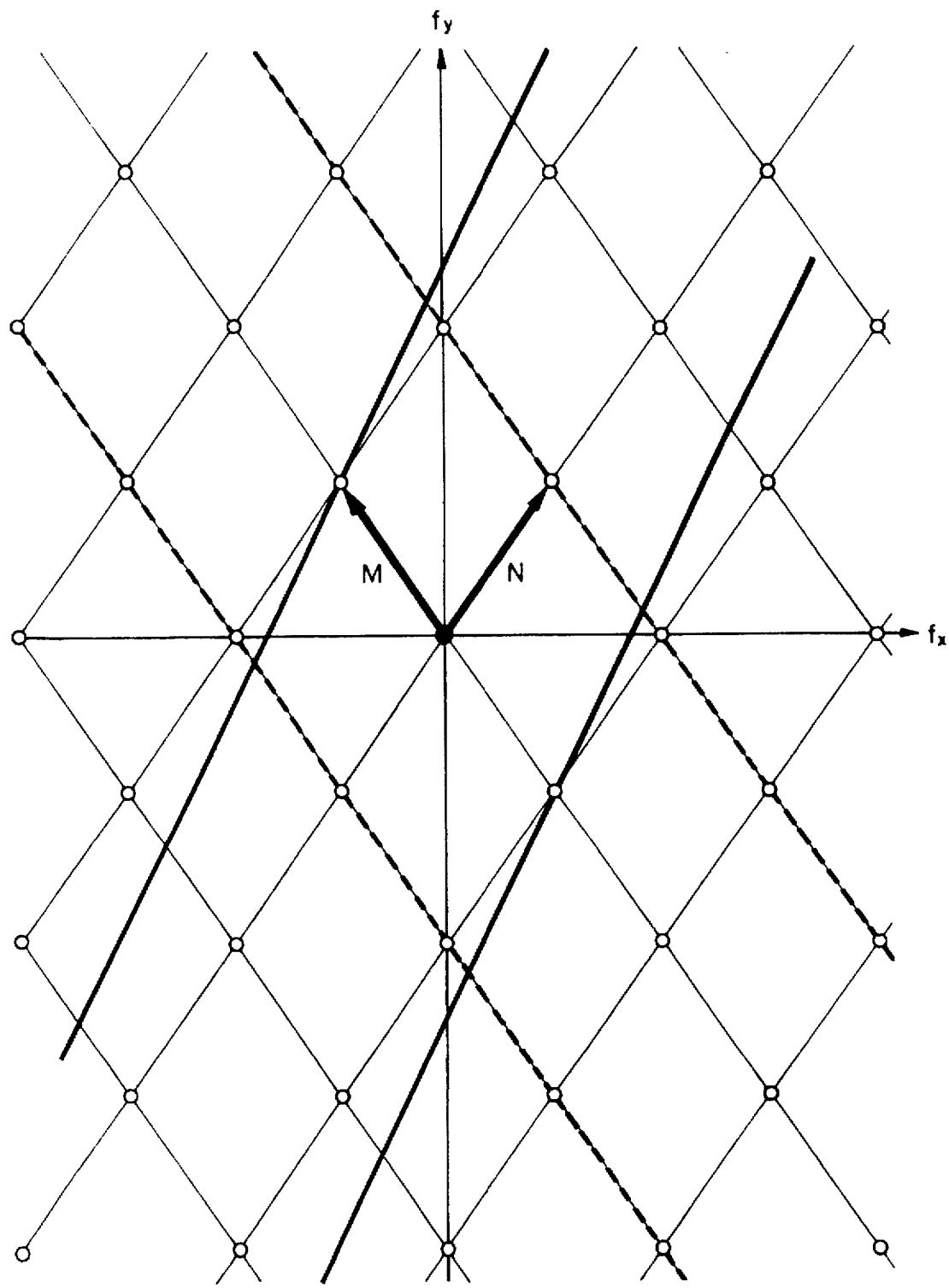
Figure 43:
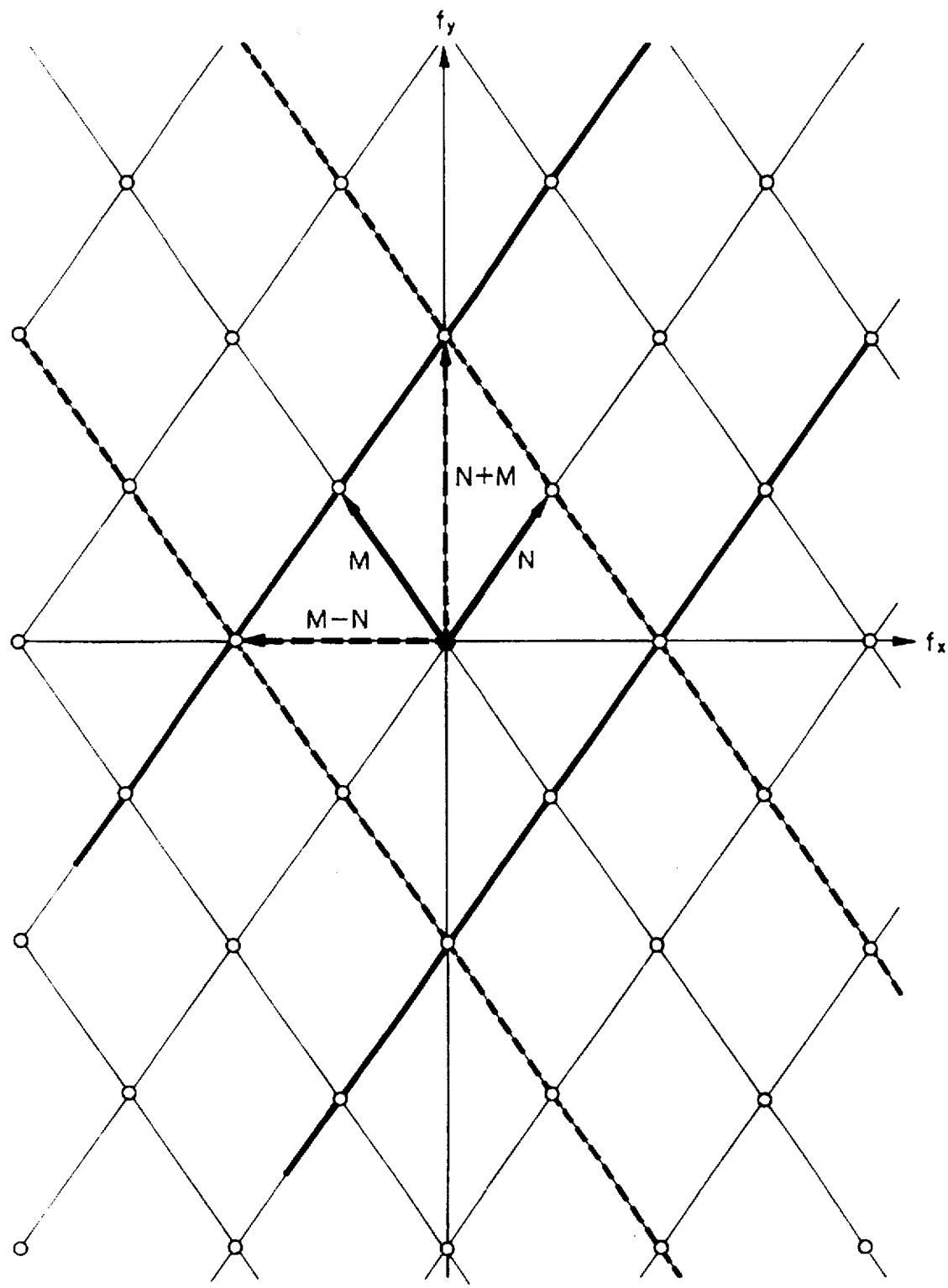

Further, as shown in FIG. 42, second cut-off spatial frequencies are set (as indicated by the solid lines) so as to pass through sampling frequencies +M (or +N) that have not yet been eliminated. If these second cut-off spatial frequencies are set so as to pass through ±(M+N) and ±(N–M), as illustrated in FIG. 43, resolution will be symmetric with respect to the $f_x$ axis and $f_y$ axis.

Figure 44:
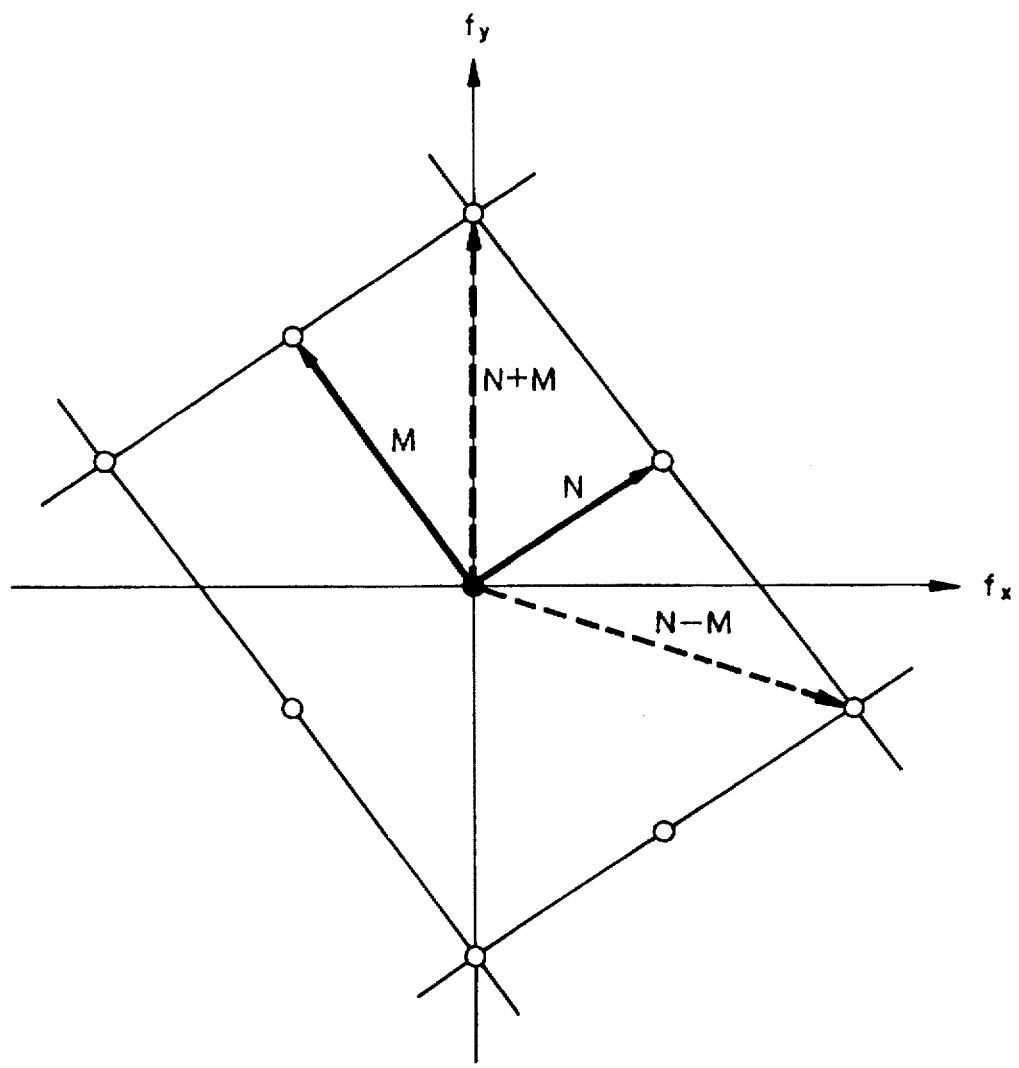
FIG. 44 illustrates cut-off spatial frequencies in a mosaic arrangement.

The foregoing holds in exactly the same fashion for the mosaic arrangement. FIG. 44 illustrates cut-off spatial frequencies set with regard to the pixels of the mosaic arrangement. Though the basic frequency M has a direction opposite that shown in FIG. 28, the effects are the same regardless of the direction.

Figure 45:
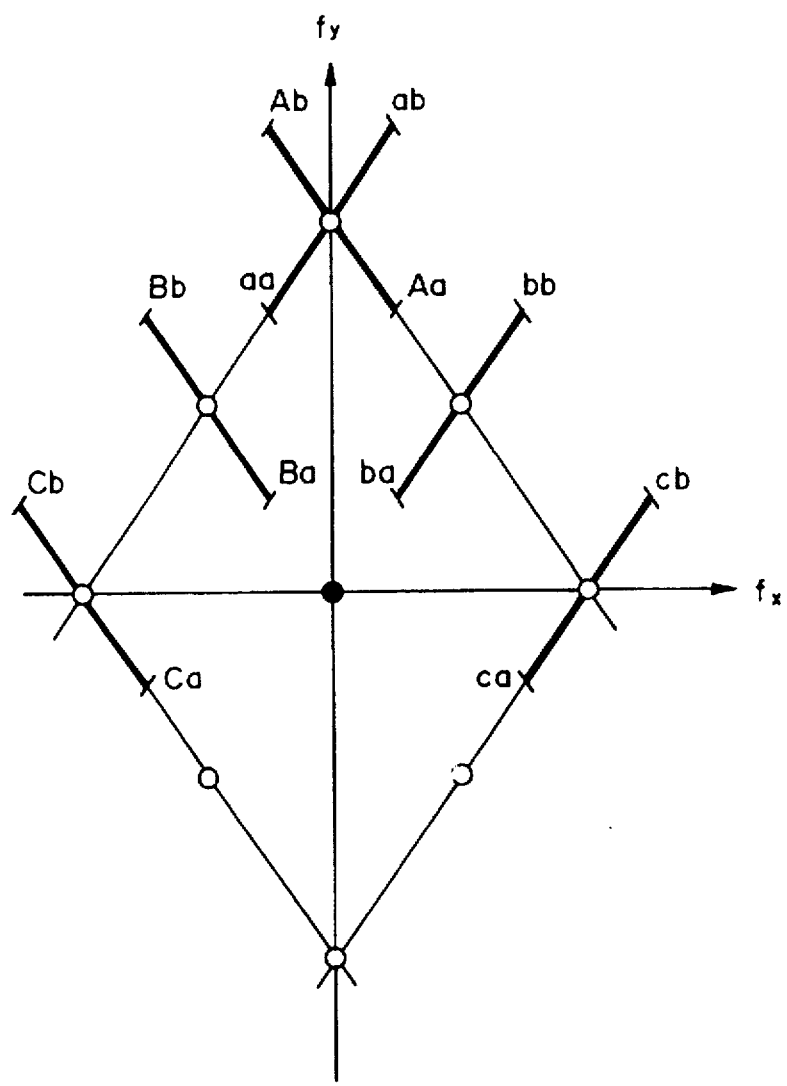
FIG. 45 illustrates set ranges of cut-off spatial frequencies in a delta arrangement.

The ranges of cut-off spatial frequencies allowed within the scope of the object of the invention are shown in FIG. 45 with regard to the delta arrangement. The conditions under which the cut-off spatial frequencies fall within the ranges aa–ab and ca–cb are indicated by Equations (13), (14), respectively, and the conditions under which the cut-off spatial frequencies fall within the ranges Aa–Ab and Ba–Bb are indicated by Equations (15), (16), respectively, when a two-dimensional phase grating or prism plate is used as the optical low-pass filter. These are expressed using the diffraction efficiencies $P_0$, $P_1$, $P_2$ and the positions $X_1$, $Y_1$, $X_2$, $Y_2$ of the virtual images.

Figure 46:
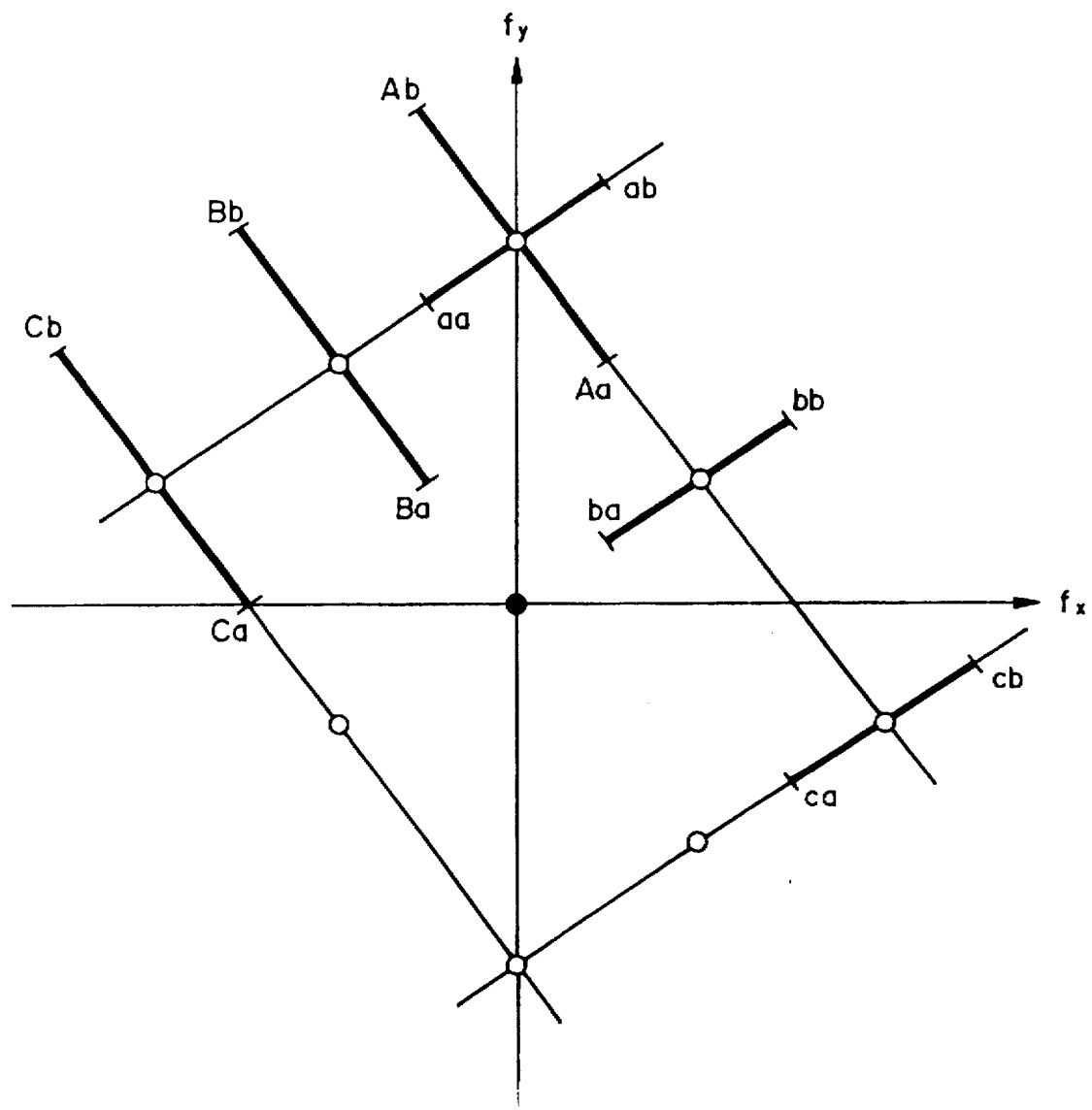
FIG. 46 illustrates set ranges of cut-off spatial frequencies in a mosaic arrangement.

In the mosaic arrangement, the cut-off spatial frequencies fall within the ranges of aa–ab, ca–cb, Aa–Ab and Ca–Cb, shown in FIG. 46, when Equations (17), (18), (19) and (20) are satisfied.

Equations (13) through (16) are derived as set forth below.

In FIG. 45 (the delta arrangement), the conditions under which the cut-off spatial frequencies fall within the range aa–ab is expressed by the equations below in the aforementioned Equations (66) and (67) [the condition for $\text{MTF}_a(f_x, f_y)=0$]. Here $f_y$ is expressed by a linear function of $f_x$.

$$f_y = \frac{f_{yab} - f_{yaa}}{f_{xab} - f_{xaa}} f_x + \frac{f_{yab} + f_{yaa}}{2} \qquad \text{Eq. (84)}$$

$$f_{xaa} < f_x < f_{xab} \qquad \text{Eq. (85)}$$

The following equation is obtained from the foregoing:

$$f_{xaa} < \frac{1}{X_{10} + Y_{10} \times \frac{f_{yab} - f_{yaa}}{f_{xab} - f_{xaa}}} \left( \frac{\cos^{-1}\left(-\frac{1}{2P}\right)}{2\pi} - Y_{10} \times \frac{f_{yab} + f_{yaa}}{2} \right) < f_{xab} \qquad \text{Eq. (86)}$$

The conditions under which the cut-off spatial frequencies fall within the range ca–cb is represented by the following equations:

$$f_y = \frac{f_{ycb} - f_{yca}}{f_{xcb} - f_{xca}} f_x - \frac{f_{yab} + f_{yaa}}{2} \quad \text{Eq. (87)}$$

$$f_{xca} < f_x < f_{xcb} \quad \text{Eq. (88)}$$

The following equation is obtained from the foregoing:

$$f_{xca} < \frac{1}{X_{10} + Y_{10} \times \frac{f_{ycb} - f_{yca}}{f_{xcb} - f_{xca}}} \left( \frac{\cos^{-1}\left(-\frac{1}{2P}\right)}{2\pi} + Y_{10} \times \frac{f_{yab} + f_{yaa}}{2} \right) < f_{xcb} \quad \text{Eq. (89)}$$

Similarly, the conditions under which the cut-off spatial frequencies fall with the respective ranges Aa–Ab and Ca–Cb are as follows:

$$f_{xAb} < \frac{1}{X_{01} + Y_{01} \times \frac{f_{yAb} - f_{yAa}}{f_{xAb} - f_{xAa}}} \left( \frac{\cos^{-1}\left(-\frac{1}{2P}\right)}{2\pi} - Y_{01} \times \frac{f_{yAb} + f_{yAa}}{2} \right) < f_{xAa} \quad \text{Eq. (90)}$$

$$f_{xCb} < \frac{1}{X_{01} + Y_{01} \times \frac{f_{yCb} - f_{yCa}}{f_{xCb} - f_{xCa}}} \left( \frac{\cos^{-1}\left(-\frac{1}{2P}\right)}{2\pi} + Y_{01} \times \frac{f_{yAb} + f_{yAa}}{2} \right) < f_{xCa} \quad \text{Eq. (91)}$$

If Equation (77) for the relation in the delta arrangement is substituted into Equations (86), (89), (90) and (91), Equations (13), (14), (15) and (16) are derived.

Similarly, if Equation (80) for the relation in the mosaic arrangement is substituted into Equations (86), (89), (90) and (91), Equations (17), (18), (19) and (20) are derived.

In a case where two quartz plates of the kind shown in FIG. 38 are used as the optical low-pass filter, the conditions under which the cut-off spatial frequencies fall within the ranges shown in FIGS. 45 and 46 are as set forth below when expressed using the splitting efficiency.

In the case of the delta arrangement, the conditions under which the cut-off spatial frequencies fall within the ranges aa–ab, ca–cb, Aa–Ab and Ca–Cb in FIG. 45 are as indicated in Equations (53), (54), (55) and (56).

In the case of the mosaic arrangement, the cut-off spatial frequencies fall within the ranges aa–ab, ca–cb, Aa–Ab and Ca–Cb in FIG. 46 when Equations (57), (58), (59) and (60) are satisfied.

Equations (53) through (60) are obtained if 0, $[(X_1+X_2)/2, (Y_1+Y_2)/2]$, $[(X_1-X_2)/2, (Y_1-Y_2)/2]$ are inserted into Equation (13) through (20) in place of $P_0$, $(X_1,Y_1)$, $(X_2,Y_2)$, respectively.

Next, the range of cut-off spatial frequencies will be expressed using refractive efficiency, refractive angle, optical distance between the grating plane and pixel plane and the angle of inclination of the diffraction grating. A two-dimensional phase grating is used as the optical low-pass filter.

When Equations (33), (34), (35) and (36) are satisfied in the delta arrangement shown in FIG. 45, the cut-off spatial frequencies fall within the ranges aa–ab, ca–cb, Aa–Ab and Ca–Cb, respectively.

When Equations (37), (38), (39) and (40) are satisfied in the mosaic arrangement shown in FIG. 46, the cut-off spatial frequencies fall within the ranges aa–ab, ca–cb, Aa–Ab and Ca–Cb, respectively.

Equations (33) through (40) are obtained by substituting the aforementioned Equations (82) and (83) into Equations (13) through (20), respectively.

(5) Specific Example of Design

It will be assumed that a liquid-crystal panel having the delta arrangement shown in FIG. 24 is used. This example will deal with pixels of the color green (G).

The pixel periods is as follows:

$$\Delta x = 60 \; \mu m$$

$$\Delta y = 18 \; \mu m \quad \text{Eq. (92)}$$

Let the central wavelength of the light which passes through the pixels for the color green (G) be $\lambda = 555$ nm.

The diffraction lattice $P_{mn}$ and the position $(X_{mn}, Y_{mn})$ of the virtual image (the units are $\mu m$) which satisfy the Equations (1)–(4) are set provisionally. For example, it is assumed that the following settings are made:

$$(X_{10}, Y_{10}) = (20, 0)$$

$$(X_{10}, Y_{01}) = (0, 12) \quad \text{Eq. (93)}$$

$$\frac{P_{10}}{P_{00}} = \frac{P_{01}}{P_{00}} = 0.7 \quad \text{Eq. (94)}$$

It is verified whether Equations (92), (93) and (94) satisfy Equations (1)–(4).

When Equations (92)–(94) are substituted into Equations (1) and (2), we obtain the following:

$$1.25 \times 10^{-2}(1/\mu m) \quad < \quad 1.88 \times 10^{-2}(1/\mu m) \quad \text{Eq. (95)}$$
$$\quad < \quad 2.08 \times 10^{-2}(1/\mu m)$$

$$1.39 \times 10^{-2}(1/\mu m) \quad < \quad 3.14 \times 10^{-2}(1/\mu m) \quad \text{Eq. (96)}$$
$$\quad < \quad 4.17 \times 10^{-2}(1/\mu m)$$

From this it is confirmed that Equations (92)–(94) satisfy the requirements of Equations (1)–(4).

Figure 47:
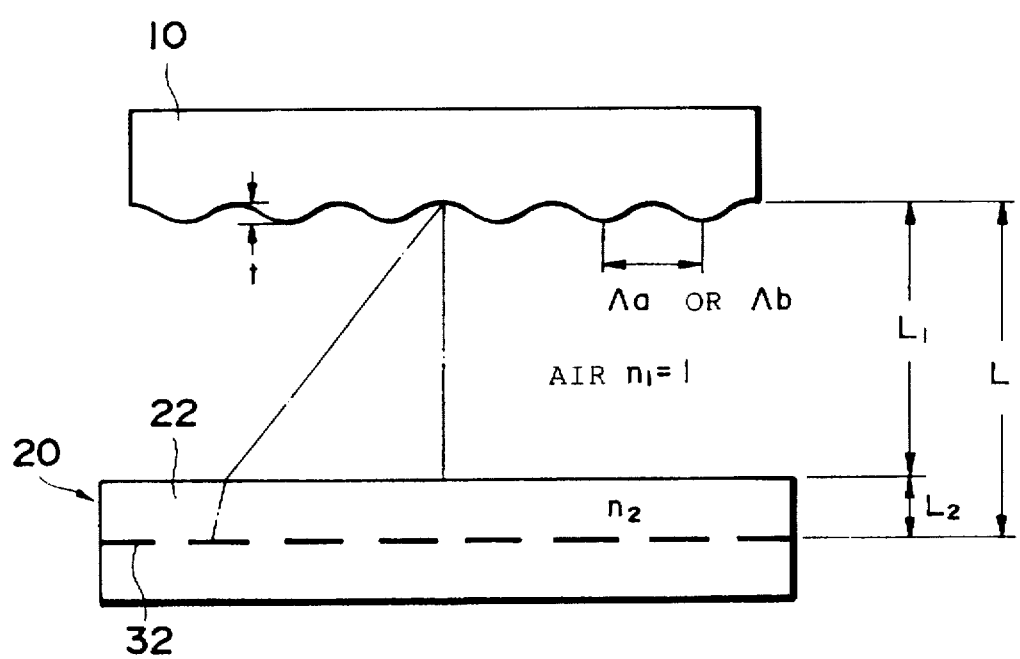
FIG. 47 illustrates various parameters of an optical low-pass filter and liquid-crystal panel.

FIG. 47 illustrates part of a liquid-crystal display device in enlarged form. The position of the black matrix 32 in the liquid-crystal panel 20 is the pixel plane.

Let the optical distance between the pixel plane and the lattice plane be L, let the thickness of one glass substrate (that facing the diffraction grating 10) of the liquid-crystal panel 20 be $L_2 = 900 \; \mu m$, and let the distance between the surface of the glass substrate 22 and the two-dimensional diffraction grating (optical low-pass filter) 10 be $L_1 = 1.4$ mm. Further, let the refractive index $n_2$ of the glass substrate 22 be 1.5. Assume that there is air between the glass substrate 22 and the diffraction grating 10. The refractive index of air is $n_1 = 1$. The following equation holds:

$$\begin{aligned} L &= L_1/n_1 + L_2/n_2 \quad \text{Eq. (97)} \\ &= 1.4/1 + 0.9/1.5 \\ &= 2 \; \text{mm} \end{aligned}$$

Assume that the two-dimensional diffraction gratings $10a$, $10b$ lie parallel to the y axis and x axis, respectively.

Assume that the grating periods of the two diffraction gratings $10a$, $10b$ are $\Lambda_a$, $\Lambda_b$, respectively. The following equations hold in view of the diffraction relations:

$$\Lambda_a = L\lambda/X_{10} \quad \text{Eq. (98)}$$
$$= 55.5 \, \mu m$$
$$\Lambda_b = L\lambda/Y_{01}$$
$$= 61.7 \, \mu m$$

The computations are performed for a case where a sinusoidal two-dimensional diffraction grating serves as the optical low-pass filter. When a one-dimensional sinusoidal diffraction grating is considered, the efficiency of diffraction of order n is expressed by $$J_n(\phi/2)|^2 \quad \text{Eq. (99)}$$

where $J_n$ is a Bessel function and $\phi$ is the amount of phase shift.

Accordingly, the following equation is obtained:

$$\frac{P_{01}}{P_{00}} = \frac{P_{10}}{P_{00}} = \left| \frac{J_1(\phi/2)}{J_2(\phi/2)} \right|^2 = 0.7 \quad \text{Eq. (100)}$$

From this we obtain $\phi/2=1.29$ rad.

The following equation holds in a sinusoidal diffraction grading:

$$t \times (n_g - 1) \times (2\pi/\lambda) = \phi \quad \text{Eq. (101)}$$

where t represents the grating thickness and $n_g$ the refractive index of the phase grating. Assume that $n_g=1.5$ holds.

Accordingly, we have $t=0.448 \, \mu m$.

It will be understood that use should be made of a sinusoidal diffraction grating having grating periods of 55.5 μm and 61.7 μm along the x and y axes, respectively, and a grating thickness of 0.448 μm.

A case will now be described in which a quartz plate is used as the optical low-pass filter.

Figure 48:
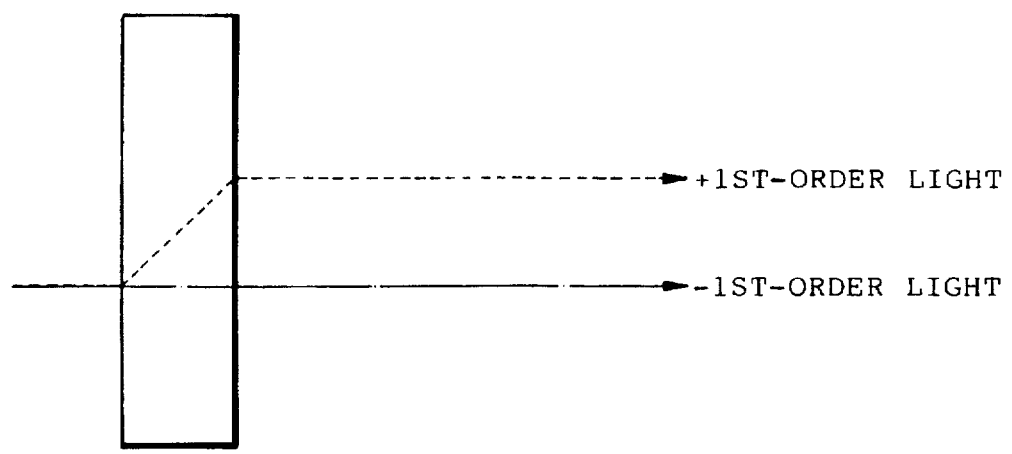
FIGS. 48 and 49 illustrate the splitting of light in a liquid-crystal plate.

FIG. 48 shows the manner in which light is split into two light rays in one direction using one quartz plate. A configuration in which two quartz plates employed in this manner are used in such fashion that the directions in which light is split are perpendicularly intersect each other is as shown in FIG. 38. In this case, it will suffice to treat the 0th-order light efficiency $P_{00}$ in the diffraction grating as being zero, as set forth earlier. Equations (41)–(44) (the case for the delta arrangement) are used.

Figure 49:
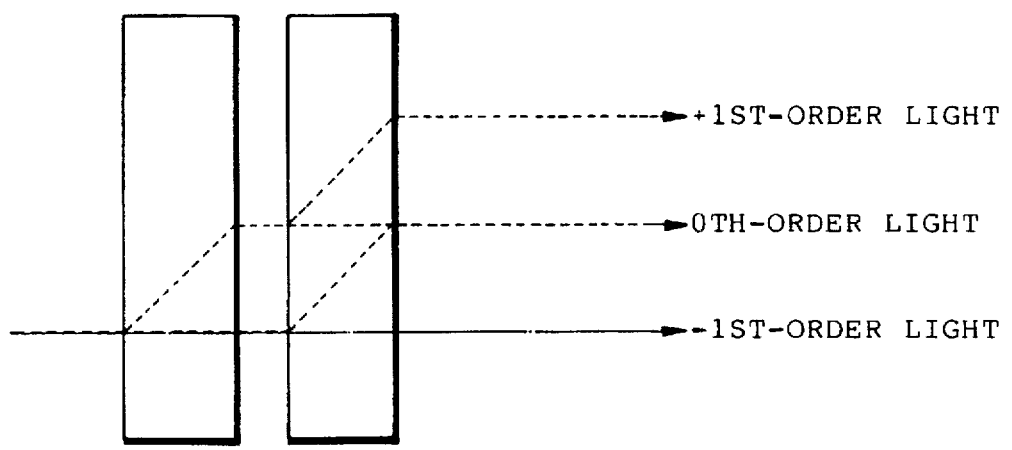
Figure 50:
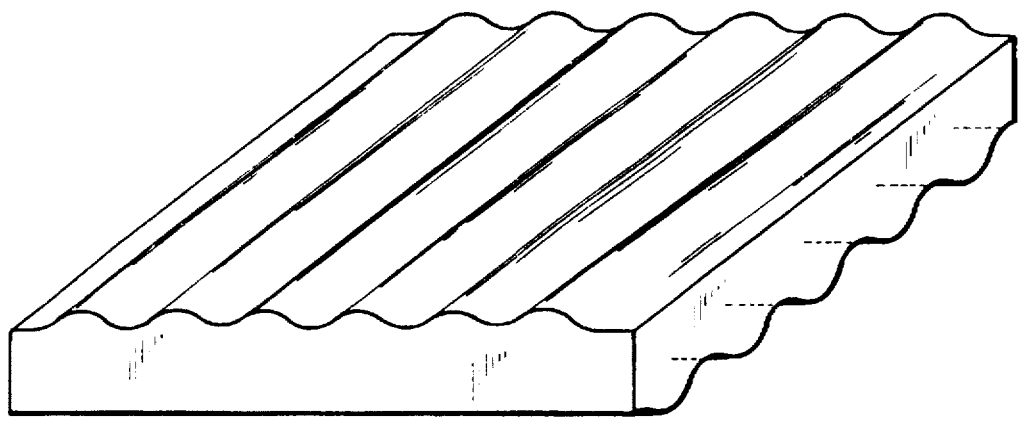
FIG. 50 is a perspective view showing an example of a sinusoidal phase grating.

FIG. 49 shows the manner in which light is split into three light rays in one direction using two quartz plates. In a case where light is thus divided into three light rays, the light rays at both ends may be treated as being ±1st-order light and the center light ray may be treated as being 0th-order light. However, this is limited to a case in which the intensities of the light of order +1st-order and −1st-order are substantially equal. Further, in the case of the quartz plates, the 0th- and ±1st-order light rays are all parallel. As a result, the position $(X_{mn}, Y_{mn})$ of the virtual image is set to be equal to the amount of shift of the light in the quartz plates.

Finally, a case will be considered in which the prism plate shown in FIGS. 39, 40 is used as the optical low-pass filter.

The prism plate also is dealt with as being a phase grating. The splitting (branching) of light is caused by the refraction of light. Therefore, if we let n represent the refractive index of the prism plate, the branching angle a will be represented by the following equation in accordance with Smell's law:

$$\alpha_{mn} = (n-1)\gamma_{mn} \quad \text{Eq. (102)}$$

where $\gamma_{mn}$ is the angle of the prism. (In FIG. 40, $\gamma_{0-1}$ is illustrated as a representative example.)

The efficiency of light is as indicated earlier by Equation (81).

Accordingly, if n=1.5 holds, the following prism angle is obtained for $X_{10}=20 \, \mu m$, $Y_{01}=12 \, \mu m$ (Equation (93) and L=2 mm:

$$\gamma_{10} = \frac{\alpha_{10}}{n-1} \quad \text{Eq. (103)}$$
$$= \frac{1}{n-1} \times \frac{X_{10}}{L}$$
$$= \frac{1}{0.5} \times \frac{20}{2} = 20 \, \text{mmrad}$$

$$\gamma_{01} = \frac{\alpha_{01}}{n-1}$$
$$= \frac{1}{n-1} \times \frac{Y_{01}}{L} = 12 \, \text{mmrad}$$

When the transverse and longitudinal lengths of each zone shown in FIG. 39 are set as follows:

$L_{a\pm1} = L_{b\pm1} = 70 \, \mu m$ $L_{a0} = L_{b0} = 100 \, \mu m$ the following is obtained by substituting these into Equation (81):

$$\frac{P_{10}}{P_{00}} = \frac{S_{10}}{S_{00}} = \frac{100 \times 70}{100 \times 100} = 0.7$$

$$\frac{P_{10}}{P_{00}} = \frac{S_{10}}{S_{00}} = \frac{100 \times 70}{100 \times 100} = 0.7 \quad \text{Eq. (104)}$$

It will be understood that this makes it possible to achieve a function that same as that of the sinusoidal diffraction grating.

The above-described condition (the relationship among L, $\theta_1$, $\theta_2$, etc.) under which the sinusoidal phase grating is disposed will now be considered.

The following equations hold true when the grating is disposed such that L=2 mm holds:

$$\alpha_{10} = \frac{X_{10}}{L} = 0.01 \, \text{rad}$$

$$\alpha_{01} = \frac{Y_{01}}{L} = 0.006 \, \text{rad} \quad \text{Eq. (105)}$$

Since the following holds in FIG. 35

$$\theta_2 = \theta_1 + \pi/2 \quad \text{Eq. (106)}$$

the conditions shown below are obtained when these Equations (105), (106) and the above-mentioned Equations (92), (94) are substituted into Equations (21) to (24).

From Equations (21) and (22), we have $$-0.243 < \theta_2 < 0.070 \, \text{rad} \quad \text{Eq. (107)}$$

From Equation (23), we have $$-0.305 < \theta_2 < 1.48 \, \text{rad} \quad \text{Eq. (108)}$$

From Equation (24) we have $$-1.48 < \theta_2 < 0.306 \, \text{rad} \quad \text{Eq. (109)}$$

Accordingly, it will be understood that it will suffice to place the sinusoidal phase grating so as to satisfy the following relation:

$$-0.243 < \theta_2 < 0.070 \, \text{rad} \quad \text{Eq. (110)}$$

(6) Features of Specific Examples and Applications Thereof

Higher-order diffracted light is not produced by a quartz plate. An ideal optical low-pass filter produces only light of order 0 and light of orders ±1 as shown in FIG. 36. Accordingly, when a quartz plate is used as an optical low-pass filter, the MTF characteristic at low frequency is improved to the extent that higher-order light is not produced.

In a case where a phase grating is used as an optical low-pass filter, a sinusoidal diffraction grating having a sinusoidal cross section (FIG. 6) is preferred. The reason for this is that the MTF value in the low-frequency region is raised, as illustrated in FIG. 36. In other words, blurring is reduced.

Since a diffraction grating or prism plate can be fabricated by plastic molding, an advantage is that cost can be reduced.

Figure 51:
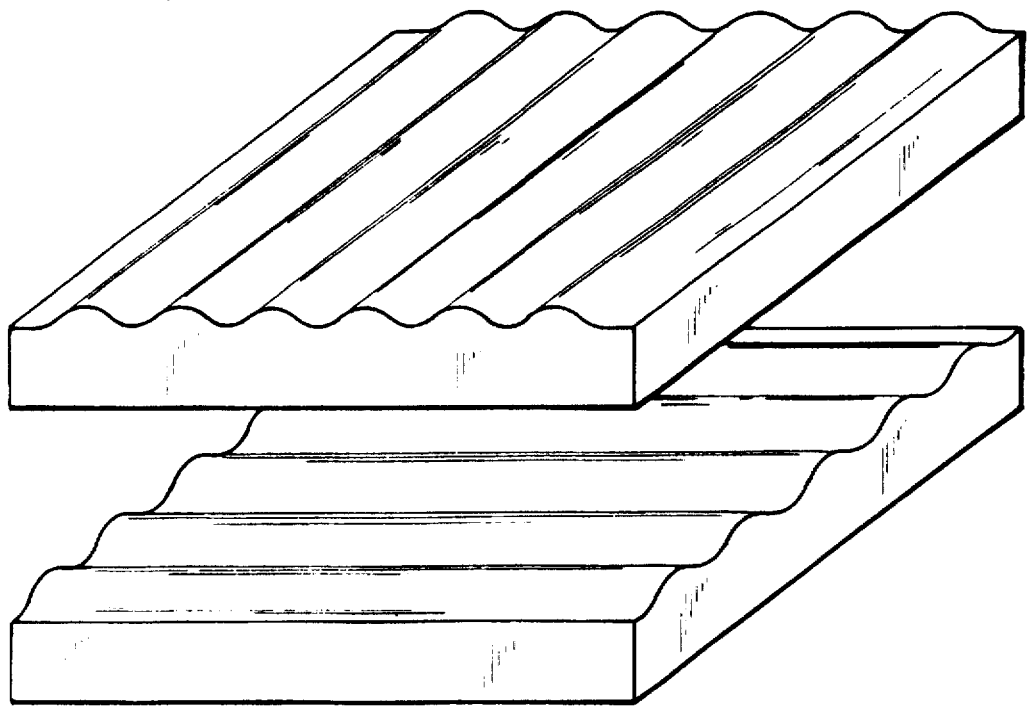
FIG. 51 is a perspective view showing another example of a sinusoidal phase grating.
Figure 52:
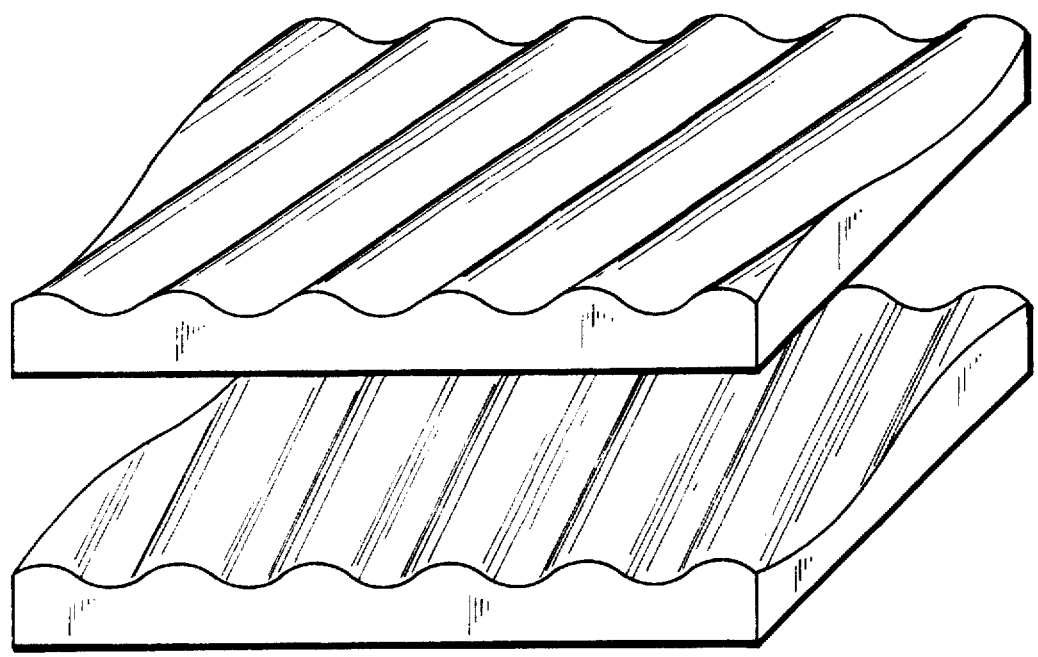
FIG. 52 is a perspective view showing yet another example of a sinusoidal phase grating.
Figure 53:
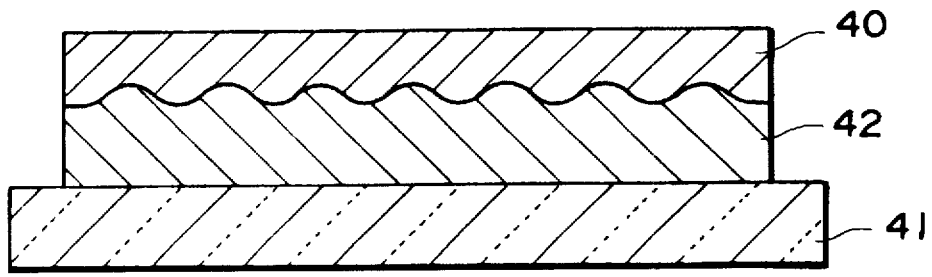
FIG. 53 illustrates a phase grating formed on a transparent substrate.

It is preferred to form a two-dimensional diffraction grating on one surface of a substrate, as shown in FIGS. 6 and 7. However, in a case where it is difficult to form a two-dimensional diffraction grating on one surface, it will suffice to fabricate one-dimensional diffraction gratings on both surfaces of the substrate in directions that perpendicularly intersect each other. If difficulty is encountered in forming diffraction gratings on both surfaces of a substrate, then two substrates on each of which a one-dimensional diffraction grating is formed on one surface can be superimposed in such a manner that the diffraction gratings perpendicularly intersect each other (a rectangular-type arrangement), as shown in FIG. 51, or in such a manner that the diffraction grating intersect each other at an angle other than a right angle (a parallelogram-type arrangement), as shown in FIG. 52.

One method of fabricating a phase grating is a molding method using a stamper. This involves preparing a stamper 40 having a female mold in the shape of the desired grating. A resin 42 curable by ultraviolet radiation is dropped upon a transparent substrate 41 and the stamper 40 is placed upon the resin 42. While the stamper 40 is urged toward the substrate 41, the resin 42 is cured by being irradiated with ultraviolet radiation from the side of the substrate 41. The stamper 40 is then removed.

According to this method, the glass plate of an image display panel such as a liquid-crystal display panel, polarizing plate or some other optical element is adopted as the substrate and a two-dimensional diffraction grating can be fabricated directly on the substrate. This is advantageous in terms of size reduction, integration and lower cost.

When an optical low-pass filter is mounted on a liquid-crystal panel (image display panel), or when an image display device including these is used, the MTF characteristic changes if the aforementioned optical distance L between the optical low-pass filter and the liquid-crystal panel changes.

Figure 54:
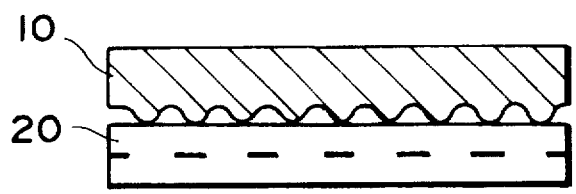
FIGS. 54 through 60 illustrate structures in which an optical low-pass filter is attached to a liquid-crystal panel.
Figure 55:
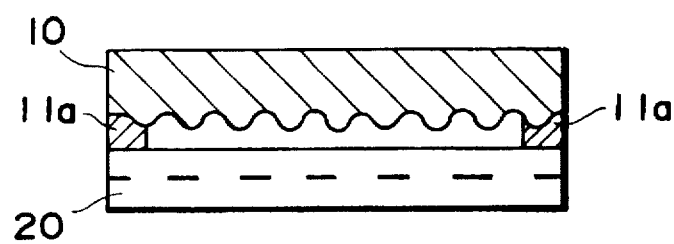
Figure 56:
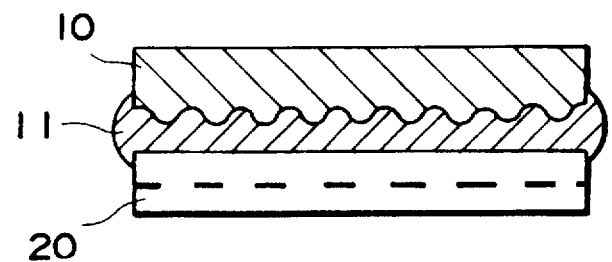

FIGS. 54 through 56 illustrate a method and structure for holding the optical distance L fixed and mounting an optical low-pass filter in simple fashion.

In FIG. 54, the optical low-pass filter 10 is brought into intimate contact with the liquid-crystal panel 20 and the two are secured by fixing means (not shown).

FIG. 55 illustrates an arrangement in which the optical low-pass filter 10 and liquid-crystal panel 20 are secured via a spacer 11a.

In FIG. 56, the optical low-pass filter 10 is secured to the liquid-crystal 20 by the bonding agent 11. The refractive index of the bonding agent 11 differs from that of the optical low-pass filter 10. This expedient reduces the number of parts required for fixing the filter and results in lower cost. Since the difference in refractive index between the optical low-pass filter 10 and bonding agent 11 is small, more leeway can be provided for the precision of lattice thickness t of the optical low-pass filter and the accuracy of the optical low-pass filter is improved.

Figure 57:
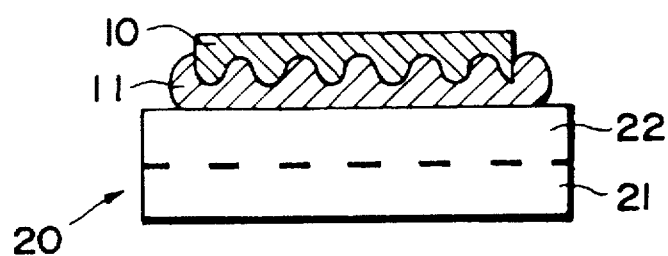

FIG. 57 illustrates an example of another arrangement. Here the optical low-pass filter 10 is such that its external shape is smaller than that of the liquid-crystal panel 20. Accordingly, even if the bonding resin 11 for bonding the optical low-pass filter 10 to the liquid-crystal 20 protrudes somewhat from the outer side of the optical low-pass filter 10, the bonding resin 11 will not protrude beyond the outer side of the liquid-crystal panel 20. This facilitates the operation for bonding the optical low-pass filter. In addition, when the display device is assembled, assembly is made easier since the liquid-crystal panel 20 need only be supported and not the optical low-pass filter 10.

It is preferred that the thickness of the optical low-pass filter 10 be made less than that of the glass substrate 22 (or polarizing plate 24) of the liquid-crystal panel 20. As a result, warping of the liquid-crystal panel as ascribable to a difference in rate of thermal expansion between the optical low-pass filter 10 and glass substrate 22 can be mitigated. In addition, the optical low-pass filter can be prevented from peeling off. This improves overall resistance to the environment.

Figure 58:
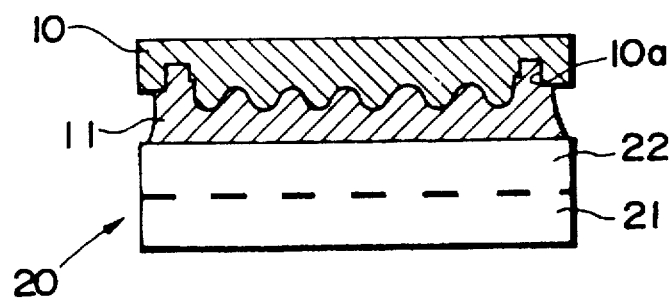

FIG. 58 illustrates an example in which a groove 10a is formed in the outer circumferential portion of the optical low-pass filter 10 on the bonding surface side thereof. The groove 10a is continuous along the entire perimeter of the optical low-pass filter 10. By forming the groove 10a, the bonding agent 11 can be prevented from protruding to the exterior even if the size of the optical low-pass filter 10 is the same as that of the liquid-crystal panel 20.

Figure 59:
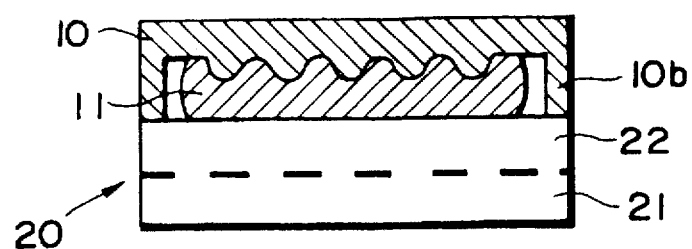

FIG. 59 illustrates an example in which a projecting wall 10b is formed on the outer circumference of the optical low-pass filter 10 on the bonding surface side thereof. The projecting wall 10b may be provided along the entire perimeter or portions thereof may be cut away. By making the height of the projecting wall 10b the same at all locations, the gap between the optical low-pass filter 10 and the liquid-crystal panel 20 (glass substrate 22) is made uniform irrespective of location and the two can be maintained in a parallel relationship. In addition, the bonding resin 11 can be prevented from protruding to the outside.

Figure 60:
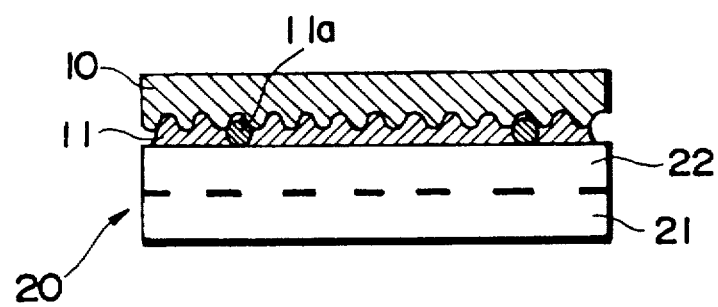

FIG. 60 illustrates an arrangement in which the spacer 11a is provided between the optical low-pass filter 10 and the glass plate 22 of the liquid-crystal panel 20. This is similar to the arrangement of FIG. 55. The optical low-pass filter 10 and glass substrate 22 can be maintained in parallel with the arrangement of FIG. 60 as well. It is necessary that the refractive index of the bonding layer 11 and that of the spacer 11a be made equal or nearly equal.

Figure 61A:
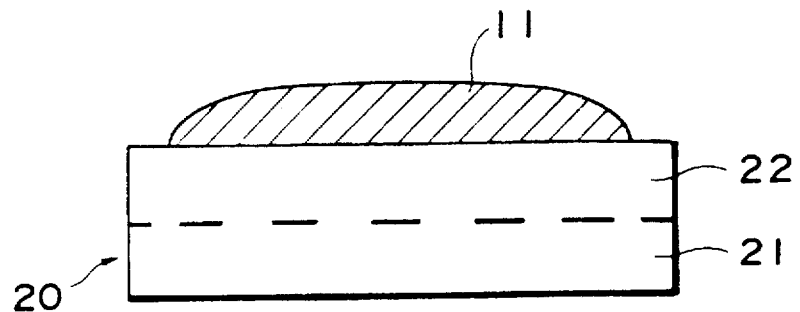
FIGS. 61a through 61c illustrate a process for mounting an optical low-pass filter.
Figure 61B:
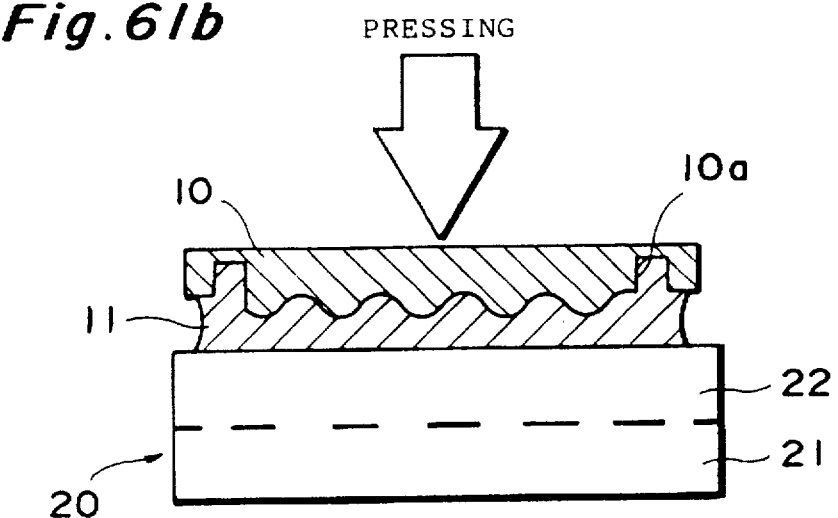
Figure 61C:
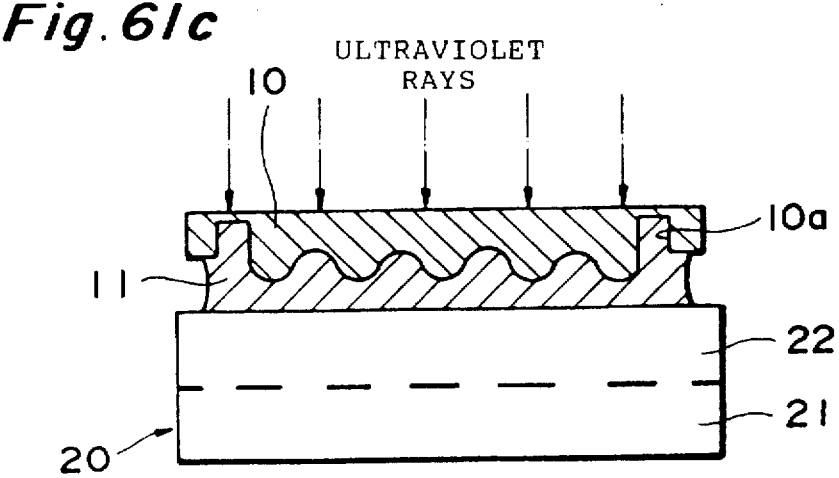

FIGS. 61a through 61c illustrate an example of a process for mounting an optical low-pass filter on a liquid-crystal panel.

The resin 11 curable by ultraviolet radiation is dropped upon the glass substrate 22 of the liquid-crystal panel 20 (FIG. 61a).

The optical low-pass filter 10 having the groove 10a in its outer circumferential portion is placed upon the resin 11 with its surface with projections and depressions being faced toward the resin 11. The optical low-pass filter 10 is urged toward the glass substrate 22 while it is kept parallel to the substrate (FIG. 61b).

The resin 11 is cured by being irradiated with ultraviolet radiation through the optical low-pass filter 10 (FIG. 61c).

When the optical low-pass filter in which the groove 10a is formed is used, the mounting process is facilitated because the resin 11 will not protrude to the outside. It goes without saying that an optical low-pass filter not having the groove can also be used. If the bonding resin does not protrude beyond the liquid-crystal panel, the liquid-crystal panel can be fixed to the frame of the display device using the side surface (end face) of the liquid-crystal panel in the manner mentioned above. This facilitates assembly.

It is permissible to use an adhesive (pressure sensitive adhesive) to join the optical low-pass filter and the glass substrate of the liquid-crystal panel or polarizing plate.

If the optical distance L between the optical low-pass filter and the liquid-crystal panel is enlarged, the ratio of a distance error $\Delta L$ to the distance L ($\Delta L/L$) is reduced and so is the change or error in the MTF characteristic. This is an example which is the converse of the above-described example.

Figure 62:
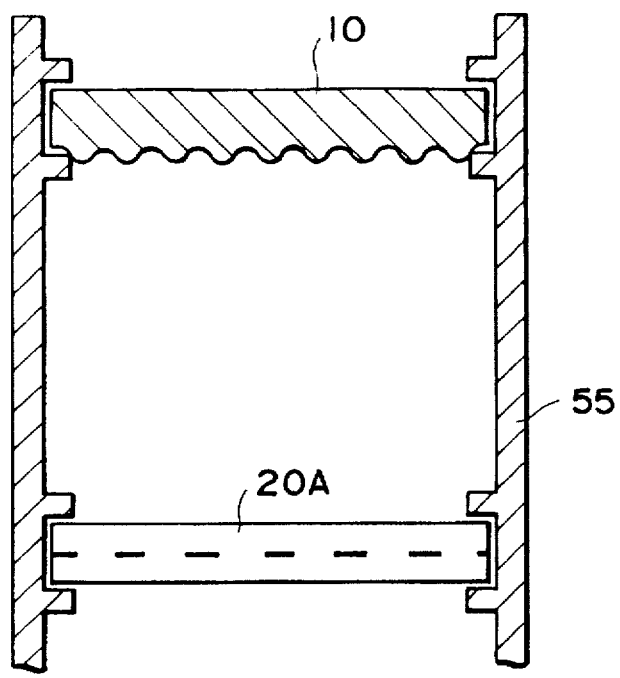
FIGS. 62 and 63 illustrate the structure in a viewfinder.
Figure 63:
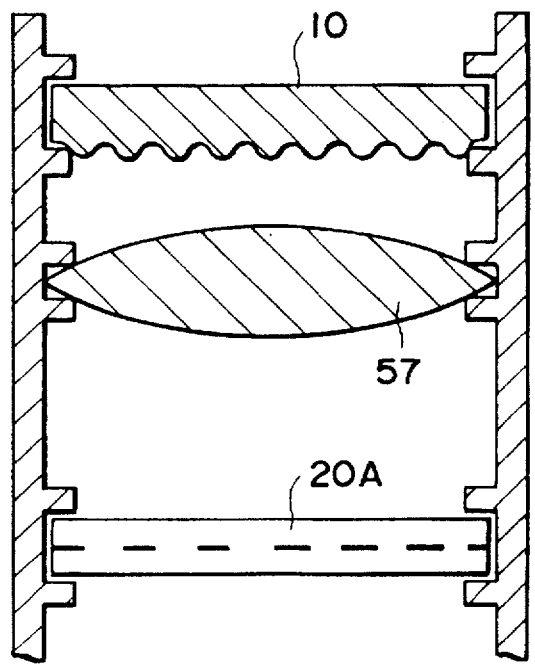

FIGS. 62 and 63 illustrate the construction of a viewfinder in a video camera.

In FIG. 62, a liquid-crystal display device (inclusive of the liquid-crystal panel and polarizing plates) 20A and the optical low-pass filter 10 are incorporated within a cylinder 55 and fixed. A long distance is provided between the liquid-crystal display device 20A and optical low-pass filter 10. In accordance with this arrangement, any dust that should happen to attach itself to the optical low-pass filter 10 will appear blurred when viewed (because the focal point of the observer's eye is located on the display plane of the display device 20A). As a result, a decline in image quality due to clinging dust is reduced.

A lens 57 may be placed between the liquid-crystal display device 20A and optical low-pass filter 10, as depicted in FIG. 63. As will be illustrated later, the lens 57 can also be placed on the outer side of the optical low-pass filter 10.

Examples of display panels which may utilize the optical low-pass filter are the above-mentioned liquid-crystal panel, a plasma display, a light-emitting diode array and an electroluminescent (EL) display.

Examples of display devices which may utilize the optical low-pass filter are a television, a television projector and the viewfinder of a video camera, etc.

Finally, a typical example of application of an image display device having an optical low-pass filter will be described.

Figure 64:
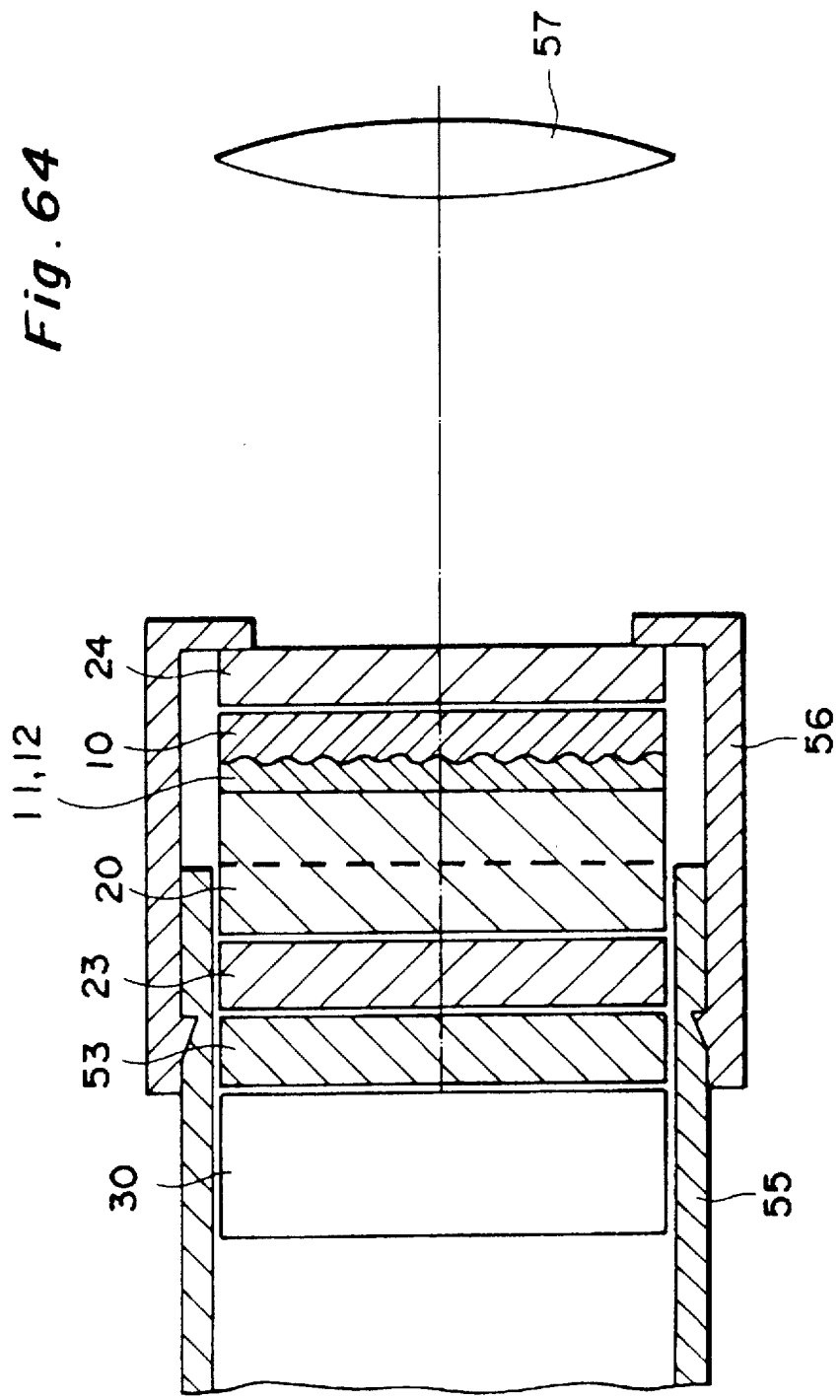
FIG. 64 is a sectional view showing the construction of the viewfinder.

FIG. 64 illustrates the optical system of a viewfinder provided on a video camera (inclusive of a still-video camera). The light source 30, a light diffusing plate 53, the polarizing plate 23, the liquid-crystal panel 20, the optical low-pass filter 10 and the polarizing plate 24 are fitted into a cylinder 55 in the order mentioned, and a cap 56 is attached to front end of the cylinder. The optical low-pass filter 10 is secured to the front face of the liquid-crystal panel 20 via the bonding layer 11 or adhesive layer 12.

A video signal from an image sensing device of the video camera is applied to the liquid-crystal panel 20 after being subjected to suitable signal processing. The captured image is displayed on the liquid-crystal panel 20. If necessary, the lens 57 is provided in front of the liquid-crystal panel 20.

Figure 65:
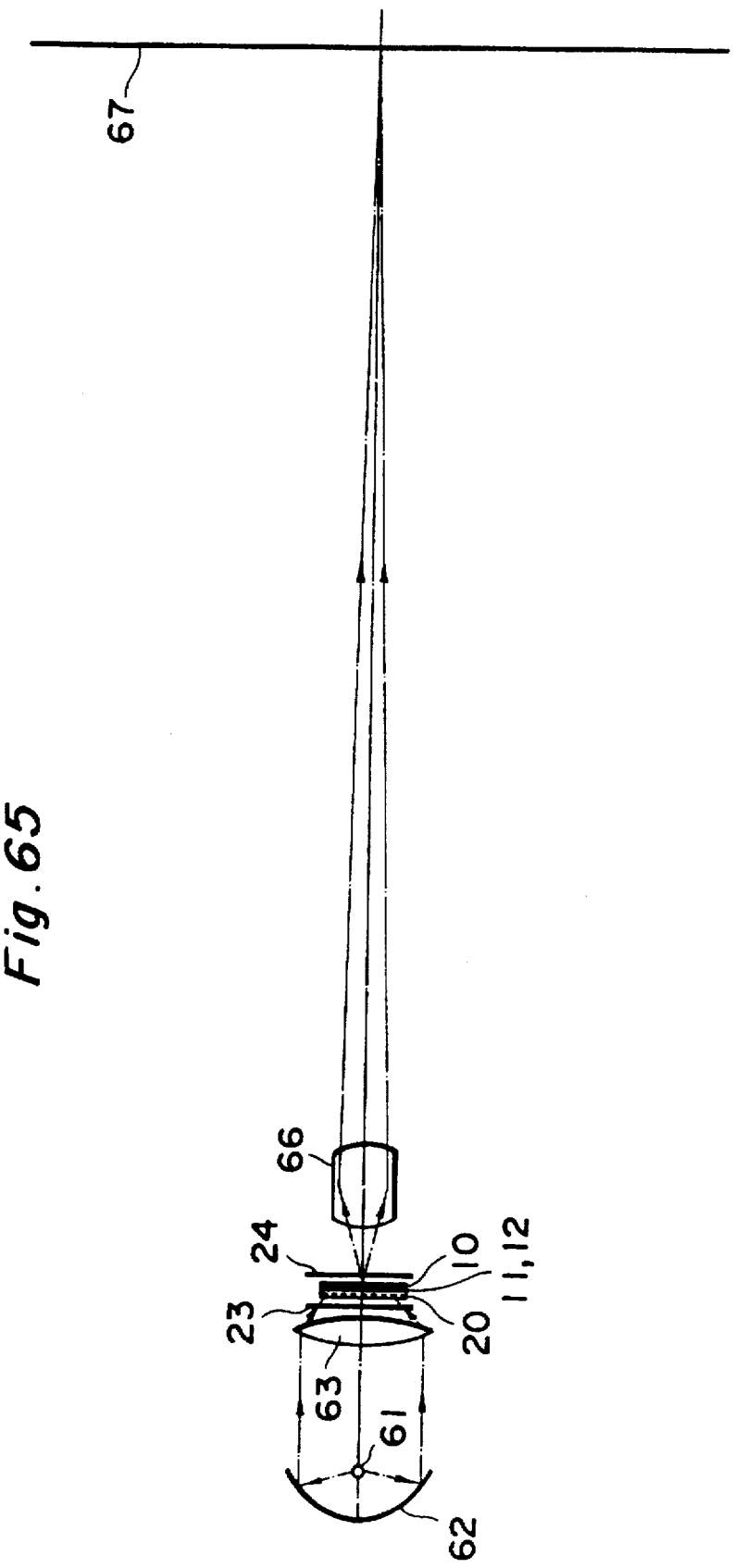
FIG. 65 is a diagram showing the construction of a TV projector.

FIG. 65 illustrates the overall optical construction of a liquid-crystal TV (television) projector.

Light produced by a light source 61 is rendered substantially parallel by being reflected by a parabolic mirror 62 placed in back of the light source 61, and the parallel light is condensed by a condenser lens 63. The liquid-crystal panel 20 is placed on optical path of the light condensed by the condenser lens 63. The two polarizing plates 24, 23 whose polarizing directions perpendicularly intersect each other are provided in front and back, respectively, of the liquid-crystal panel 20. The optical low-pass filter 10 is secured to the front face of the liquid-crystal panel 20 via the bonding layer 11 or adhesive layer 12.

The liquid-crystal panel 20 is controlled by a video signal applied externally as set forth above. As a result, the image represented by the video signal appears on the plane of the liquid-crystal panel 20. The image represented by the light that has passed through the liquid-crystal panel 20 and polarizing plates 23, 24 is formed on a distance screen 67 through an image forming lens 66.

As many apparently widely different embodiments of the present invention can be made without departing from the spirit and scope thereof, it is to be understood that the invention is not limited to the specific embodiments thereof except as defined in the appended claims.

What is claimed is:

1. An image display device comprising:
    an image display body having a plurality of pixels arranged periodically in two dimensions; and
    an optical low-pass filter placed on a front surface of said image display body;
    an initial minimum value of a modulation transfer function in one direction of said optical low-pass filter being decided by two basic frequency vectors for sampling frequencies determined by a pixel arrangement of said image display body, and an initial minimum value of the modulation transfer function in the other direction of said optical low-pass filter being decided by the difference between the basic frequency vectors.

2. The device according to claim 1, wherein said optical low-pass filter is one of a two-dimensional phase grating and a two-dimensional prism plate.

3. The device according to claim 2, wherein said two-dimensional phase grating is a sinusoidal phase grating.

4. The device according to claim 2, wherein said two-dimensional phase grating comprises two one-dimensional phase gratings formed on respective ones of two sides of a substrate, said two phase gratings having grating directions that differ from each other.

5. The device according to claim 2, wherein said two-dimensional phase grating comprises two one-dimensional phase gratings formed on respective substrates and having grating directions that differ from each other.

6. The device according to claim 1, wherein said optical low-pass filter is fixed on said image display body in a manner in intimate contact therewith.

7. The device according to claim 1, wherein said optical low-pass filter is secured to said image display body via a bonding layer or adhesive layer.

8. The device according to claim 1, wherein said optical low-pass filter is provided between said image display body and a lens.

9. The device according to claim 1, wherein said image display body is an image display component of one of a liquid-crystal display device, a plasma display device, an electroluminescent device and a CRT display device.

10. A viewfinder of a video camera having the image display device set forth in claim 1.

11. A TV projector having the image display device set forth in claim 1.

12. A television having the image display device set forth in claim 1.

13. An image display device comprising:
    an image display body having a plurality of pixels arranged periodically in two dimensions; and
    an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into four light rays which have point symmetry with respect to a central axis of these light rays;

said image display body having a pixel period in the row direction which is $\Delta x$ and a pixel period in the column direction which is $\Delta y$;

one of the following sets of Equations (41) through (44) and Equations (45) through (48) holding when relative positions of virtual images, which are formed on said image display body by the split light rays, with respect to the central axis being represented by row-direction components $X_1$, $X_2$ of the pixel arrangement and column-direction components $Y_1$, $Y_2$ of the pixel arrangement:

$$\frac{3}{2\Delta x} < \frac{1}{X_1+X_2} \left\{ \frac{1}{2} - \frac{Y_1+Y_2}{2\Delta y} \right\} < \frac{5}{2\Delta x} \quad \text{Eq. (41)}$$

$$\frac{3}{2\Delta x} < \frac{1}{X_1+X_2} \left\{ \frac{1}{2} + \frac{Y_1+Y_2}{2\Delta y} \right\} < \frac{5}{2\Delta x} \quad \text{Eq. (42)}$$

$$\frac{1}{4\Delta y} < \frac{1}{Y_1-Y_2} \left\{ \frac{1}{2} - \frac{X_1-X_2}{\Delta x} \right\} < \frac{3}{4\Delta y} \quad \text{Eq. (43)}$$

$$\frac{1}{4\Delta y} < \frac{1}{Y_1-Y_2} \left\{ \frac{1}{2} + \frac{X_1-X_2}{\Delta x} \right\} < \frac{3}{4\Delta y} \quad \text{Eq. (44)}$$

$$\frac{3}{4\Delta y} < \frac{1}{Y_1-Y_2} \left\{ \frac{1}{2} - \frac{X_1-X_2}{\Delta x} \right\} < \frac{5}{4\Delta y} \quad \text{Eq. (45)}$$

$$\frac{3}{4\Delta y} < \frac{1}{Y_1-Y_2} \left\{ \frac{1}{2} + \frac{X_1-X_2}{\Delta x} \right\} < \frac{5}{4\Delta y} \quad \text{Eq. (46)}$$

$$\frac{1}{2\Delta x} < \frac{1}{X_1+X_2} \left\{ \frac{1}{2} - \frac{Y_1+Y_2}{2\Delta y} \right\} < \frac{3}{2\Delta x} \quad \text{Eq. (47)}$$

$$\frac{1}{2\Delta x} < \frac{1}{X_1+X_2} \left\{ \frac{1}{2} + \frac{Y_1+Y_2}{2\Delta y} \right\} < \frac{3}{2\Delta x} \quad \text{Eq. (48)}$$

14. An image display device comprising:

an image display body having a plurality of pixels arranged periodically in two dimensions; and an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

relative positions of virtual images, which are formed on said image display body by two sets of the split light rays, with respect to the central optic axis being represented by row-direction components $X_1$, $X_2$ of the pixel arrangement and column-direction components $Y_1$, $Y_2$ of the pixel arrangement;

one of the sets of following Equations (1) through (4) and Equations (5) through (8) holding when the light-intensity ratio of light on the central optic axis to incident light and the light-intensity ratios of the two sets of split light rays to incident light are represented by $P_0$, $P_1$ and $P_2$, respectively:

$$\frac{3}{2\Delta x} < \frac{1}{X_1} \left\{ \frac{\cos^{-1}(-P_0/2P_1)}{2\pi} - \frac{Y_1}{2\Delta y} \right\} < \frac{5}{2\Delta x} \quad \text{Eq. (1)}$$

$$\frac{3}{2\Delta x} < \frac{1}{X_1} \left\{ \frac{\cos^{-1}(-P_0/2P_1)}{2\pi} + \frac{Y_1}{2\Delta y} \right\} < \frac{5}{2\Delta x} \quad \text{Eq. (2)}$$

$$\frac{1}{4\Delta x} < \frac{1}{Y_2} \left\{ \frac{\cos^{-1}(-P_0/2P_1)}{2\pi} - \frac{X_2}{\Delta x} \right\} < \frac{3}{4\Delta y} \quad \text{Eq. (3)}$$

$$\frac{1}{4\Delta x} < \frac{1}{Y_2} \left\{ \frac{\cos^{-1}(-P_0/2P_1)}{2\pi} + \frac{X_2}{\Delta x} \right\} < \frac{3}{4\Delta y} \quad \text{Eq. (4)}$$

$$\frac{3}{4\Delta x} < \frac{1}{Y_2} \left\{ \frac{\cos^{-1}(-P_0/2P_1)}{2\pi} - \frac{X_2}{\Delta x} \right\} < \frac{5}{4\Delta y} \quad \text{Eq. (5)}$$

$$\frac{3}{4\Delta x} < \frac{1}{Y_2} \left\{ \frac{\cos^{-1}(-P_0/2P_1)}{2\pi} + \frac{X_2}{\Delta x} \right\} < \frac{5}{4\Delta y} \quad \text{Eq. (6)}$$

$$\frac{1}{2\Delta x} < \frac{1}{X_1} \left\{ \frac{\cos^{-1}(-P_0/2P_1)}{2\pi} - \frac{Y_1}{2\Delta y} \right\} < \frac{3}{2\Delta x} \quad \text{Eq. (7)}$$

$$\frac{1}{2\Delta x} < \frac{1}{X_1} \left\{ \frac{\cos^{-1}(-P_0/2P_1)}{2\pi} + \frac{Y_1}{2\Delta y} \right\} < \frac{3}{2\Delta x} \quad \text{Eq. (8)}$$

15. The device according to claim 14, wherein said optical low-pass filter is one of a two-dimensional phase grating and a two-dimensional prism plate.

16. The device according to claim 14, wherein said image display body is a color image display body and is composed of an arrangement of pixels of a plurality of colors, said pixel periods $\Delta x$, $\Delta y$ being decided by the arrangement of pixels of one color among said plurality of colors.

17. The device according to claim 14, wherein said optical low-pass filter has a characteristic determined using a wavelength in the vicinity of the central wavelength of displayed light.

18. The device according to claim 14, wherein an image is displayed using a plurality of colors, and said optical low-pass filter has a characteristic determined using a central wavelength.

19. The device according to claim 15, wherein said two-dimensional phase grating is a sinusoidal phase grating.

20. The device according to claim 15, wherein said two-dimensional phase grating is comprised of two one-dimensional phase gratings formed on respective ones of two sides of a substrate, said two phase gratings having grating directions that differ from each other.

21. The device according to claim 15, wherein said two-dimensional phase grating comprises two one-dimensional phase gratings formed on respective substrates and having grating directions that differ from each other.

22. The device according to claim 14, wherein said optical low-pass filter is fixed on said image display body in a manner in intimate contact therewith.

23. The device according to claim 14, wherein said optical low-pass filter is secured to said image display body via a bonding layer or adhesive layer.

24. The device according to claim 14, wherein said optical low-pass filter is provided between said image display body and a lens.

25. The device according to claim 14, wherein said image display body is an image display component of one of a liquid-crystal display device, a plasma display device, an electroluminescent device and a CRT display device.

26. A viewfinder of a video camera having the image display device set forth in claim 14.

27. A TV projector having the image display device set forth in claim 14.

28. A television having the image display device set forth in claim 14.

29. An image display device comprising:

an image display body having a plurality of pixels arranged periodically in two dimensions; and an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

said two sets of optic axes forming angles of $\alpha_1$, $\alpha_2$, respectively, with the central optic axis;

said optical low-pass filter and said image display body having an optical distance of L between them;

a plane formed by one set of the optic axes having an inclination angle $\theta_1$ with respect to the row direction and a plane formed by the other set of the optic axes having an inclination angle $\theta_2$ with respect to the row direction;

disposition of said optical low-pass filter with respect to said image display body being decided in such a manner that one of the following sets of Equations (21) through (24) and Equations (25) through (28) holds when the light-intensity ratio of light on the central optic axis to incident light and the light-intensity ratios of the two sets of split light rays to incident light are represented by $P_0$, $P_1$ and $P_2$, respectively:

$$\frac{3}{2\Delta x} < \frac{\cos^{-1}(-P_0/2P_1)}{2\pi L\alpha_1 \cos\theta_1} - \frac{\tan\theta_1}{2\Delta y} < \frac{5}{2\Delta x} \qquad \text{Eq. (21)}$$

$$\frac{3}{2\Delta x} < \frac{\cos^{-1}(-P_0/2P_1)}{2\pi L\alpha_1 \cos\theta_1} + \frac{\tan\theta_1}{2\Delta y} < \frac{5}{2\Delta x} \qquad \text{Eq. (22)}$$

$$\frac{1}{4\Delta y} < \frac{\cos^{-1}(-P_0/2P_2)}{2\pi L\alpha_2 \cos\theta_2} - \frac{1}{\Delta x \tan\theta_2} < \frac{3}{4\Delta y} \qquad \text{Eq. (23)}$$

$$\frac{1}{4\Delta y} < \frac{\cos^{-1}(-P_0/2P_2)}{2\pi L\alpha_2 \cos\theta_2} + \frac{1}{\Delta x \tan\theta_2} < \frac{3}{4\Delta y} \qquad \text{Eq. (24)}$$

$$\frac{3}{4\Delta y} < \frac{\cos^{-1}(-P_0/2P_2)}{2\pi L\alpha_2 \cos\theta_2} - \frac{1}{\Delta x \tan\theta_2} < \frac{5}{4\Delta y} \qquad \text{Eq. (25)}$$

$$\frac{3}{4\Delta y} < \frac{\cos^{-1}(-P_0/2P_2)}{2\pi L\alpha_2 \cos\theta_2} + \frac{1}{\Delta x \tan\theta_2} < \frac{5}{4\Delta y} \qquad \text{Eq. (26)}$$

$$\frac{1}{2\Delta x} < \frac{\cos^{-1}(-P_0/2P_1)}{2\pi L\alpha_1 \cos\theta_1} - \frac{\tan\theta_1}{2\Delta y} < \frac{3}{2\Delta x} \qquad \text{Eq. (27)}$$

$$\frac{1}{2\Delta x} < \frac{\cos^{-1}(-P_0/2P_1)}{2\pi L\alpha_1 \cos\theta_1} + \frac{\tan\theta_1}{2\Delta y} < \frac{3}{2\Delta x} \qquad \text{Eq. (28)}$$

30. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

relative positions of virtual images, which are formed on said image display body by two sets of the split light rays, with respect to the central optic axis being represented by row-direction components $X_1$, $X_2$ of the pixel arrangement and column-direction components $Y_1$, $Y_2$ of the pixel arrangement;

the following Equations (9) through (12) holding when the light-intensity ratio of light on the central optic axis to incident light and the light-intensity ratios of the two sets of split light rays to incident light are represented by $P_0$, $P_1$ and $P_2$, respectively:

$$\frac{1}{2\Delta x} < \frac{1}{X_1} \left\{ \frac{\cos^{-1}(-P_0/2P_1)}{2\pi} - \frac{Y_1}{3\Delta y} \right\} < \frac{3}{2\Delta x} \qquad \text{Eq. (9)}$$

$$\frac{1}{2\Delta x} < \frac{1}{X_1} \left\{ \frac{\cos^{-1}(-P_0/2P_1)}{2\pi} + \frac{Y_1}{3\Delta y} \right\} < \frac{3}{2\Delta x} \qquad \text{Eq. (10)}$$

$$\frac{5}{6\Delta x} < \frac{1}{Y_2} \left\{ \frac{\cos^{-1}(-P_0/2P_2)}{2\pi} - \frac{X_2}{\Delta x} \right\} < \frac{7}{6\Delta y} \qquad \text{Eq. (11)}$$

$$\frac{5}{6\Delta x} < \frac{1}{Y_2} \left\{ \frac{\cos^{-1}(-P_0/2P_2)}{2\pi} + \frac{X_2}{\Delta x} \right\} < \frac{7}{6\Delta y} \qquad \text{Eq. (12)}$$

31. The device according to claim 30, wherein said optical low-pass filter is one of a two-dimensional phase grating and a two-dimensional prism plate.

32. The device according to claim 30, wherein said image display body is a color image display body and is composed of an arrangement of pixels of a plurality of colors, said pixel periods $\Delta x$, $\Delta y$ being decided by the arrangement of pixels of one color among said plurality of colors.

33. The device according to claim 30, wherein said optical low-pass filter has a characteristic determined using a wavelength in the vicinity of the central wavelength of displayed light.

34. The device according to claim 30, wherein an image is displayed using a plurality of colors, and said optical low-pass filter has a characteristic determined using a central wavelength.

35. The device according to claim 31, wherein said two-dimensional phase grating is a sinusoidal phase grating.

36. The device according to claim 31, wherein said two-dimensional phase grating comprises two one-dimensional phase gratings formed on respective ones of two sides of a substrate, said two phase gratings having grating directions that differ from each other.

37. The device according to claim 31, wherein said two-dimensional phase grating is comprised of two one-dimensional phase gratings formed on respective substrates and having grating directions that differ from each other.

38. The device according to claim 30, wherein said optical low-pass filter is fixed on said image display body in a manner in intimate contact therewith.

39. The device according to claim 30, wherein said optical low-pass filter is secured to said image display body via a bonding layer or adhesive layer.

40. The device according to claim 30, wherein said optical low-pass filter is provided between said image display body and a lens.

41. The device according to claim 30, wherein said image display body is an image display component of one of a liquid-crystal display device, a plasma display device, an electroluminescent device and a CRT display device.

42. A viewfinder of a video camera having the image display device set forth in claim 30.

43. A TV projector having the image display device set forth in claim 30.

44. A television having the image display device set forth in claim 30.

45. An image display device comprising:

an image display body having a plurality of pixels arranged periodically in two dimensions; and an optical low-pass filter placed on a front surface of said image display body;

an initial minimum value of a modulation transfer function in one direction of said optical low-pass filter being decided by the sum and difference of two basic frequency vectors for sampling frequencies determined by a pixel arrangement of said image display body, and an initial minimum value of the modulation transfer function in the other direction of said optical low-pass filter being decided by one of the two basic frequency vectors.

46. An image display device comprising:

an image display body having a plurality of pixels arranged periodically in two dimensions; and an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

relative positions of virtual images, which are formed on said image display body by two sets of the split light rays, with respect to the central optic axis being represented by row-direction components $X_1$, $X_2$ of the pixel arrangement and column-direction components $Y_1$, $Y_2$ of the pixel arrangement;

the following Equations (13) through (16) holding when the light-intensity ratio of light on the central optic axis to incident light and the light-intensity ratios of the two sets of split light rays to incident light are represented by $P_0$, $P_1$ and $P_2$, respectively:

$$-\frac{1}{2\Delta x} < \frac{2}{2X_1 + Y_1 \Delta x/\Delta y} \left\{ \frac{\cos^{-1}(-P_0/2P_1)}{2\pi} - \frac{Y_1}{\Delta y} \right\} < \frac{1}{2\Delta x} \quad \text{Eq. (13)}$$

$$\frac{3}{2\Delta x} < \frac{2}{2X_1 + Y_1 \Delta x/\Delta y} \left\{ \frac{\cos^{-1}(-P_0/2P_1)}{2\pi} + \frac{Y_1}{\Delta y} \right\} < \frac{5}{2\Delta x} \quad \text{Eq. (14)}$$

$$-\frac{1}{2\Delta x} < \frac{2}{2X_2 - Y_2 \Delta x/\Delta y} \left\{ \frac{\cos^{-1}(-P_0/2P_2)}{2\pi} - \frac{Y_2}{\Delta y} \right\} < \frac{1}{2\Delta x} \quad \text{Eq. (15)}$$

$$-\frac{5}{2\Delta x} < \frac{2}{2X_2 - Y_2 \Delta x/\Delta y} \left\{ \frac{\cos^{-1}(-P_0/2P_2)}{2\pi} + \frac{Y_2}{\Delta y} \right\} < \frac{3}{2\Delta x} \quad \text{Eq. (16)}$$

47. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into four light rays which have point symmetry with respect to a central axis of these light rays;

said image display body having a pixel period in the row direction which is $\Delta x$ and a pixel period in the column direction which is $\Delta y$;

the following Equations (49) through (52) holding when relative positions of virtual images, which are formed on said image display body by the split light rays, with respect to the central axis being represented by row-direction components $X_1$, $X_2$ of the pixel arrangement and column-direction components $Y_1$, $Y_2$ of the pixel arrangement:

$$\frac{1}{2\Delta x} < \frac{1}{X_1 + X_2} \left\{ \frac{1}{2} - \frac{Y_1 + Y_2}{3\Delta y} \right\} < \frac{3}{2\Delta x} \quad \text{Eq. (49)}$$

$$\frac{1}{2\Delta x} < \frac{1}{X_1 + X_2} \left\{ \frac{1}{2} + \frac{Y_1 + Y_2}{3\Delta y} \right\} < \frac{3}{2\Delta x} \quad \text{Eq. (50)}$$

$$\frac{5}{6\Delta y} < \frac{1}{Y_1 - Y_2} \left\{ \frac{1}{2} - \frac{X_1 - X_2}{\Delta x} \right\} < \frac{7}{6\Delta y} \quad \text{Eq. (51)}$$

$$\frac{5}{6\Delta y} < \frac{1}{Y_1 - Y_2} \left\{ \frac{1}{2} + \frac{X_1 - X_2}{\Delta x} \right\} < \frac{7}{6\Delta y} \quad \text{Eq. (52)}$$

48. The device according to claim 47, wherein said optical low-pass filter is constituted by two quartz plates that are superimposed in such a manner that directions in which light is split is perpendicular to each other.

49. An image display device comprising:

an image display body having a plurality of pixels arranged periodically in two dimensions; and an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into four light rays which have point symmetry with respect to a central axis of these light rays;

said image display body having a pixel period in the row direction which is $\Delta x$ and a pixel period in the column direction which is $\Delta y$;

the following Equations (53) through (56) holding when relative positions of virtual images, which are formed on said image display body by the split light rays, with respect to the central axis being represented by row-direction components $X_1$, $X_2$ of the pixel arrangement and column-direction components $Y_1$, $Y_2$ of the pixel arrangement:

$$-\frac{1}{2\Delta x} < \frac{\Delta y/2 - (Y_1 + Y_2)}{\Delta y(X_1 + X_2) + 1/2\Delta x(Y_1 + Y_2)} < \frac{1}{2\Delta x} \quad \text{Eq. (53)}$$

$$\frac{3}{2\Delta x} < \frac{\Delta y/2 + (Y_1 + Y_2)}{\Delta y(X_1 + X_2) + 1/2\Delta x(Y_1 + Y_2)} < \frac{5}{2\Delta x} \quad \text{Eq. (54)}$$

$$-\frac{1}{2\Delta x} < \frac{\Delta y/2 - (Y_1 - Y_2)}{\Delta y(X_1 - X_2) - 1/2\Delta x(Y_1 - Y_2)} < \frac{1}{2\Delta x} \quad \text{Eq. (55)}$$

$$-\frac{5}{2\Delta x} < \frac{\Delta y/2 + (Y_1 - Y_2)}{\Delta y(X_1 - X_2) - 1/2\Delta x(Y_1 - Y_2)} < -\frac{3}{2\Delta x} \quad \text{Eq. (56)}$$

50. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

said two sets of optic axes forming angles of $\alpha_1$, $\alpha_2$, respectively, with the central optic axis;

said optical low-pass filter and said image display body having an optical distance of L between them;

a plane formed by one set of the optic axes having an inclination angle $\theta_1$ with respect to the row direction and a plane formed by the other set of the optic axes having an inclination angle $\theta_2$ with respect to the row direction;

disposition of said optical low-pass filter with respect to said image display body being decided in such a manner that the following Equations (29) through (32) hold when the light-intensity ratio of light on the central optic axis to incident light and the light-intensity ratios of the two sets of split light rays to incident light are represented by $P_0$, $P_1$ and $P_2$, respectively:

$$\frac{1}{2\Delta x} < \frac{\cos^{-1}(-P_0/2P_1)}{2\pi L\alpha_1\cos\theta_1} - \frac{\tan\theta_1}{3\Delta y} < \frac{3}{2\Delta x} \quad \text{Eq. (29)}$$

$$\frac{1}{2\Delta x} < \frac{\cos^{-1}(-P_0/2P_1)}{2\pi L\alpha_1\cos\theta_1} + \frac{\tan\theta_1}{3\Delta y} < \frac{3}{2\Delta x} \quad \text{Eq. (30)}$$

$$\frac{5}{6\Delta y} < \frac{\cos^{-1}(-P_0/2P_2)}{2\pi L\alpha_2\cos\theta_2} - \frac{1}{\Delta x\tan\theta_2} < \frac{7}{6\Delta y} \quad \text{Eq. (31)}$$

$$\frac{5}{6\Delta y} < \frac{\cos^{-1}(-P_0/2P_2)}{2\pi L\alpha_2\cos\theta_2} + \frac{1}{\Delta x\tan\theta_2} < \frac{7}{6\Delta y} \quad \text{Eq. (32)}$$

51. The device according to claim 50, wherein said optical low-pass filter is a two-dimensional phase grating or a two-dimensional prism plate.

52. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

relative positions of virtual images, which are formed on said image display body by two sets of the split light rays, with respect to the central optic axis being represented by row-direction components $X_1$, $X_2$ of the pixel arrangement and column-direction components $Y_1$, $Y_2$ of the pixel arrangement;

the following Equations (17) through (20) holding when the light-intensity ratio of light on the central optic axis to incident light and the light-intensity ratios of the two sets of split light rays to incident light are represented by $P_0$, $P_1$ and $P_2$, respectively:

$$-\frac{1}{2\Delta x} < \frac{3}{3X_1 + Y_1\Delta x/\Delta y} \left\{ \frac{\cos^{-1}(-P_0/2P_1)}{2\pi} - \frac{Y_1}{\Delta y} \right\} < \frac{1}{2\Delta x} \quad \text{Eq. (17)}$$

$$\frac{3}{2\Delta x} < \frac{3}{3X_1 + Y_1\Delta x/\Delta y} \left\{ \frac{\cos^{-1}(-P_0/2P_1)}{2\pi} + \frac{Y_1}{\Delta y} \right\} < \frac{5}{2\Delta x} \quad \text{Eq. (18)}$$

$$-\frac{1}{2\Delta x} < \frac{3}{3X_2 - 2Y_2\Delta x/\Delta y} \left\{ \frac{\cos^{-1}(-P_0/2P_2)}{2\pi} - \frac{Y_2}{\Delta y} \right\} < \frac{1}{2\Delta x} \quad \text{Eq. (19)}$$

$$-\frac{5}{2\Delta x} < \frac{3}{3X_2 - 2Y_2\Delta x/\Delta y} \left\{ \frac{\cos^{-1}(-P_0/2P_2)}{2\pi} + \frac{Y_2}{\Delta y} \right\} < -\frac{3}{2\Delta x} \quad \text{Eq. (20)}$$

53. The device according to claim 52, wherein said optical low-pass filter is one of a two-dimensional phase grating and a two-dimensional prism plate.

54. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into four light rays which have point symmetry with respect to a central axis of these light rays;

said image display body having a pixel period in the row direction which is $\Delta x$ and a pixel period in the column direction which is $\Delta y$;

the following Equations (57) through (60) holding when relative positions of virtual images, which are formed on said image display body by the split light rays, with respect to the central axis being represented by row-direction components $X_1$, $X_2$ of the pixel arrangement and column-direction components $Y_1$, $Y_2$ of the pixel arrangement:

$$-\frac{1}{2\Delta x} < \frac{\Delta y/2 - (Y_1 + Y_2)}{\Delta y(X_1 + X_2) + 1/3\Delta x(Y_1 + Y_2)} < \frac{1}{2\Delta x} \quad \text{Eq. (57)}$$

$$\frac{3}{2\Delta x} < \frac{\Delta y/2 + (Y_1 + Y_2)}{\Delta y(X_1 + X_2) + 1/3\Delta x(Y_1 + Y_2)} < \frac{5}{2\Delta x} \quad \text{Eq. (58)}$$

$$-\frac{1}{2\Delta x} < \frac{\Delta y/2 - (Y_1 - Y_2)}{\Delta y(X_1 - X_2) - 2/3\Delta x(Y_1 - Y_2)} < \frac{1}{2\Delta x} \quad \text{Eq. (59)}$$

$$-\frac{5}{2\Delta x} < \frac{\Delta y/2 + (Y_1 - Y_2)}{\Delta y(X_1 - X_2) + 1/2\Delta x(Y_1 - Y_2)} < -\frac{3}{2\Delta x} \quad \text{Eq. (60)}$$

55. The device according to claim 54, wherein said optical low-pass filter comprises two quartz plates that are superimposed in such a manner that directions in which light is split is perpendicular to each other.

56. An image display device comprising:

an image display body having a plurality of pixels arranged periodically in two dimensions; and an optical low-pass filter placed on a front surface of said image display body;

said image display body having a pixel arrangement which is a delta arrangement comprising rows and columns perpendicular to each other, mutually adjacent rows being offset from each other by a half period;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

said two sets of optic axes forming angles of $\alpha_1$, $\alpha_2$, respectively, with the central optic axis;

said optical low-pass filter and said image display body having an optical distance of L between them;

a plane formed by one set of the optic axes having an inclination angle $\theta_1$ with respect to the row direction and a plane formed by the other set of the optic axes having an inclination angle $\theta_2$ with respect to the row direction;

disposition of said optical low-pass filter with respect to said image display body being decided in such a manner that the following Equations (33) through (36) hold when the light-intensity ratio of light on the central optic axis to incident light and the light-intensity ratios of the two sets of split light rays to incident light are represented by $P_0$, $P_1$ and $P_2$, respectively:

$$-\frac{1}{2\Delta x} < \frac{\cos^{-1}(-P_0/2P_1)}{\pi L\alpha_1\{2\cos\theta_1 + (\Delta x/\Delta y)\sin\theta_1\}} - \quad \text{Eq. (33)}$$

$$\frac{2}{2\Delta y/\tan\theta_1 + \Delta x} < \frac{1}{2\Delta x}$$

$$\frac{3}{2\Delta x} < \frac{\cos^{-1}(-P_0/2P_1)}{\pi L\alpha_1\{2\cos\theta_1 + (\Delta x/\Delta y)\sin\theta_1\}} + \quad \text{Eq. (34)}$$

$$\frac{2}{2\Delta y/\tan\theta_1 + \Delta x} < \frac{5}{2\Delta x}$$

$$-\frac{1}{2\Delta x} < \frac{\cos^{-1}(-P_0/2P_2)}{\pi L\alpha_2\{2\cos\theta_2 - (\Delta x/\Delta y)\sin\theta_2\}} - \quad \text{Eq. (35)}$$

$$\frac{2}{2\Delta y/\tan\theta_2 - \Delta x} < \frac{1}{2\Delta x}$$

$$-\frac{5}{2\Delta x} < \frac{\cos^{-1}(-P_0/2P_2)}{\pi L\alpha_2\{2\cos\theta_2 - (\Delta x/\Delta y)\sin\theta_2\}} + \quad \text{Eq. (36)}$$

$$\frac{2}{2\Delta y/\tan\theta_2 - \Delta x} < -\frac{3}{2\Delta x}$$

57. An image display device comprising:

an image display body having a plurality of pixels arranged periodically in two dimensions; and an optical low-pass filter placed on a front surface of said image display body;

said image display body having a pixel arrangement which is a mosaic arrangement comprising rows and columns perpendicular to each other, basic rows being arranged in the column direction and staggered by one-third period in the row direction;

said optical low-pass filter splitting incident light into a plurality of light rays, the optic axis of any of these split light rays serving as a central optic axis, and there being at least two sets of optic axes having point symmetry with respect to this central optic axis;

said image display body having a pixel period in the row direction which is $\Delta x$ and a pixel period in the column direction which is $\Delta y$;

said two sets of optic axes forming angles of $\alpha_1$, $\alpha_2$, respectively, with the central optic axis;

said optical low-pass filter and said image display body having an optical distance of L between them;

a plane formed by one set of the optic axes having an inclination angle $\theta_1$ with respect to the row direction and a plane formed by the other set of the optic axes having an inclination angle $\theta_2$ with respect to the row direction;

disposition of said optical low-pass filter with respect to said image display body being decided in such a manner that the following Equations (37) through (40) hold when the light-intensity ratio of light on the central optic axis to incident light and the light-intensity ratios of the two sets of split light rays to incident light are represented by $P_0$, $P_1$ and $P_2$, respectively:

$$-\frac{1}{2\Delta x} < \frac{3\cos^{-1}(-P_0/2P_1)}{2\pi L\alpha_1\{3\cos\theta_1 + (\Delta x/\Delta y)\sin\theta_1\}} - \quad \text{Eq. (37)}$$

$$\frac{3}{3\Delta y/\tan\theta_1 + \Delta x} < \frac{1}{2\Delta x}$$

$$\frac{3}{2\Delta x} < \frac{3\cos^{-1}(-P_0/2P_1)}{2\pi L\alpha_1\{3\cos\theta_1 + (\Delta x/\Delta y)\sin\theta_1\}} + \quad \text{Eq. (38)}$$

$$\frac{3}{3\Delta y/\tan\theta_1 + \Delta x} < \frac{5}{2\Delta x}$$

$$-\frac{1}{2\Delta x} < \frac{3\cos^{-1}(-P_0/2P_2)}{2\pi L\alpha_2\{3\cos\theta_2 + 2(\Delta x/\Delta y)\sin\theta_2\}} - \quad \text{Eq. 39)}$$

$$\frac{3}{3\Delta y/\tan\theta_2 - 2\Delta x} < \frac{1}{2\Delta x}$$

$$-\frac{5}{2\Delta x} < \frac{3\cos^{-1}(-P_0/2P_2)}{2\pi L\alpha_2\{3\cos\theta_2 + 2(\Delta x/\Delta y)\sin\theta_2\}} + \quad \text{Eq. 40)}$$

$$\frac{3}{3\Delta y/\tan\theta_2 - 2\Delta x} < -\frac{3}{2\Delta x}$$

58. The device according to claim 57, wherein said optical low-pass filter is one of a two-dimensional phase grating and a two-dimensional prism plate.

59. An optical low-pass filter for placement on a front surface of an image display body, an initial minimum value of a modulation transfer function in one direction of said optical low-pass filter being decided by two basic frequency vectors for sampling frequencies determined by a pixel arrangement of said image display body, and an initial minimum value of the modulation transfer function in the other direction of said optical low-pass filter being decided by the difference between the basic frequency vectors.

60. The device according to claim 59, wherein said optical low-pass filter is one of a two-dimensional phase grating and a two-dimensional prism plate.

61. The device according to claim 60, wherein said two-dimensional phase grating is a sinusoidal phase grating.

62. The device according to claim 60, wherein said two-dimensional phase grating comprises two one-dimensional phase gratings formed on respective ones of two sides of a substrate, said two phase gratings having grating directions that differ from each other.

63. The device according to claim 60, wherein said two-dimensional phase grating comprises two one-dimensional phase gratings formed on respective substrates and having grating directions that differ from each other.

64. An optical low-pass filter for placement on a front surface of an image display body having a pixel arrangement which is a delta arrangement comprising rows and columns perpendicular to each other, mutually adjacent rows being offset from each other by a half period, said image display body having a pixel period in the row direction which is $\Delta x$ and a pixel period in the column direction which is $\Delta y$, relative positions of virtual images formed on said image display body by two sets of split light rays with respect to a central optic axis being represented by row-direction components $X_1$, $X_2$ of the pixel arrangement and column-direction components $Y_1$, $Y2$ of the pixel arrangement, said optical low-pass filter splitting incident light into a plurality of light rays, the optic axis of any of these split light rays serving as a central optic axis, and there being at least two sets of optic axes having point symmetry with respect to this central optic axis, one of the following sets of Equations (1) through (4) or Equations (5) through (8) holding when the light-intensity ratio of light on the central optic axis to incident light and light-intensity ratios of the two sets of split light rays to incident light are represented by $P_0$, $P_1$ and $P_2$, respectively:

$$\frac{3}{2\Delta x} < \frac{1}{X_1} \left\{ \frac{\cos^{-1}(-P_0/2P_1)}{2\pi} - \frac{Y_1}{2\Delta y} \right\} < \frac{5}{2\Delta x} \quad \text{Eq. (1)}$$

$$\frac{3}{2\Delta x} < \frac{1}{X_1} \left\{ \frac{\cos^{-1}(-P_0/2P_1)}{2\pi} + \frac{Y_1}{2\Delta y} \right\} < \frac{5}{2\Delta x} \quad \text{Eq. (2)}$$

$$\frac{1}{4\Delta x} < \frac{1}{Y_2} \left\{ \frac{\cos^{-1}(-P_0/2P_1)}{2\pi} - \frac{X_2}{\Delta x} \right\} < \frac{3}{4\Delta y} \quad \text{Eq. (3)}$$

$$\frac{1}{4\Delta x} < \frac{1}{Y_2} \left\{ \frac{\cos^{-1}(-P_0/2P_1)}{2\pi} + \frac{X_2}{\Delta x} \right\} < \frac{3}{4\Delta y} \quad \text{Eq. (4)}$$

$$\frac{3}{4\Delta x} < \frac{1}{Y_2} \left\{ \frac{\cos^{-1}(-P_0/2P_1)}{2\pi} - \frac{X_2}{\Delta x} \right\} < \frac{5}{4\Delta y} \quad \text{Eq. (5)}$$

$$\frac{3}{4\Delta x} < \frac{1}{Y_2} \left\{ \frac{\cos^{-1}(-P_0/2P_1)}{2\pi} + \frac{X_2}{\Delta x} \right\} < \frac{5}{4\Delta y} \quad \text{Eq. (6)}$$

$$\frac{1}{2\Delta x} < \frac{1}{X_1} \left\{ \frac{\cos^{-1}(-P_0/2P_1)}{2\pi} - \frac{Y_1}{2\Delta y} \right\} < \frac{3}{2\Delta x} \quad \text{Eq. (7)}$$

$$\frac{1}{2\Delta x} < \frac{1}{X_1} \left\{ \frac{\cos^{-1}(-P_0/2P_1)}{2\pi} + \frac{Y_1}{2\Delta y} \right\} < \frac{3}{2\Delta x} \quad \text{Eq. (8)}$$

65. The device according to claim 64, wherein said optical low-pass filter is one of a two-dimensional phase grating and a two-dimensional prism plate.

66. The device according to claim 64, wherein said optical low-pass filter has a characteristic determined using a wavelength in the vicinity of the central wavelength of displayed light.

67. The device according to claim 64, wherein said optical low-pass filter has a characteristic determined using a central wavelength an image displayed using a plurality of colors.

68. The device according to claim 65, wherein said two-dimensional phase grating is a sinusoidal phase grating.

69. The device according to claim 65, wherein said two-dimensional phase grating is comprised of two one-dimensional phase gratings formed on respective ones of two sides of a substrate, said two phase gratings having grating directions that differ from each other.

70. The device according to claim 65, wherein said two-dimensional phase grating comprises two one-dimensional phase gratings formed on respective substrates and having grating directions that differ from each other.

71. An optical low-pass filter for placement on a front surface of an image display body having a plurality of pixels arranged periodically in two dimensions, said image display body having a pixel arrangement which is a mosaic arrangement comprising rows and columns perpendicular to each other, basic rows being arranged in the column direction and staggered by one-third period in the row direction, said image display body having a pixel period in the row direction which is $\Delta x$ and a pixel period in the column direction which is $\Delta y$, relative positions of virtual images formed on said image display body by two sets of split light rays with respect to a central optic axis being represented by row-direction components $X_1$, $X_2$ of the pixel arrangement and column-direction components $Y_1$, $Y_2$ of the pixel arrangement, said optical low-pass filter splitting incident light into a plurality of light rays, the optic axis of any of these split light rays serving as a central optic axis, and there being at least two sets of optic axes having point symmetry with respect to this central optic axis, the following Equations (9) through (12) holding when the light-intensity ratio of light on the central optic axis to incident light and the light-intensity ratios of the two sets of split light rays to incident light are represented by $P_0$, $P_1$ and $P_2$, respectively:

$$\frac{1}{2\Delta x} < \frac{1}{X_1} \left\{ \frac{\cos^{-1}(-P_0/2P_1)}{2\pi} - \frac{Y_1}{3\Delta y} \right\} < \frac{3}{2\Delta x} \quad \text{Eq. (9)}$$

$$\frac{1}{2\Delta x} < \frac{1}{X_1} \left\{ \frac{\cos^{-1}(-P_0/2P_1)}{2\pi} + \frac{Y_1}{3\Delta y} \right\} < \frac{3}{2\Delta x} \quad \text{Eq. (10)}$$

$$\frac{5}{6\Delta x} < \frac{1}{Y_2} \left\{ \frac{\cos^{-1}(-P_0/2P_2)}{2\pi} - \frac{X_2}{\Delta x} \right\} < \frac{7}{6\Delta y} \quad \text{Eq. (11)}$$

$$\frac{5}{6\Delta x} < \frac{1}{Y_2} \left\{ \frac{\cos^{-1}(-P_0/2P_2)}{2\pi} + \frac{X_2}{\Delta x} \right\} < \frac{7}{6\Delta y} \quad \text{Eq. (12)}$$

72. The device according to claim 71, wherein said optical low-pass filter is one of a two-dimensional phase grating and a two-dimensional prism plate.

73. The device according to claim 71, wherein said optical low-pass filter has a characteristic determined using a wavelength in the vicinity of the central wavelength of displayed light.

74. The device according to claim 71, wherein said optical low-pass filter has a characteristic determined using a central wavelength of an image displayed using a plurality of colors.

75. The device according to claim 72, wherein said two-dimensional phase grating is a sinusoidal phase grating.

76. The device according to claim 72, wherein said two-dimensional phase grating comprises two one-dimensional phase gratings formed on respective ones of two sides of a substrate, said two phase gratings having grating directions that differ from each other.

77. The device according to claim 72, wherein said two-dimensional phase grating is comprised of two one-dimensional phase gratings formed on respective substrates and having grating directions that differ from each other.

* * * * *